(12) United States Patent
Kawasaki et al.

(10) Patent No.: US 10,477,408 B2
(45) Date of Patent: *Nov. 12, 2019

(54) IMAGE COMMUNICATION SYSTEM, IMAGE RECEPTION APPARATUS, IMAGE TRANSMISSION APPARATUS, IMAGE RECEPTION METHOD, IMAGE TRANSMISSION METHOD, AND RECORDING MEDIUM

(71) Applicant: OLYMPUS CORPORATION, Hachioji-shi, Tokyo (JP)

(72) Inventors: Shinya Kawasaki, Tokyo (JP); Takahisa Endo, Tokyo (JP); Tetsuyuki Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 15/718,168

(22) Filed: Sep. 28, 2017

(65) Prior Publication Data

US 2018/0020362 A1  Jan. 18, 2018

Related U.S. Application Data

(63) Continuation of application No. PCT/JP2015/061063, filed on Apr. 9, 2015.

(51) Int. Cl.
*H04W 74/08* (2009.01)
*H04W 16/14* (2009.01)
(Continued)

(52) U.S. Cl.
CPC ....... *H04W 16/14* (2013.01); *H04W 72/0453* (2013.01); *H04W 74/0816* (2013.01); *H04W 84/12* (2013.01)

(58) Field of Classification Search
CPC .................................................. H04W 16/14
See application file for complete search history.

(56) References Cited

U.S. PATENT DOCUMENTS 6,553,073 B1  4/2003  Ogata
9,366,750 B2  6/2016  Nallapureddy et al.
(Continued)

FOREIGN PATENT DOCUMENTS

JP    2005-210616 A    8/2005
JP    2006-148974 A    6/2006
(Continued)

OTHER PUBLICATIONS

Notice of Allowance dated Dec. 4, 2018, issued in counterpart Japnaese application No. 2017-511411, with English translation. (6 pages).

(Continued)

*Primary Examiner* — Kent K Krueger
(74) *Attorney, Agent, or Firm* — Westerman, Hattori, Daniels & Adrian, LLP

(57) ABSTRACT

An image communication system includes an image transmission apparatus and an image reception apparatus. The image transmission apparatus includes a transmission-side wireless communication unit. The image reception apparatus includes a reception-side wireless communication unit. At least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit. At least one of the image transmission apparatus and the image reception apparatus includes a channel use confirmation unit configured to execute channel use confirmation for confirming that the (Continued)

communication channel is usable by continuously monitoring the detection process by the radar detection unit for a predetermined time.

9 Claims, 60 Drawing Sheets

(51) Int. Cl.
*H04W 84/12* (2009.01)
*H04W 72/04* (2009.01)

(56) References Cited

U.S. PATENT DOCUMENTS

| | | |
|---|---|---|
| 2005/0162304 A1 | 7/2005 | Mitsugi |
| 2009/0146866 A1 | 6/2009 | Matsumoto et al. |
| 2010/0297958 A1 | 11/2010 | Murakami et al. |
| 2010/0302966 A1 | 12/2010 | Matsuura |
| 2010/0303001 A1* | 12/2010 | Tamura ............... H04W 88/06 370/315 |
| 2012/0213086 A1* | 8/2012 | Matsuura ............... H04B 7/04 370/241 |
| 2013/0217340 A1 | 8/2013 | Nakatake |
| 2014/0090003 A1 | 3/2014 | Eguchi et al. |
| 2014/0286249 A1 | 9/2014 | Yamada et al. |
| 2014/0287790 A1 | 9/2014 | Ichikawa et al. |
| 2014/0313992 A1* | 10/2014 | Yamaguchi ........... H04W 16/14 370/329 |
| 2014/0355532 A1 | 12/2014 | Shapira |
| 2018/0020362 A1 | 1/2018 | Kawasaki et al. |
| 2018/0020427 A1 | 1/2018 | Endo et al. |

FOREIGN PATENT DOCUMENTS

| | | |
|---|---|---|
| JP | 2010-141625 A | 6/2010 |
| JP | 2010-272900 A | 12/2010 |
| JP | 2010-278825 A | 12/2010 |
| JP | 2013-168904 A | 8/2013 |
| WO | 2012/153581 A1 | 11/2012 |
| WO | 2015/033763 A1 | 3/2015 |

OTHER PUBLICATIONS

International Search Report dated Jul. 7, 2015, issued in counterpart International Application No. PCT/JP2015/061063 (2 pages).
International Search Report dated Jul. 7, 2015, issued in application No. PCT/JP2015/060962(counterpart to U.S. Appl. No. 15/715,866), with English translation. (4 pages).
Non-Final Office Action dated Apr. 29, 2019, issued in U.S. Appl. No. 15/715,866 (21 pages).
International Search Report dated Jul. 14, 2015, issued in counterpart application No. PCT/JP2015/061141, with English translation (4 pages).
Office Action dated Dec. 6, 2018, issued in counterpart U.S. Appl. No. 15/723,611 (17 pages).

\* cited by examiner

FIG. 4

| CHANNEL NUMBER (A1) | BANDWIDTH (A2) | CLASSIFICATION (A3) | COMMUNICATION CHANNEL (A4) |
|---|---|---|---|
| 1 | 20MHz | W52 | 36 |
| 2 | | W52 | 40 |
| 3 | | W52 | 44 |
| 4 | | W52 | 48 |
| 5 | | W53 | 52 |
| 6 | | W53 | 56 |
| 7 | | W53 | 60 |
| 8 | | W53 | 64 |
| 9 | | W56 | 100 |
| 10 | | W56 | 104 |
| 11 | | W56 | 108 |
| 12 | | W56 | 112 |
| 13 | | W56 | 116 |
| 14 | | W56 | 120 |
| 15 | | W56 | 124 |
| 16 | | W56 | 128 |
| 17 | | W56 | 132 |
| 18 | | W56 | 136 |
| 19 | | W56 | 140 |

FIG. 5

| | B1 | B2 | B3 |
|---|---|---|---|
| | CHANNEL NUMBER | COMMUNICATION CHANNEL | RADAR DETECTION HISTORY |
| | 1 | 36 | 0 |
| | 2 | 40 | 0 |
| | 3 | 44 | 0 |
| | 4 | 48 | 0 |
| | 5 | 52 | 0 |
| | 6 | 56 | 1 |
| | 7 | 60 | 0 |
| | 8 | 64 | 0 |
| | 9 | 100 | 0 |
| | 10 | 104 | 0 |
| | 11 | 108 | 0 |
| | 12 | 112 | 0 |
| | 13 | 116 | 0 |
| | 14 | 120 | 0 |
| | 15 | 124 | 0 |
| | 16 | 128 | 0 |
| | 17 | 132 | 0 |
| | 18 | 136 | 0 |
| | 19 | 140 | 0 |

FIG. 51

| CHANNEL NUMBER (B1) | COMMUNICATION CHANNEL (B2) | CHANNEL USAGE RATE [%] (B4) | RADAR DETECTION HISTORY (B3) |
|---|---|---|---|
| 1 | 36 | 55 | 0 |
| 2 | 40 | 37 | 0 |
| 3 | 44 | 45 | 0 |
| 4 | 48 | 74 | 0 |
| 5 | 52 | 22 | 0 |
| 6 | 56 | 0 | 1 |
| 7 | 60 | 12 | 0 |
| 8 | 64 | 20 | 0 |
| 9 | 100 | 0 | 0 |
| 10 | 104 | 16 | 0 |
| 11 | 108 | 30 | 0 |
| 12 | 112 | 20 | 0 |
| 13 | 116 | 0 | 0 |
| 14 | 120 | 20 | 0 |
| 15 | 124 | 63 | 0 |
| 16 | 128 | 10 | 0 |
| 17 | 132 | 3 | 0 |
| 18 | 136 | 11 | 0 |
| 19 | 140 | 32 | 0 |

IMAGE COMMUNICATION SYSTEM, IMAGE RECEPTION APPARATUS, IMAGE TRANSMISSION APPARATUS, IMAGE RECEPTION METHOD, IMAGE TRANSMISSION METHOD, AND RECORDING MEDIUM

BACKGROUND OF THE INVENTION

Field of the Invention

The present invention relates to an image communication system, an image reception apparatus, an image transmission apparatus, an image reception method, an image transmission method, and a recording medium.

The present application is a continuation application based on International Patent Application No. PCT/JP2015/061063 filed Apr. 9, 2015, the content of which is incorporated herein by reference.

Description of Related Art

In a wireless local area network (LAN) of a 5 GHz band, the number of available communication channels is larger than that of a wireless LAN of a 2.4 GHz band. Thus, in the wireless LAN of the 5 GHz band, a probability of interference with a communication channel used by another wireless LAN device is low. Therefore, the wireless LAN of the 5 GHz band is advantageous for image transmission in which communication quality is required to be secured. However, W53 and W56 which are parts of the 5 GHz band are frequency bands to be used by weather radar and the like. In these frequency bands, interference avoidance technology called dynamic frequency selection (DFS) is required to avoid interference with the radar.

An operation by DFS includes channel availability check (CAC) and in service monitoring (ISM). In CAC, the communication channel is continuously monitored in a state in which radio waves are not emitted for a predetermined time before use of the communication channel. When it is confirmed that radio waves of radar are not detected by CAC, it is possible to use the monitored communication channel. The radio waves of the radar need to be detected not only before the use of the communication channel but also during use of the communication channel. In ISM, the communication channel in use is continuously monitored.

If the radio waves of the radar are detected in the communication channel in use, the communication channel in use is changed by DFS. Also, transmission is stopped on the communication channel in use by DFS. If real-time image transmission is performed using W53 and W56 in the 5 GHz band, image transmission stops when the radio waves of the radar are detected and DFS operates.

Technology for avoiding the stop of image transmission by DFS is disclosed in Japanese Unexamined Patent Application, First Publication No. 2010-278825. The technology disclosed in Japanese Unexamined Patent Application, First Publication No. 2010-278825 will be described. A monitoring system b independent from a communication system a is provided in an access point. The access point monitors a communication channel on which communication is possible in the system b. When the access point detects radio waves of radar, the access point changes a communication channel of the system a to a communication channel monitored up to that point in time. A terminal detects a change in the communication channel according to a beacon transmitted by the access point. If the change in the communication channel is detected, the terminal similarly changes the communication channel. If radio waves of the radar are not detected in the monitored communication channel within a predetermined time, CAC is completed. The access point can immediately resume wireless communication using a communication channel on which CAC is completed.

SUMMARY OF THE INVENTION

According to a first aspect of the present invention, an image communication system includes an image transmission apparatus; and an image reception apparatus. The image transmission apparatus includes a transmission-side wireless communication unit configured to transmit image data by radio waves. The image data is generated in synchronization with an imaging clock. The image data is transmitted in the order in which the image data is generated. The image reception apparatus includes a reception-side wireless communication unit configured to receive the image data transmitted by the transmission-side wireless communication unit by radio waves. At least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit. At least one of the image transmission apparatus and the image reception apparatus includes a channel use confirmation unit configured to execute channel use confirmation for confirming that the communication channel is usable by continuously monitoring the detection process by the radar detection unit for a predetermined time. The channel use confirmation unit executes the channel use confirmation of a third communication channel when image data communication using a first communication channel is being performed. The first communication channel and the third communication channel are communication channels in which detection of the radar is necessary. The third communication channel is different from the first communication channel. The transmission-side wireless communication unit and the reception-side wireless communication unit stop the image data communication using the first communication channel within a predetermined period from a point in time at which the radar detection unit detects the radio waves of the radar in the first communication channel while the image data communication using the first communication channel is performed. The transmission-side wireless communication unit and the reception-side wireless communication unit start image data communication using the third communication channel within the predetermined period from the point in time at which the radio waves of the radar are detected if the channel use confirmation of the third communication channel is completed at the point in time at which the radio waves of the radar are detected. The transmission-side wireless communication unit and the reception-side wireless communication unit start image data communication using a second communication channel within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

According to a second aspect of the present invention, in the first aspect, the channel use confirmation unit may execute the channel use confirmation of a fourth communication channel when the image data communication using the first communication channel is being performed. The fourth communication channel is a communication channel that has a possibility of being used by the radar. The fourth communication channel is different from any of the first communication channel and the third communication channel. The channel use confirmation unit may suspend either the channel use confirmation of the third communication channel or the channel use confirmation of the fourth communication channel which has a longer remaining time until completion if the channel use confirmation is not completed in any of the third communication channel and the fourth communication channel at the point in time at which the radio waves of the radar are detected. The transmission-side wireless communication unit and the reception-side wireless communication unit may change a communication channel set in the transmission-side wireless communication unit and the reception-side wireless communication unit from the communication channel on which the channel use confirmation is suspended to the second communication channel and start image data communication using the second communication channel. The channel use confirmation unit may continue either the channel use confirmation of the third communication channel or the channel use confirmation of the fourth communication channel which has a shorter remaining time until completion. The transmission-side wireless communication unit and the reception-side wireless communication unit may stop the image data communication using the second communication channel after the continued channel use confirmation is completed. The transmission-side wireless communication unit and the reception-side wireless communication unit may start image data communication using the third communication channel or the fourth communication channel on which the channel use confirmation is completed.

According to a third aspect of the present invention, in the first aspect, at least one of the image transmission apparatus and the image reception apparatus may further include a channel quality confirmation unit configured to confirm qualities of a plurality of communication channels different from the first communication channel before the channel use confirmation of the third communication channel is started when the image data communication using the first communication channel is being performed. At least one of a first process and a second process may be executed. A communication channel with relatively high quality among the plurality of communication channels whose qualities have been confirmed by the channel quality confirmation unit may be set as the third communication channel in the first process. A communication channel with relatively high quality among the plurality of communication channels whose qualities have been confirmed by the channel quality confirmation unit may be set as the second communication channel in the second process.

According to a fourth aspect of the present invention, an image reception apparatus includes a reception-side wireless communication unit, a radar detection unit, and a channel use confirmation unit. The reception-side wireless communication unit receives image data by radio waves. The image data is generated in synchronization with an imaging clock. The image data is transmitted in the order in which the image data is generated. The radar detection unit executes a detection process on radio waves of radar in a communication channel that has a possibility of being used for image data communication by the reception-side wireless communication unit. The channel use confirmation unit executes channel use confirmation for confirming that the communication channel is usable by continuously monitoring the detection process by the radar detection unit for a predetermined time. The channel use confirmation unit executes the channel use confirmation of a third communication channel when image data communication using a first communication channel is being performed. The first communication channel and the third communication channel are communication channels in which detection of the radar is necessary. The third communication channel is different from the first communication channel. The reception-side wireless communication unit stops the image data communication using the first communication channel within a predetermined period from a point in time at which the radar detection unit detects the radio waves of the radar in the first communication channel while the image data communication using the first communication channel is performed. The reception-side wireless communication unit starts image data communication using the third communication channel within the predetermined period from the point in time at which the radio waves of the radar are detected if the channel use confirmation of the third communication channel is completed at the point in time at which the radio waves of the radar are detected. The reception-side wireless communication unit starts image data communication using a second communication channel within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

According to a fifth aspect of the present invention, an image transmission apparatus includes a transmission-side wireless communication unit, a radar detection unit, and a channel use confirmation unit. The transmission-side wireless communication unit transmits image data by radio waves. The image data is generated in synchronization with an imaging clock. The image data is transmitted in the order in which the image data is generated. The radar detection unit executes a detection process on radio waves of radar in a communication channel that has a possibility of being used for image data communication by the transmission-side wireless communication unit. The channel use confirmation unit executes channel use confirmation for confirming that the communication channel is usable by continuously monitoring the detection process by the radar detection unit for a predetermined time. The channel use confirmation unit executes the channel use confirmation of a third communication channel when image data communication using a first communication channel is being performed. The first communication channel and the third communication channel are communication channels in which detection of the radar is necessary. The third communication channel is different from the first communication channel. The transmission-side wireless communication unit stops the image data communication using the first communication channel within a predetermined period from a point in time at which the radar detection unit detects the radio waves of the radar in the first communication channel while the image data communication using the first communication channel is performed. The transmission-side wireless communication unit starts image data communication using the third communication channel within the predetermined period from the point in time at which the radio waves of the radar are detected if the channel use confirmation of the third communication channel is completed at the point in time at which the radio waves of the radar are detected. The transmission-side wireless communication unit starts image data communication using a second communication channel within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

According to a sixth aspect of the present invention, an image reception method includes a first step, a second step, a third step, a fourth step, a fifth step, and a sixth step. In the first step, image data is received by radio waves. The image data is generated in synchronization with an imaging clock. The image data is transmitted in the order in which the image data is generated. In the second step, a detection process on radio waves of radar in a communication channel that has a possibility of being used for image data communication in the first step is executed. In the third step, channel use confirmation for confirming that the communication channel is usable is executed by continuously executing the detection process for a predetermined time in the second step. In the third step, the channel use confirmation of a third communication channel is further executed when image data communication using a first communication channel is being performed. The first communication channel and the third communication channel are communication channels in which detection of the radar is necessary. The third communication channel is different from the first communication channel. In the fourth step, the image data communication using the first communication channel is stopped within a predetermined period from a point in time at which the radio waves of the radar are detected in the first communication channel in the second step while the image data communication using the first communication channel is performed. In the fifth step, image data communication using the third communication channel is started within the predetermined period from the point in time at which the radio waves of the radar are detected if the channel use confirmation of the third communication channel is completed at the point in time at which the radio waves of the radar are detected. In the sixth step, image data communication using a second communication channel is started within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

According to a seventh aspect of the present invention, an image transmission method includes a first step, a second step, a third step, a fourth step, a fifth step, and a sixth step. In the first step, image data is transmitted by radio waves. The image data is generated in synchronization with an imaging clock. The image data is transmitted in the order in which the image data is generated. In the second step, a detection process on radio waves of radar in a communication channel that has a possibility of being used for image data communication in the first step is executed. In the third step, channel use confirmation for confirming that the communication channel is usable is executed by continuously executing the detection process for a predetermined time in the second step. In the third step, the channel use confirmation of a third communication channel is further executed when image data communication using a first communication channel is being performed. The first communication channel and the third communication channel are communication channels in which detection of the radar is necessary. The third communication channel is different from the first communication channel. In the fourth step, the image data communication using the first communication channel is stopped within a predetermined period from a point in time at which the radio waves of the radar are detected in the first communication channel in the second step while the image data communication using the first communication channel is performed. In the fifth step, image data communication using the third communication channel is started within the predetermined period from the point in time at which the radio waves of the radar are detected if the channel use confirmation of the third communication channel is completed at the point in time at which the radio waves of the radar are detected. In the sixth step, image data communication using a second communication channel is started within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

According to an eighth aspect of the present invention, a non-transitory recording medium saves a program for causing a computer of an image reception apparatus to execute a first step, a second step, a third step, a fourth step, a fifth step, and a sixth step. In the first step, image data is received by radio waves. The image data is generated in synchronization with an imaging clock. The image data is transmitted in the order in which the image data is generated. In the second step, a detection process on radio waves of radar in a communication channel that has a possibility of being used for image data communication in the first step is executed. In the third step, channel use confirmation for confirming that the communication channel is usable is executed by continuously executing the detection process for a predetermined time in the second step. In the third step, the channel use confirmation of a third communication channel is further executed when image data communication using a first communication channel is being performed. The first communication channel and the third communication channel are communication channels in which detection of the radar is necessary. The third communication channel is different from the first communication channel. In the fourth step, the image data communication using the first communication channel is stopped within a predetermined period from a point in time at which the radio waves of the radar are detected in the first communication channel in the second step while the image data communication using the first communication channel is performed. In the fifth step, image data communication using the third communication channel is started within the predetermined period from the point in time at which the radio waves of the radar are detected if the channel use confirmation of the third communication channel is completed at the point in time at which the radio waves of the radar are detected. In the sixth step, image data communication using a second communication channel is started within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

According to a ninth aspect of the present invention, a non-transitory recording medium saves a program for causing a computer of an image transmission apparatus to execute a first step, a second step, a third step, a fourth step, a fifth step, and a sixth step. In the first step, image data is transmitted by radio waves. The image data is generated in synchronization with an imaging clock. The image data is transmitted in the order in which the image data is generated. In the second step, a detection process on radio waves of radar in a communication channel that has a possibility of being used for image data communication in the first step is executed. In the third step, channel use confirmation for confirming that the communication channel is usable is executed by continuously executing the detection process for a predetermined time in the second step. In the third step, the channel use confirmation of a third communication channel is further executed when image data communication using a first communication channel is being performed. The first communication channel and the third communication channel are communication channels in which detection of the radar is necessary. The third communication channel is different from the first communication channel. In the fourth step, the image data communication using the first communication channel is stopped within a predetermined period from a point in time at which the radio waves of the radar are detected in the first communication channel in the second step while the image data communication using the first communication channel is performed. In the fifth step, image data communication using the third communication channel is started within the predetermined period from the point in time at which the radio waves of the radar are detected if the channel use confirmation of the third communication channel is completed at the point in time at which the radio waves of the radar are detected. In the sixth step, image data communication using a second communication channel is started within the predetermined period from the point in time at which the radio waves of the radar are detected if the channel use confirmation of the third communication channel is not completed at the point in time at which the radio waves of the radar are detected. The second communication channel is a communication channel in which detection of the radar is not necessary.

BRIEF DESCRIPTION OF THE DRAWINGS

FIG. 4 is a reference diagram showing communication channels in the first embodiment of the present invention.

FIG. 5 is a reference diagram showing a channel state table in the first embodiment of the present invention.

FIG. 51 is a reference diagram showing a channel state table in the third embodiment of the present invention.

DETAILED DESCRIPTION OF THE INVENTION

Embodiments of the present invention will be described with reference to the drawings.

First Embodiment

Figure 1:
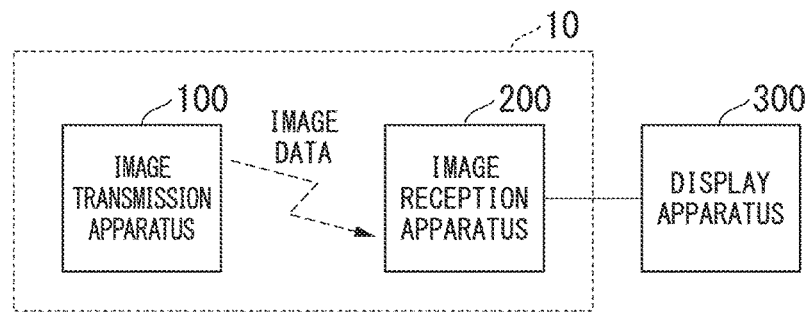
FIG. 1 is a block diagram showing a configuration of an image communication system according to a first embodiment of the present invention.

FIG. 1 shows a configuration of an image communication system 10 according to the first embodiment of the present invention. As shown in FIG. 1, the image communication system 10 includes an image transmission apparatus 100 and an image reception apparatus 200. The image transmission apparatus 100 and the image reception apparatus 200 perform wireless communication. The image reception apparatus 200 is connected to a display apparatus 300 by a cable or the like.

Figure 2:
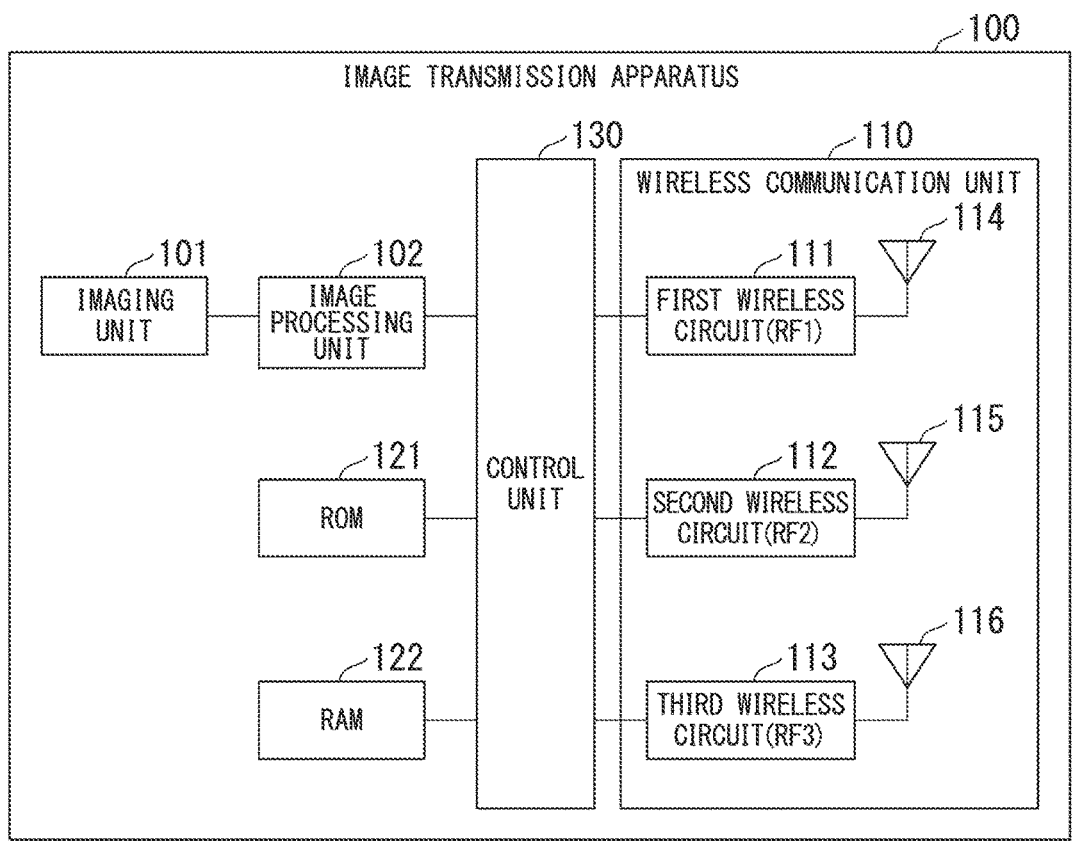
FIG. 2 is a block diagram showing a configuration of an image transmission apparatus according to the first embodiment of the present invention.

FIG. 2 shows a configuration of the image transmission apparatus 100. As shown in FIG. 2, the image transmission apparatus 100 includes an imaging unit 101, an image processing unit 102, a wireless communication unit 110 (a transmission-side wireless communication unit), a ROM 121, a RAM 122, and a control unit 130.

The imaging unit 101 is an imaging module. The imaging unit 101 includes a lens, an imaging element (a CCD or CMOS sensor or the like), an AD converter (an analog to digital converter), and the like. The lens forms an image of light incident on the imaging unit 101. The imaging element converts the light whose image is formed into an electric signal. The AD converter converts an analog electric signal output from the imaging element into a digital electric signal. According to this configuration, the imaging unit 101 images a subject and outputs image data.

The image processing unit 102 is an image processing circuit. The image processing unit 102 performs image processing on the image data output from the imaging unit 101. For example, the image processing unit 102 generates moving-image data by converting the image data output from the imaging unit 101 into data suitable for a predetermined moving-image format. The image processing unit 102 may perform a compression process on the image data output from the imaging unit 101.

The wireless communication unit 110 includes a plurality of wireless circuits. That is, the wireless communication unit 110 includes a first wireless circuit 111 (RF1), a second wireless circuit 112 (RF2), and a third wireless circuit 113 (RF3). Also, the wireless communication unit 110 includes a plurality of antennas. That is, the wireless communication unit 110 includes a first antenna 114, a second antenna 115, and a third antenna 116.

The first wireless circuit 111, the second wireless circuit 112, and the third wireless circuit 113 are wireless communication circuits. The first wireless circuit 111, the second wireless circuit 112, and the third wireless circuit 113 include a high-frequency circuit unit necessary for wireless communication, a baseband circuit unit for encoding and decoding, and a buffer memory. The first antenna 114 is connected to the first wireless circuit 111. The second antenna 115 is connected to the second wireless circuit 112. The third antenna 116 is connected to the third wireless circuit 113. For example, a wireless LAN protocol (IEEE 802.11) is used as a wireless communication scheme.

The first wireless circuit 111 performs wireless communication with the image reception apparatus 200 via the first antenna 114. The second wireless circuit 112 performs wireless communication with the image reception apparatus 200 via the second antenna 115. The third wireless circuit 113 performs wireless communication with the image reception apparatus 200 via the third antenna 116. The first wireless circuit 111, the second wireless circuit 112, and the third wireless circuit 113 transmit image data or necessary information to the image reception apparatus 200 by wireless communication. The first wireless circuit 111, the second wireless circuit 112, and the third wireless circuit 113 receive necessary information from the image reception apparatus 200 by wireless communication.

The first wireless circuit 111, the second wireless circuit 112, and the third wireless circuit 113 can simultaneously perform wireless communication using different communication channels. Therefore, the wireless communication unit 110 can simultaneously perform wireless communication using a plurality of different communication channels.

The ROM 121 is a nonvolatile memory such as a flash ROM. Program data for controlling the image transmission apparatus 100 and various setting information including communication setting parameters are stored in the ROM 121. The RAM 122 is a volatile memory. The RAM 122 is used as a buffer, a work area, and a temporary area. The buffer is used for temporarily storing the image data output from the imaging unit 101. The work area is used for calculation by the control unit 130 and the like. The temporary area is used for temporarily storing various setting information and the like.

The control unit 130 is a processor such as a central processing unit (CPU). The control unit 130 operates in accordance with a program stored in the ROM 121. Thereby, the control unit 130 controls the operation of the image transmission apparatus 100.

For example, a function of the control unit 130 can be implemented as a function of software by a computer of the image transmission apparatus 100 reading and executing a program including a command for defining the operation of the control unit 130. This program may be provided by, for example, a "computer-readable recording medium" such as a flash memory. Also, the above-described program may be transmitted from a computer having a storage apparatus or the like storing the program to the image transmission apparatus 100 via a transmission medium or by transmission waves in a transmission medium. The "transmission medium" for transmitting the program is a medium having a function of transmitting information, such as a network (communication network) like the Internet or a communication circuit (communication line) like a telephone circuit. Also, the above-described program may be a program for implementing some of the above-described functions. Further, the above-described program may be a program capable of implementing the above-described function in combination with a program already recorded on the computer, i.e., a so-called differential file (differential program).

The image transmission apparatus 100 may not include at least one of the imaging unit 101 and the image processing unit 102. If the image transmission apparatus 100 does not include at least one of the imaging unit 101 and the image processing unit 102, image data may be input from the other apparatus to the image transmission apparatus 100.

Figure 3:
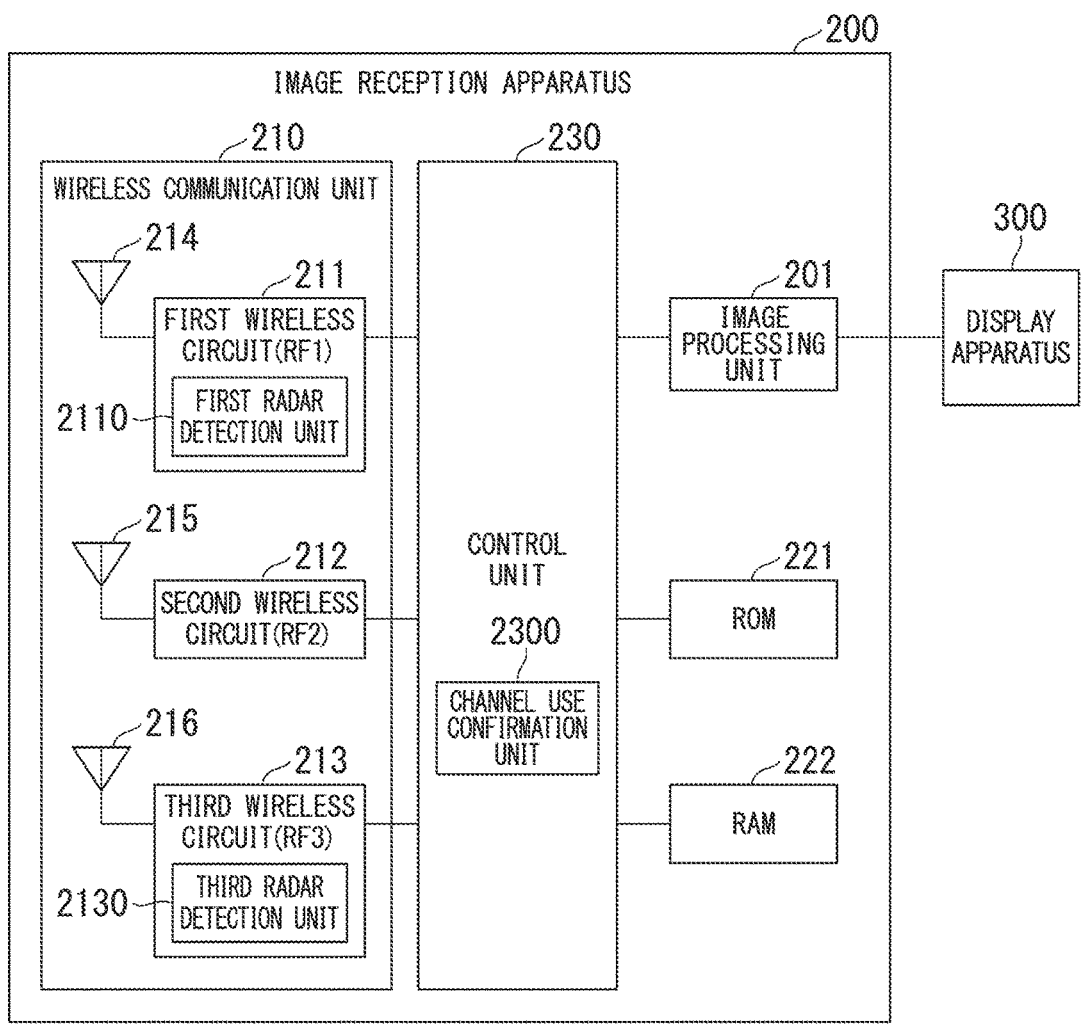
FIG. 3 is a block diagram showing a configuration of an image reception apparatus according to the first embodiment of the present invention.

FIG. 3 shows a configuration of the image reception apparatus 200. As shown in FIG. 3, the image reception apparatus 200 includes an image processing unit 201, a wireless communication unit 210 (a reception-side wireless communication unit), a ROM 221, a RAM 222, and a control unit 230.

The image processing unit 201 is an image processing circuit. The image processing unit 201 performs image processing on received image data. For example, the image processing unit 201 converts the image data into display data of a format used for displaying an image. If the image data is compressed, the image processing unit 201 may decompress the image data. The image processing unit 201 outputs the display data to the display apparatus 300. The display apparatus 300 displays an image on the basis of the display data.

The wireless communication unit 210 includes a plurality of wireless circuits. That is, the wireless communication unit 210 includes a first wireless circuit 211 (RF1), a second wireless circuit 212 (RF2), and a third wireless circuit 213 (RF3). Also, the wireless communication unit 210 includes a plurality of antennas. That is, the wireless communication unit 210 includes a first antenna 214, a second antenna 215, and a third antenna 216.

The first wireless circuit 211, the second wireless circuit 212, and the third wireless circuit 213 are wireless communication circuits. The first wireless circuit 211, the second wireless circuit 212, and the third wireless circuit 213 include a high-frequency circuit unit necessary for wireless communication, a baseband circuit unit for encoding and decoding, and a buffer memory. The first antenna 214 is connected to the first wireless circuit 211. The second antenna 215 is connected to the second wireless circuit 212. The third antenna 216 is connected to the third wireless circuit 213. For example, a wireless LAN protocol (IEEE 802.11) is used as a wireless communication scheme.

The first wireless circuit 211 performs wireless communication with the image transmission apparatus 100 via the first antenna 214. The first wireless circuit 111 and the first wireless circuit 211 perform wireless communication using one communication channel. The second wireless circuit 212 wirelessly communicates with the image transmission apparatus 100 via the second antenna 215. The second wireless circuit 112 and the second wireless circuit 212 perform wireless communication using one communication channel. The third wireless circuit 213 performs wireless communication with the image transmission apparatus 100 via the third antenna 216. The third wireless circuit 113 and the third wireless circuit 213 perform wireless communication using one communication channel. The first wireless circuit 211, the second wireless circuit 212, and the third wireless circuit 213 transmit necessary information to the image transmission apparatus 100 by wireless communication. The first wireless circuit 211, the second wireless circuit 212, and the third wireless circuit 213 receive image data or necessary information from the image transmission apparatus 100 by wireless communication.

The first wireless circuit 211, the second wireless circuit 212, and the third wireless circuit 213 can simultaneously perform wireless communication by using different communication channels. Therefore, the wireless communication unit 210 can perform wireless communication by simultaneously using a plurality of different communication channels.

The first wireless circuit 211 includes a first radar detection unit 2110. The third wireless circuit 213 includes a third radar detection unit 2130. The first radar detection unit 2110 and the third radar detection unit 2130 execute a detection process on radio waves of radar (radar pulses) in a communication channel that has a possibility of being used for image transmission. The first radar detection unit 2110 executes a detection process on radio waves of the radar in the communication channel set in the first wireless circuit 211. The third radar detection unit 2130 executes a detection process on radio waves of the radar in the communication channel set in the third wireless circuit 213. The first radar detection unit 2110 and the third radar detection unit 2130 can execute the detection process on the radio waves of the radar at the same time.

The ROM 221 is a nonvolatile memory such as a flash ROM. Program data for controlling the image reception apparatus 200 and various setting information including communication setting parameters are stored in the ROM 221. The RAM 222 is a volatile memory. The RAM 222 is used as a buffer, a work area, and a temporary area. The buffer is used for temporary storage of the received image data. The work area is used for calculation and the like by the control unit 230. The temporary area is used for temporarily storing various setting information and the like.

The control unit 230 is a processor such as a CPU. The control unit 230 operates in accordance with a program stored in the ROM 221. Thereby, the control unit 230 controls the operation of the image reception apparatus 200. The control unit 230 includes a channel use confirmation unit 2300. The channel use confirmation unit 2300 executes channel use confirmation, that is, CAC.

For example, a function of the control unit 230 can be implemented as a function of software by a computer of the image reception apparatus 200 reading and executing a program including a command for defining the operation of the control unit 230. An implementation form of this program is similar to an implementation form of a program implementing the function of the control unit 130.

The image reception apparatus 200 may not include the image processing unit 201. The image reception apparatus 200 may include a recording medium for recording image data.

Communication channels will be described. FIG. 4 shows communication channels of the 5 GHz band. In FIG. 4, there are 19 communication channels. A channel number A1 is a number given for convenience. A bandwidth A2 of each communication channel is 20 MHz. A classification A3 indicates a band to which each communication channel belongs. Each communication channel belongs to a band of any one of W52, W53, and W56. W52 is a band for which DFS is unnecessary. Bands other than W52, i.e., W53 and W56, are bands for which DFS is necessary. A communication channel A4 is a communication channel belonging to each band. Channel 36, channel 40, channel 44, and channel 48 belong to W52. Channel 52, channel 56, channel 60, and channel 64 belong to W53. Channel 100, channel 104, channel 108, channel 112, channel 116, channel 120, channel 124, channel 128, channel 132, channel 136, and channel 140 belong to W56. Details of FIG. 4 merely show one example at the time of filing of the present application. Details of FIG. 4 can be changed according to the Radio Law, the revision of the standards, or the like.

Because there are few communication channels in W52, the communication channels are estimated to be congested. Thus, there is much interference at W52. Therefore, if communication using a communication channel belonging to W52 is performed, switching to a communication channel belonging to a band other than W52 may be performed so that a communication time is shortened.

CAC is executed before communication using a communication channel belonging to a band other than W52, that is, W53 or W56, is performed. In CAC, the communication channel is continuously monitored for a predetermined time. In this monitoring, detecting radio waves of the radar is performed. If it is confirmed that radio waves of the radar are not detected for a predetermined time according to this monitoring, CAC is completed. After CAC is completed, it is possible to use the monitored communication channel. While CAC is executed, the channel use confirmation unit 2300 stops outputting radio waves in the communication channel from the wireless communication unit in which the communication channel on which CAC is executed is set. For example, the execution time of CAC is at least 60 seconds. The execution time of CAC is a time set by the Radio Law at the time of filing of the present application. The execution time of CAC and the communication channel in which CAC is necessary can be changed according to the revision of the Radio Law or the like.

While the communication channel belonging to W53 or W56 is used, ISM is executed in the first radar detection unit 2110 or the third radar detection unit 2130. That is, after the connection is completed on the communication channel belonging to W53 or W56, ISM is executed until the connection is stopped. In ISM, the communication channel in use is continuously monitored. In this monitoring, detecting radio waves of the radar is performed. If radio waves of the radar have been detected by ISM during the image transmission, switching of the communication channel is performed.

The state of each communication channel is managed by a channel state table. The channel state table is stored in the RAM 222. FIG. 5 shows the channel state table. The channel state table has a channel number B1, a communication channel B2, and a radar detection history B3. The channel number B1 corresponds to the channel number A1 in FIG. 4. The communication channel B2 corresponds to the communication channel A4 in FIG. 4. The radar detection history B3 indicates whether or not radio waves of the radar have been detected in the communication channel. If radio waves of the radar have been detected, 1 is recorded in the radar detection history B3. If radio waves of the radar have not been detected, 0 is recorded in the radar detection history B3.

The outline of the operation in the first embodiment will be described. In the following description, the radar detection unit corresponds to the first radar detection unit 2110 and the third radar detection unit 2130.

The wireless communication unit 110 (the transmission-side wireless communication unit) transmits image data by radio waves. The image data is generated in synchronization with an imaging clock. The image data is transmitted in the order in which the image data is generated. The wireless communication unit 210 (the reception-side wireless communication unit) receives the image data transmitted by the wireless communication unit 110 by radio waves. The radar detection unit (2110, 2130) executes a detection process on radio waves of the radar in the communication channel that has a possibility of being used for image data communication by the wireless communication unit 110 and the wireless communication unit 210. The channel use confirmation unit 2300 executes channel use confirmation (CAC) for confirming whether or not the communication channel is usable by continuously executing the detection process by the radar detection unit (2110, 2130) for a predetermined time.

The channel use confirmation unit 2300 executes CAC using a third communication channel when image data communication using a first communication channel is being performed. The first communication channel and the third communication channel are communication channels in which detection of the radar is necessary or that have a possibility of being used by the radar. The third communication channel is different from the first communication channel. The wireless communication unit 110 and the wireless communication unit 210 stop the image data communication using the first communication channel within a predetermined period from a point in time at which the radar detection unit 2110 detects the radio waves of the radar in the first communication channel while the image data communication using the first communication channel is performed. A period until the communication channel is switched from the point in time at which the radio waves of the radar are detected is within, for example, 10 seconds.

The wireless communication unit 110 and the wireless communication unit 210 start image data communication using the third communication channel within the predetermined period from the point in time at which the radio waves of the radar are detected if CAC using the third communication channel is completed at the point in time at which the radio waves of the radar are detected by the radar detection unit 2110. The wireless communication unit 110 and the wireless communication unit 210 start image data communication using a second communication channel within the predetermined period from the point in time at which the radio waves of the radar are detected by the radar detection unit 2110 if CAC using the third communication channel is not completed at the point in time at which the radio waves of the radar are detected by the radar detection unit 2110.

The second communication channel is a communication channel in which detection of the radar is not necessary or that is not used by the radar. A "predetermined period" from a point in time at which the radio waves of the radar are detected to a point in time at which image data communication is started on another communication channel within a predetermined period is, for example, 260 milliseconds (ms). This is a "total time during which an output is possible on the communication channel in which the radio waves of the radar are detected after detection of radio waves of the radar." This is a value defined in the Radio Law at the time of filing of the present application, but can be changed by the revision of the Radio Law or the like.

The following description supplements the above description. The imaging unit 101 generates image data in synchronization with an imaging clock. The image data constitutes moving-image data. Each piece of the image data is data of one frame. The wireless communication unit 110 transmits the image data by radio waves in the order in which the image data is generated. The wireless communication unit 210 receives the image data by radio waves in the order in which the image data is generated. The wireless communication unit 110 and the wireless communication unit 210 start image data communication using the second communication channel or the third communication channel after the image data communication using the first communication channel is stopped. Alternatively, the wireless communication unit 110 and the wireless communication unit 210 stop the image data communication using the first communication channel after the image data communication using the second communication channel or the third communication channel is started. The channel use confirmation unit 2300 executes CAC using a communication channel different from the communication channel used for image data communication. While CAC is executed, the channel use confirmation unit 2300 stops outputting radio waves in the communication channel from the wireless communication unit 210 in which the communication channel on which CAC is being executed is set.

The channel use confirmation unit 2300 executes CAC using the first communication channel before the image data communication using the first communication channel is performed. Also, before the image data communication using the third communication channel is performed, the channel use confirmation unit 2300 executes CAC using the third communication channel.

The first communication channel and the third communication channel are communication channels belonging to the use band of the radar. That is, the first communication channel and the third communication channel are communication channels belonging to bands other than W52. The above-described second communication channel is a communication channel belonging to W52. That is, the second communication channel is a communication channel belonging to a band other than the band used by the radar. The band other than the band used by the radar does not overlap the band used by the radar. The above-described predetermined period is a period in which communication is possible (a DFS time) defined by the Radio Law. After the radio waves of the radar are detected, it is only necessary for a total time, during which the communication using the communication channel in which the radio waves are detected may be performed, to be within the period in which communication is possible within a period (10 seconds) until the communication channel is switched. For example, the period in which communication is possible is 260 milliseconds.

The wireless communication unit 110 and the wireless communication unit 210 start transmitting image data using the second communication channel or the third communication channel within a predetermined period from a point in time at which the radio waves of the radar are detected in the first communication channel by ISM. Therefore, image transmission can be continued.

While image data communication using the second communication channel is performed, switching of the communication channel is performed in accordance with states of CAC using the communication channel set in the third wireless circuit 213 and CAC using the communication channel set in the first wireless circuit 211. That is, the communication channel to be used for image transmission is switched from the second communication channel to a communication channel used in CAC that has completed earlier. Thus, it is possible to shorten the use time of the second communication channel with much interference. Communication channel switching from the second communication channel to another communication channel is an additional matter of the first embodiment.

When image data communication using the third communication channel is being performed, CAC using the communication channel set in the first wireless circuit 211 is executed. If the radio waves of the radar are detected by ISM in the third communication channel while the image data communication using the third communication channel is performed, the communication channel is switched in accordance with a state of channel use confirmation using a communication channel set in the first wireless circuit 211. In other words, if the channel use confirmation of the first communication channel is completed at a point in time at which the radio waves of the radar are detected in the third communication channel by ISM, the communication channel to be used for the image transmission is switched from the third communication channel to a communication channel set in the first wireless circuit 211. If the channel use confirmation of the first communication channel is not completed at a point in time at which the radio waves of the radar are detected in the third communication channel by ISM, the communication channel to be used for image transmission is switched from the third communication channel to the second communication channel. The switching of the communication channel from the third communication channel to another communication channel is an additional matter of the first embodiment.

For example, if radio waves of the radar are detected during execution of CAC, use of the communication channel in which the radio waves of the radar are detected is prohibited for 30 minutes. The communication channel forbidden to use can be used 30 minutes after the use is prohibited. If there is a high possibility that radio waves of the radar are detected again even after the passage of 30 minutes from a point in time at which the use has been prohibited, use of the channel in which the radio waves of the radar are detected may be prohibited for a period longer than 30 minutes.

Details of an operation in the first embodiment will be described. The operation of the image reception apparatus 200 will be described. FIGS. 6 to 18 show a procedure of the operation of the image reception apparatus 200. FIGS. 6, 7, 8, and 9 show the procedure of the operation of the image reception apparatus 200 related to the control of the first wireless circuit 211.

When the image reception apparatus 200 is powered on, the control unit 230 initializes each functional block related to the first wireless circuit 211 (step S101). In step S101, the control unit 230 initializes setting of the communication channel, an RF1CAC timer, an RF1CAC completion flag, an operation mode of the first wireless circuit 211, and a channel state table.

In step S101, any communication channel belonging to a band other than W52 may be set in the first wireless circuit 211. For example, a communication channel corresponding to a channel number 5 is set in the first wireless circuit 211. As shown in FIG. 4, the communication channel corresponding to the channel number 5 is channel 52 belonging to W53.

The RF1CAC timer is a timer for measuring an execution time of CAC using the communication channel set in the first wireless circuit 211. For example, an initial value of the RF timer is 0. After the RF timer is initialized, the value of the RF1CAC timer increases with the passage of time. In the first embodiment, the RF1CAC timer and the RF3CAC timer are used. The RF3CAC timer is a timer for measuring the execution time of CAC using the communication channel set in the third wireless circuit 213.

The RF completion flag indicates whether or not CAC using the communication channel set in the first wireless circuit 211 has been completed. For example, an initial value of the RF1CAC completion flag is 0. In the first embodiment, an RF1CAC completion flag and an RF3CAC completion flag are used. The RF3CAC completion flag indicates whether or not CAC using the communication channel set in the third wireless circuit 213 has been completed.

Information on the communication channel set in the first wireless circuit 211 is stored in the RAM 222. The value of the RF timer and the value of the RF completion flag are stored in the RAM 222. The operation mode of the first wireless circuit 211 is set to be "initialized". Hereinafter, operation modes of the first wireless circuit 111 and the first wireless circuit 211 are referred to as an RF1 mode. Likewise, hereinafter, operation modes of the second wireless circuit 112 and the second wireless circuit 212 are referred to as an RF2 mode. Likewise, hereinafter, operation modes of the third wireless circuit 113 and the third wireless circuit 213 are referred to as an RF3 mode. Information indicating the set operation mode is stored in the RAM 222. The channel state table is stored in the RAM 222.

In step S101, the first radar detection unit 2110 starts a detection process on radio waves of the radar.

After each functional block is initialized, the channel use confirmation unit 2300 executes CAC using the communication channel set in the first wireless circuit 211 (step S102). In step S102, the process shown in FIG. 17 is executed.

Figure 17:
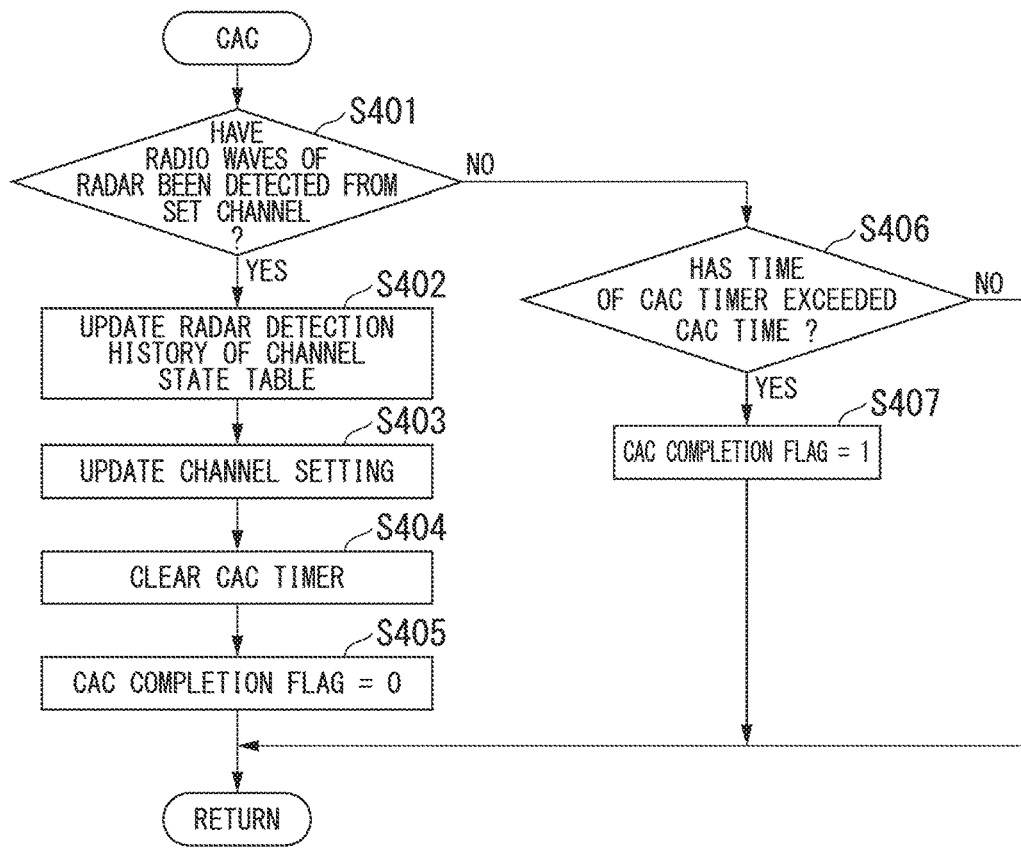
FIG. 17 is a flowchart showing a procedure of an operation of the image reception apparatus according to the first embodiment of the present invention.

FIG. 17 shows a procedure of an operation of the image reception apparatus 200 when CAC is executed. If CAC on a communication channel set in any one of the three wireless circuits is necessary, the process shown in FIG. 17 is executed. Hereinafter, processing executed in CAC using the communication channel set in the first wireless circuit 211 will be described.

The channel use confirmation unit 2300 receives information from the first radar detection unit 2110. The channel use confirmation unit 2300 determines whether or not radio waves of the radar have been detected in the communication channel set in the first wireless circuit 211 (step S401).

When it is recognized that a specific radar pulse exceeding a predetermined reference value has been received within a band to which the communication channel set in the first wireless circuit 211 belongs, the radio waves of the radar are detected. For example, a bandwidth of channel 56 of W53 is 20 MHz. A plurality of types of radar pulses are defined. The predetermined reference value is established in the Radio Law.

If the radio waves of the radar have been detected in step S401, the channel use confirmation unit 2300 updates the radar detection history of the channel state table (step S402). In step S402, 1 is recorded in the radar detection history of the communication channel set in the first wireless circuit 211 in the channel state table. In the operation of the image reception apparatus 200, as in step S401, there are a plurality of steps in which it is determined whether or not the radio waves of the radar have been detected. In these steps, if it is determined that the radio waves of the radar have been detected, the radar detection history of the channel state table is similarly updated. In the following description, the process of updating the radar detection history of the channel state table will be omitted.

After the radar detection history of the channel state table is updated, the channel use confirmation unit 2300 changes a communication channel set in the first wireless circuit 211 (step S403). In step S403, a communication channel belonging to a band other than W52 may be set in the first wireless circuit 211. For example, a communication channel whose channel number is different by one number from the channel number of the set communication channel is set in the first wireless circuit 211.

After the communication channel is changed, the channel use confirmation unit 2300 clears the RF1CAC timer (step S404). That is, the RF1CAC timer is initialized. After the RF1CAC timer is cleared, the channel use confirmation unit 2300 sets the RF1CAC completion flag to 0 (step S405).

If the radio waves of the radar have not been detected in step S401, the channel use confirmation unit 2300 determines whether or not a time indicated by the RF1CAC timer has exceeded a CAC time (step S406). The CAC time is a predetermined time during which CAC of one communication channel continues. For example, the CAC time is 60 seconds. The minimum CAC time is established in the Radio Law and may be changed according to the revision to the Radio Law.

If the time indicated by the RF timer has exceeded the CAC time in step S406, the channel use confirmation unit 2300 sets the RF completion flag to 1 (step S407). That is, if the radio waves of the radar are not continuously detected during the CAC time, CAC is completed.

After the processing in one of step S405 and step S407 is executed, the processing in step S103 is executed. Also, if the time indicated by the RF timer has not exceeded the CAC time in step S406, the processing in step S103 is executed.

After the processing is executed in step S102, the control unit 230 determines whether or not the RF1CAC completion flag is 1 (step S103). If the RF1CAC completion flag is not 1 in step S103, CAC using the communication channel set in the first wireless circuit 211 is not completed. Thus, the processing in step S102 is executed again.

If the RF2CAC completion flag is 1 in step S103, the control unit 230 performs control for performing a connection to the wireless communication unit 110 (the first wireless circuit 111) using the wireless communication unit 210 (the first wireless circuit 211) (step S104). Thereby, the wireless communication unit 210 (the first wireless circuit 211) is connected to the wireless communication unit 110 (the first wireless circuit 111). In step S104, the communication channel set when CAC is completed is used. In step S104, the process shown in FIG. 18 is executed.

Figure 18:
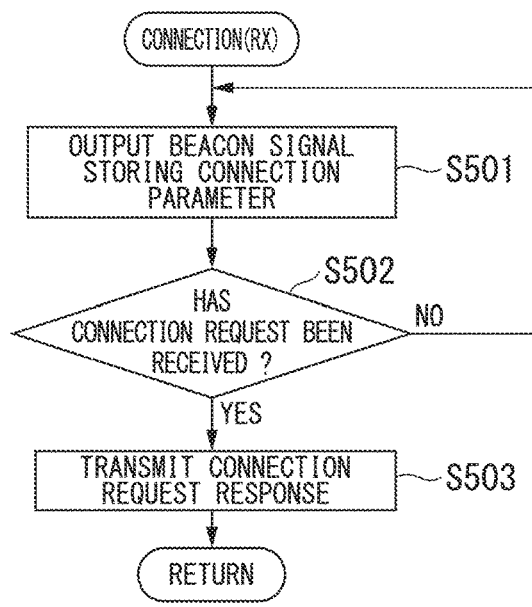
FIG. 18 is a flowchart showing a procedure of an operation of the image reception apparatus according to the first embodiment of the present invention.

FIG. 18 shows a procedure of an operation of the image reception apparatus 200 when the connection is performed. When a connection using a communication channel set in one of the three wireless circuits of the image reception apparatus 200 is performed, the process is executed in accordance with FIG. 18. Hereinafter, the process executed in the connection using the communication channel set in the first wireless circuit 211 will be described.

The control unit 230 performs control for outputting a beacon signal by radio waves using the wireless communication unit 210 (the first wireless circuit 211) (step S501). Thereby, the wireless communication unit 210 (the first wireless circuit 211) wirelessly outputs the beacon signal. Parameters necessary for a wireless connection are stored in the beacon signal. For example, the parameters are a communication channel, a media access control (MAC) address, a service set identifier (SSID), and the like. For example, the beacon signal is transmitted in broadcasting. The beacon signal may be transmitted in multicasting targeting a specific group.

After the beacon signal is output, a connection request is transmitted from the image transmission apparatus 100 that has received the beacon signal. The connection request is a packet for requesting a wireless communication connection target to perform a connection for data communication. The wireless communication unit 210 (the first wireless circuit 211) receives the connection request from the image transmission apparatus 100 by radio waves. The control unit 230 monitors the wireless communication unit 210 (the first wireless circuit 211) and determines whether or not the connection request from the image transmission apparatus 100 has been received (step S502). If the connection request from the image transmission apparatus 100 has not been received in step S502, the processing in step S501 is executed.

If the connection request from the image transmission apparatus 100 has been received in step S502, the control unit 230 performs control for transmitting a connection request response to the image transmission apparatus 100 by radio waves using the wireless communication unit 210 (the first wireless circuit 211) (step S503). Thereby, the wireless communication unit 210 (the first wireless circuit 211) transmits the connection request response to the image transmission apparatus 100 by radio waves. The connection request response is a response to the connection request. When the connection request response is received by the image transmission apparatus 100, the connection is completed. After the connection request response is transmitted, the processing in step S105 is executed.

After the connection is completed, the control unit 230 sets the RF1 mode to "image reception" (step S105). "Image reception" is a mode for receiving image data.

After the RF1 mode is set to "image reception," the control unit 230 determines whether or not the RF1 mode is "standby (connection complete)" (step S106). "Standby (connection complete)" is a standby mode after the connection is completed.

If the RF1 mode is "standby (connection complete)" in step S106, the channel use confirmation unit 2300 receives information from the first radar detection unit 2110. By confirming the received information, the channel use confirmation unit 2300 determines whether or not radio waves of the radar have been detected in the communication channel set in the first wireless circuit 211 (step S107).

If the radio waves of the radar have been detected in step S107, the channel use confirmation unit 2300 determines a communication channel to be set in the first wireless circuit 211 (step S108). In step S108, any communication channel belonging to a band other than W52 may be selected. For example, a communication channel whose channel number is different by one number from the channel number of the set communication channel may be selected. In the channel state table, a communication channel for which 1 is recorded in the radar detection history may not be selected.

After the communication channel is determined, the channel use confirmation unit 2300 changes the communication channel set in the first wireless circuit 211 (step S109). In step S109, the channel use confirmation unit 2300 sets the communication channel determined in step S108 in the first wireless circuit 211.

After the communication channel is changed, the channel use confirmation unit 2300 clears the RF1CAC timer (step S110). That is, the RF1CAC timer is initialized. After the RF1CAC timer is cleared, the channel use confirmation unit 2300 sets the RF1 mode to "CAC" (step S111). "CAC" is a mode for executing CAC. After the RF1 mode is set to "CAC," the processing in step S106 is executed.

If the RF1 mode is not "standby (connection complete)" in step S106, the control unit 230 determines whether or not the RF1 mode is "CAC" (step S112).

If the RF1 mode is "CAC" in step S112, the channel use confirmation unit 2300 executes CAC using the communication channel set in the first wireless circuit 211 (step S113). In step S113, the process shown in FIG. 17 is executed.

After the processing is executed in step S113, the control unit 230 determines whether or not the RF1CAC completion flag is 1 (step S114). If the RF1CAC completion flag is not 1 in step S114, CAC using the communication channel set in the first wireless circuit 211 is not completed. Thus, the processing in step S113 is executed again.

If the RF1CAC completion flag is 1 in step S114, the control unit 230 performs control for performing a connection to the wireless communication unit 110 (the first wireless circuit 111) using the wireless communication unit 210 (the first wireless circuit 211) (step S115). Thereby, the wireless communication unit 210 (the first wireless circuit 211) is connected to the wireless communication unit 110 (the first wireless circuit 111). In step S115, the communication channel set when CAC is completed is used. In step S115, the process shown in FIG. 18 is executed.

After the connection is completed, the control unit 230 sets the RF1 mode to "standby (connection complete)" (step S116). After the RF1 mode is set to "standby (connection complete)," the processing in step S106 is executed.

If the RF1 mode is not "CAC" in step S112, the control unit 230 determines whether or not the RF1 mode is "image reception" (step S117).

If the RF1 mode is "image reception" in step S117, the control unit 230 performs control for receiving image data from the image transmission apparatus 100 by radio waves using the wireless communication unit 210 (the first wireless circuit 211) (step S118). Thereby, the wireless communication unit 210 (the first wireless circuit 211) receives the image data from the image transmission apparatus 100 by radio waves. For example, in step S118, image data of one frame is received. The image processing unit 201 performs image processing on the received image data to generate display data. The display apparatus 300 displays an image on the basis of the display data.

After the image data is received, the channel use confirmation unit 2300 receives information from the first radar detection unit 2110. The channel use confirmation unit 2300 determines whether or not radio waves of the radar have been detected in the communication channel set in the first wireless circuit 211 by confirming the received information (step S119).

If the radio waves of the radar have not been detected in step S119, the processing in step S106 is executed. If the radio waves of the radar have been detected in step S119, the control unit 230 determines whether or not the RF3 mode is "CAC" (step S120).

If the RF3 mode is "CAC" in step S120, the control unit 230 performs control for transmitting an RF2 switching instruction by radio waves using the wireless communication unit 210 (the first wireless circuit 211) (step S121). Thereby, the wireless communication unit 210 (the first wireless circuit 211) transmits the RF2 switching instruction to the image transmission apparatus 100 by radio waves. The RF2 switching instruction is a packet indicating switching of the wireless circuit to be used for image transmission to the second wireless circuit 212.

After the RF2 switching instruction is transmitted, the control unit 230 sets the RF1 mode and the RF2 mode to "waiting for RF2" (steps S122 and S123). "Waiting for RF2" is a mode for waiting for completion of a connection between the second wireless circuit 112 and the second wireless circuit 212. After the RF1 mode and the RF2 mode are set to "waiting for RF2," the processing in step S106 is executed.

If the RF3 mode is not "CAC" in step S120, the control unit 230 performs control for transmitting an RF3 switching instruction by radio waves using the wireless communication unit 210 (the first wireless circuit 211) (step S124). Thereby, the wireless communication unit 210 (the first wireless circuit 211) transmits an RF3 switching instruction to the image transmission apparatus 100 by radio waves. The RF3 switching instruction is a packet indicating switching of the wireless circuit to be used for image transmission to the third wireless circuit 213.

After the RF3 switching instruction is transmitted, the control unit 230 sets the RF1 mode and the RF3 mode to "waiting for RF3" (steps S125 and S126). "Waiting for RF3" is a mode for waiting for completion of a connection between the third wireless circuit 113 and the third wireless circuit 213. After the RF1 mode and the RF3 mode are set to "waiting for RF3," the processing in step S106 is executed.

When the radio waves of the radar are detected in the first communication channel by ISM while the image data communication using the first communication channel is performed, switching of the communication channel is performed in accordance with a state of CAC using the third communication channel. If CAC using the third communication channel is not completed, a process of performing image data communication using the second communication channel (steps S121, S122, and S123) is performed. If CAC using the third communication channel is completed, a process of performing image data communication using the third communication channel (steps S124, S125, and S126) is executed.

If the RF1 mode is not "image reception" in step S117, the control unit 230 determines whether or not the RF1 mode is "waiting for RF3" (step S127).

If the RF1 mode is "waiting for RF3" in step S127, the control unit 230 performs control for receiving image data by radio waves using the wireless communication unit 210 (the first wireless circuit 211) (step S128). Thereby, the wireless communication unit 210 (the first wireless circuit 211) receives the image data from the image transmission apparatus 100 by radio waves. The processing in step S128 is similar to the processing in step S118. The image data communication using the first communication channel is continued until image reception preparation of the third wireless circuit 213 is completed.

After the image data is received, the control unit 230 determines whether or not the image reception preparation of the third wireless circuit 213 has been completed (step S129). In step S129, processing is executed on the basis of the information stored in the RAM 222.

If the image reception preparation by the third wireless circuit 213 is not completed in step S129, the processing in step S106 is executed. If the image reception preparation of the third wireless circuit 213 has been completed in step S129, the control unit 230 performs control for transmitting an image transmission switching instruction by radio waves using the wireless communication unit 210 (the first wireless circuit 211) (step S130). Thereby, the wireless communication unit 210 (the first wireless circuit 211) transmits the image transmission switching instruction to the image transmission apparatus 100 by radio waves. The image transmission switching instruction is a packet indicating switching of a communication channel to be used for image transmission. Because the image reception preparation of the third wireless circuit 213 has been completed, the communication channel to be used for image transmission is switched from the first communication channel to the third communication channel.

After the image transmission switching instruction is transmitted to the image transmission apparatus 100, the control unit 230 sets the RF3 mode to "image reception" (step S131). After the RF3 mode is set to "image reception," the processing in steps S132, S133, S134, and S135 is executed. The processing in steps S132, S133, S134, and S135 is similar to the processing in steps S108, S109, S110, and S111, respectively. After the processing in step S135 is executed, the processing in step S106 is executed.

If the RF1 mode is not "waiting for RF3" in step S127, the control unit 230 determines whether or not the RF1 mode is "waiting for RF2" (step S136).

If the RF1 mode is "waiting for RF2" in step S136, the control unit 230 performs control for receiving image data by radio waves using the wireless communication unit 210 (the first wireless circuit 211) (step S137). Thereby, the wireless communication unit 210 (the first wireless circuit 211) receives the image data from the image transmission apparatus 100 by radio waves. The processing in step S137 is similar to the processing in step S118. The image data communication using the first communication channel is continued until image reception preparation of the second wireless circuit 212 is completed.

After receiving the image data, the control unit 230 determines whether or not image reception preparation of the second wireless circuit 212 has been completed (step S138). In step S138, processing is executed on the basis of the information stored in the RAM 222.

If the image reception preparation of the second wireless circuit 212 has not been completed in step S138, the processing in step S106 is executed. If the image reception preparation of the second wireless circuit 212 has been completed in step S138, the control unit 230 performs control for transmitting an image transmission switching instruction by radio waves using the wireless communication unit 210 (the first wireless circuit 211) (step S139). Thereby, the wireless communication unit 210 (the first wireless circuit 211) transmits the image transmission switching instruction to the image transmission apparatus 100 by radio waves. Because the image reception preparation of the second wireless circuit 212 is completed, the communication channel to be used for image transmission is switched from the first communication channel to the second communication channel.

After the image transmission change instruction is transmitted, the control unit 230 sets the RF2 mode to "image reception" (step S140). After the RF2 mode is set to "image reception," the processing in steps S141, S142, S143, and S144 is executed. The processing in steps S141, S142, S143, and S144 is similar to the processing in steps S108, S109, S110, and S111, respectively. After the processing in step S144 is executed, the processing in step S106 is executed.

If the RF1 mode is not "waiting for RF2" in step S136, the control unit 230 determines whether or not the RF1 mode is "waiting for RF1" (step S145).

If the RF1 mode is not "waiting for RF1" in step S145, the processing in step S106 is executed. If the RF1 mode is "waiting for RF1" in step S145, image reception preparation of the first wireless circuit 211 is completed (step S146). In step S146, information indicating that the image reception preparation of the first wireless circuit 211 is completed is stored in the RAM 222. After the image reception preparation of the first wireless circuit 211 is completed, the processing in step S106 is executed.

Figure 10:
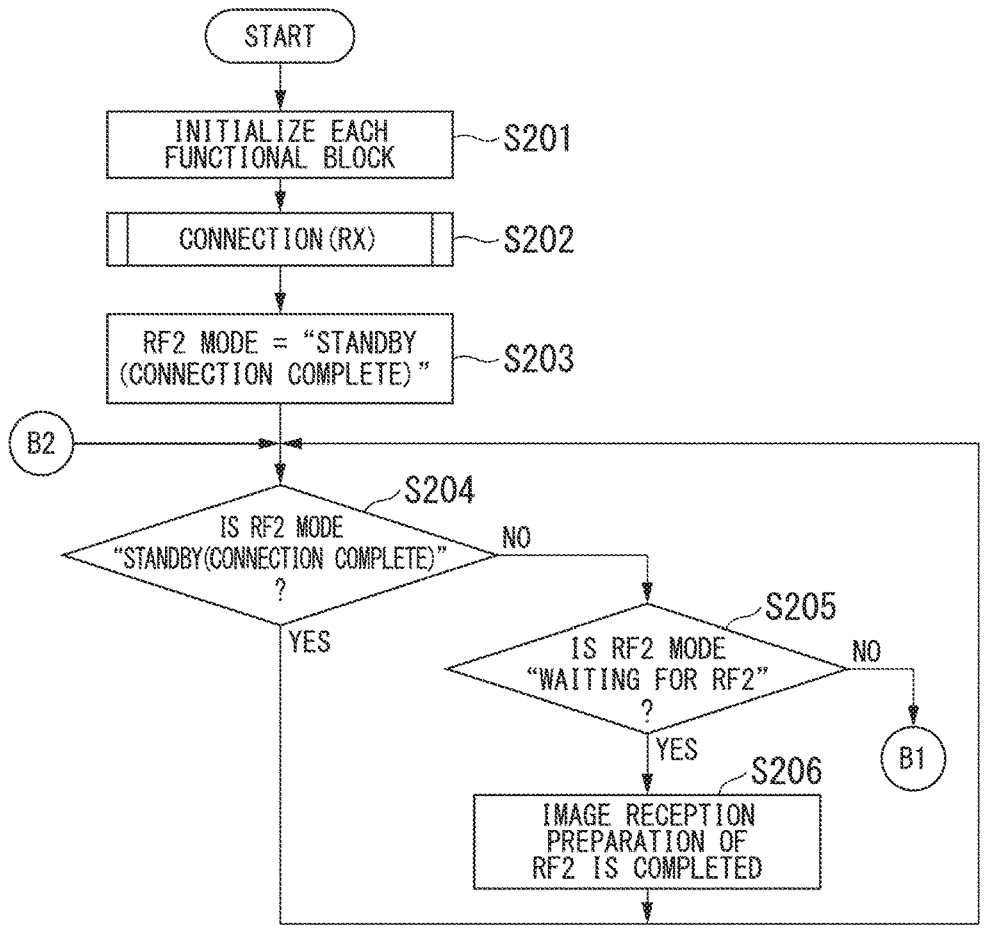
FIG. 10 is a flowchart showing a procedure of an operation of the image reception apparatus according to the first embodiment of the present invention.
Figure 11:
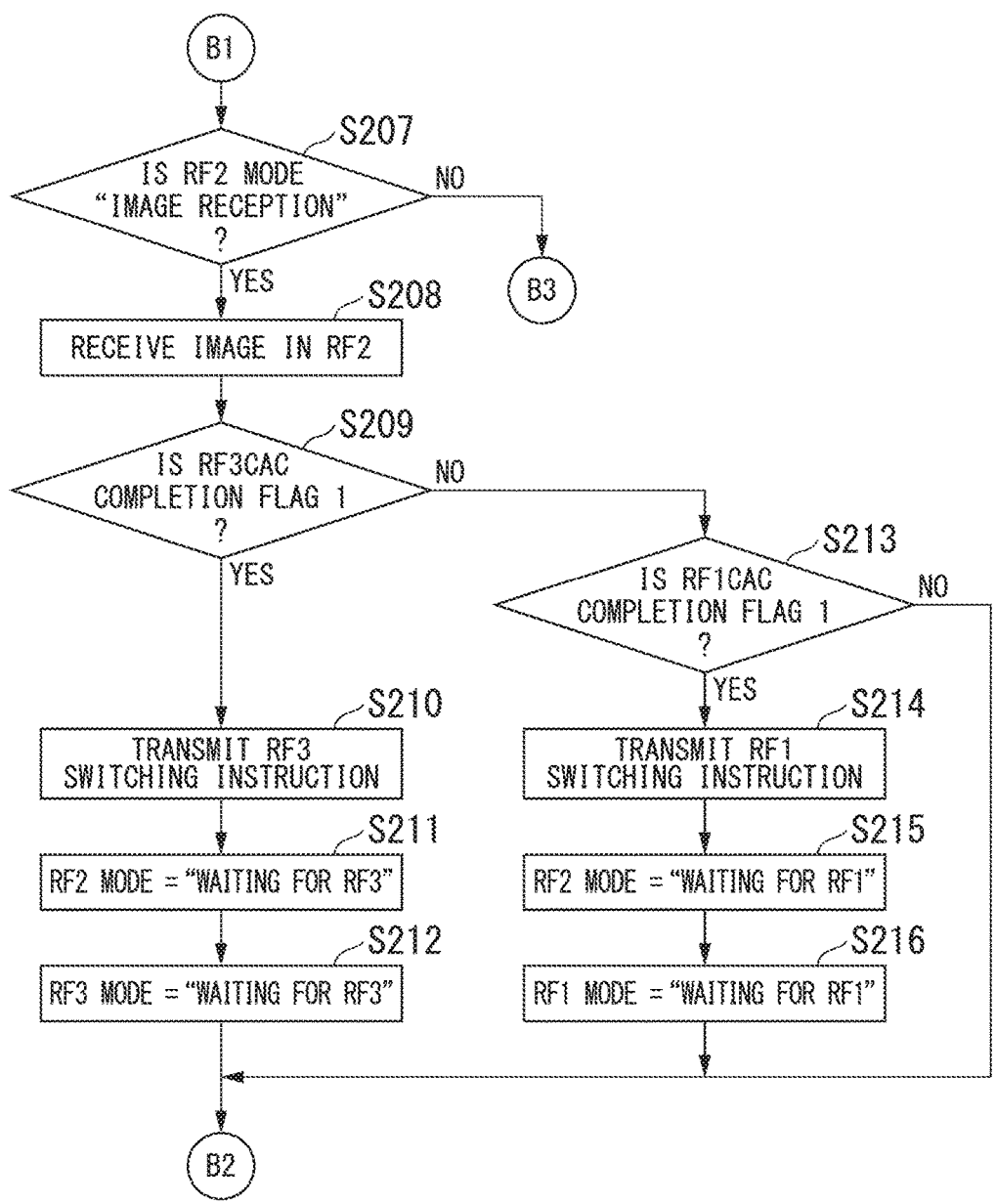
FIG. 11 is a flowchart showing a procedure of an operation of the image reception apparatus according to the first embodiment of the present invention.
Figure 12:
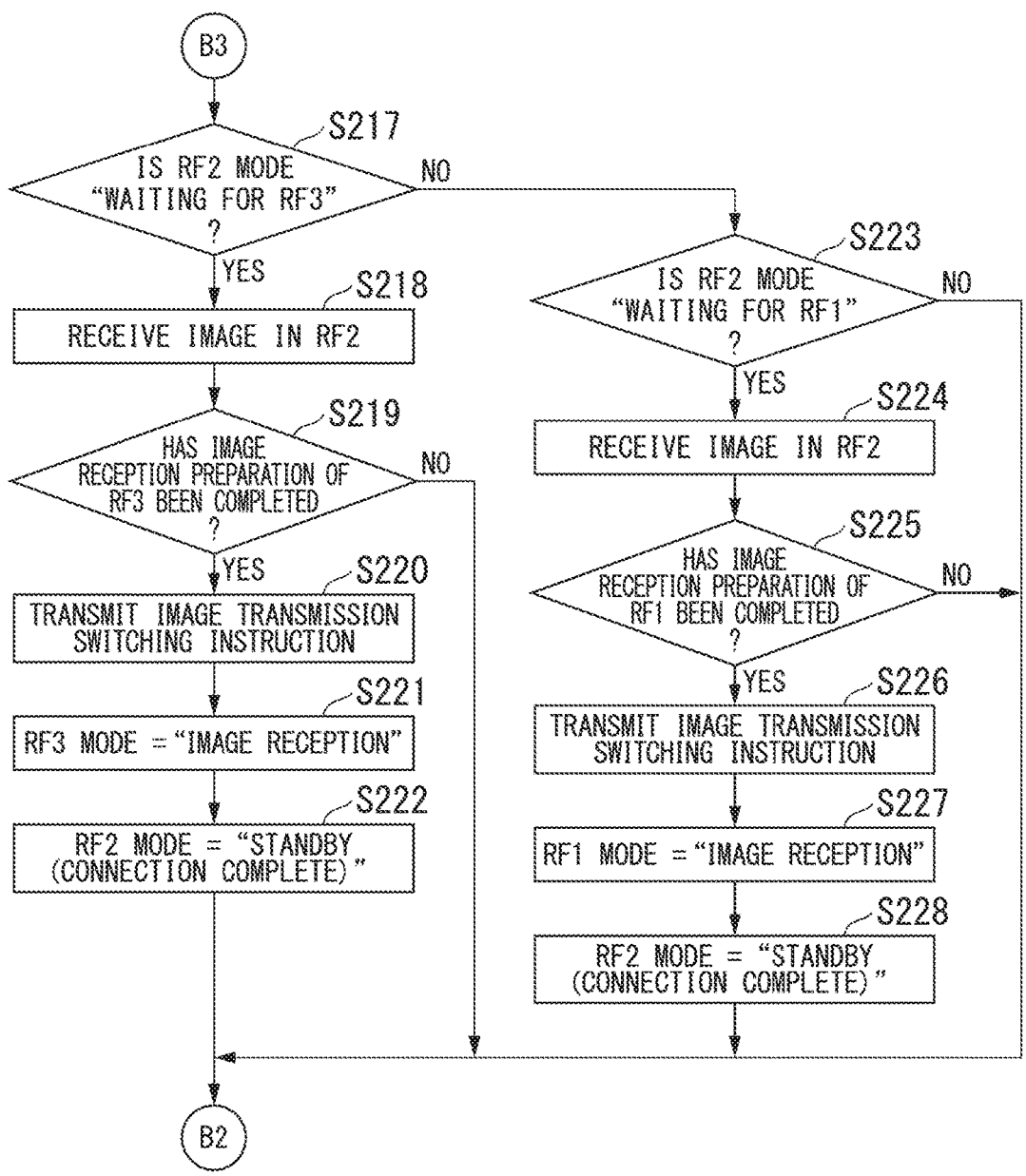
FIG. 12 is a flowchart showing a procedure of an operation of the image reception apparatus according to the first embodiment of the present invention.

FIGS. 10, 11, and 12 show a procedure of an operation of the image reception apparatus 200 related to the control of the second wireless circuit 212.

When the image reception apparatus 200 is powered on, the control unit 230 initializes each functional block related to the second wireless circuit 212 (step S201). In step S201, the control unit 230 initializes the setting of the communication channel and the operation mode of the second wireless circuit 212.

In step S201, any communication channel belonging to W52 may be set in the second wireless circuit 212. For example, a communication channel corresponding to a channel number 1 is set in the second wireless circuit 212. As shown in FIG. 4, the communication channel corresponding to the channel number 1 is channel 36 belonging to W52.

Information on the communication channel set in the second wireless circuit 212 is stored in the RAM 222. The RF2 mode is set to be "initialized." Information indicating the set operation mode is stored in the RAM 222.

After each functional block is initialized, the control unit 230 performs control for performing a connection to the wireless communication unit 110 (the second wireless circuit 112) using the wireless communication unit 210 (the second wireless circuit 212) (step S202). Thereby, the wireless communication unit 210 (the second wireless circuit 212) is connected to the wireless communication unit 110 (the second wireless circuit 112). In step S202, a communication channel set in step S201 is used. In step S202, the process shown in FIG. 18 is executed.

After the connection is completed, the control unit 230 sets the RF2 mode to "standby (connection complete)" (step S203). After the RF2 mode is set to "standby (connection complete)," the control unit 230 determines whether or not the RF2 mode is "standby (connection complete)" (step S204).

If the RF2 mode is "standby (connection complete)" in step S204, the processing in step S204 is executed again. If the RF2 mode is not "standby (connection complete)" in step S204, the control unit 230 determines whether or not the RF2 mode is "waiting for RF2" (step S205).

If the RF2 mode is "waiting for RF2" in step S205, image reception preparation of the second wireless circuit 212 is completed (step S206). In step S206, information indicating that image reception preparation of the second wireless circuit 212 is completed is stored in the RAM 222. After the image reception preparation of the second wireless circuit 212 is completed, the processing in step S204 is executed.

If the RF2 mode is not "waiting for RF2" in step S205, the control unit 230 determines whether or not the RF2 mode is "image reception" (step S207).

If the RF2 mode is "image reception" in step S207, the control unit 230 performs control for receiving image data by radio waves using the wireless communication unit 210 (the second wireless circuit 212) (step S208). Thereby, the wireless communication unit 210 (the second wireless circuit 212) receives the image data from the image transmission apparatus 100 by radio waves. For example, in step S208, image data of one frame is received. The image processing unit 201 performs image processing on the received image data to generate display data. The display apparatus 300 displays an image on the basis of the display data. A time from the detection of the radio waves of the radars in step S119 to the start of the reception of the image data in step S208 is shorter than a communicable period determined by the Radio Law (equal to the above-described "a DFS time").

After the image data is received, the control unit 230 determines whether or not the RF3CAC completion flag is 1 (step S209). If the RF3CAC completion flag is 1 in step S209, the control unit 230 performs control for transmitting an RF3 switching instruction using the wireless communication unit 210 (the second wireless circuit 212) (step S210). Thereby, the wireless communication unit 210 (the second wireless circuit 212) transmits the RF3 switching instruction to the image transmission apparatus 100.

After the RF3 switching instruction is transmitted, the control unit 230 sets the RF2 mode and the RF3 mode to "waiting for RF3" (steps S211 and S212). After the RF2 mode and the RF3 mode are set to "waiting for RF3," the processing in step S204 is executed.

If the RF3CAC completion flag is not 1 in step S209, CAC using the communication channel set in the third wireless circuit 213 is not completed. Thus, the control unit 230 determines whether or not the RF1CAC completion flag is 1 (step S213). If the RF completion flag is not 1 in step S213, the processing in step S204 is executed.

If the RF1CAC completion flag is 1 in step S213, the control unit 230 performs control for transmitting an RF1 switching instruction using the wireless communication unit 210 (the second wireless circuit 212) (step S214). Thereby, the wireless communication unit 210 (the second wireless circuit 212) transmits the RF1 switching instruction to the image transmission apparatus 100.

After the RF1 switching instruction is transmitted, the control unit 230 sets the RF2 mode and the RF1 mode to "waiting for RF1" (steps S215 and S216). After the RF2 mode and the RF1 mode are set to "waiting for RF1," the processing in step S204 is executed.

If the RF2 mode is not "image reception" in step S207, the control unit 230 determines whether or not the RF2 mode is "waiting for RF3" (step S217).

If the RF2 mode is "waiting for RF3" in step S217, the control unit 230 performs control for receiving image data by radio waves using the wireless communication unit 210 (the second wireless circuit 212) (step S218). Thereby, the wireless communication unit 210 (the second wireless circuit 212) receives the image data from the image transmission apparatus 100 by radio waves. The processing in step S218 is similar to the processing in step S208.

After the image data is received, the control unit 230 determines whether or not the image reception preparation of the third wireless circuit 213 has been completed (step S219). In step S219, processing is executed on the basis of the information stored in the RAM 222.

If the image reception preparation by the third wireless circuit 213 has not been completed in step S219, the processing in step S204 is executed. If the image reception preparation of the third wireless circuit 213 has been completed in step S219, the control unit 230 performs control for transmitting an image transmission switching instruction by radio waves using the wireless communication unit 210 (the second wireless circuit 212) (step S220). Thereby, the wireless communication unit 210 (the second wireless circuit 212) transmits the image transmission switching instruction to the image transmission apparatus 100 by radio waves. Because the image reception preparation of the third wireless circuit 213 is completed, the communication channel to be used for image transmission is switched from the second communication channel to the communication channel set in the third wireless circuit 213.

After the image transmission switching instruction is transmitted, the control unit 230 sets the RF3 mode to "image reception" (step S221). After the RF3 mode is set to "image reception," the control unit 230 sets the RF2 mode to "standby (connection complete)" (step S222). After the RF2 mode is set to "standby (connection complete)," the processing in step S204 is executed.

If the RF2 mode is not "waiting for RF3" in step S217, the control unit 230 determines whether or not the RF2 mode is "waiting for RF1" (step S223).

If the RF2 mode is not "waiting for RF1" in step S223, the processing in step S204 is executed. If the RF2 mode is "waiting for RF1" in step S223, the control unit 230 performs control for receiving image data by radio waves using the wireless communication unit 210 (the second wireless circuit 212) (step S224). Thereby, the wireless communication unit 210 (the second wireless circuit 212) receives the image data from the image transmission apparatus 100 by radio waves. The processing in step S224 is similar to the processing in step S208.

After the image data is received, the control unit 230 determines whether or not the image reception preparation of the first wireless circuit 211 has been completed (step S225). In step S225, processing is executed on the basis of the information stored in the RAM 222.

If the image reception preparation of the first wireless circuit 211 has not been completed in step S225, the processing in step S204 is executed. If the image reception preparation of the first wireless circuit 211 has been completed in step S225, the control unit 230 performs control for transmitting an image transmission switching instruction by radio waves using the wireless communication unit 210 (the second wireless circuit 212) (step S226). Thereby, the wireless communication unit 210 (the second wireless circuit 212) transmits the image transmission switching instruction to the image transmission apparatus 100 by radio waves. Because the image reception preparation of the first wireless circuit 211 is completed, the communication channel to be used for image transmission is switched from the second communication channel to the communication channel set in the first wireless circuit 211.

After the image transmission switching instruction is transmitted, the control unit 230 sets the RF1 mode to "image reception" (step S227). After the RF1 mode is set to "image reception," the control unit 230 sets the RF2 mode to "standby (connection complete)" (step S228). After the RF2 mode is set to "standby (connection complete)," the processing in step S204 is executed.

FIGS. 13, 14, 15, and 16 show a procedure of an operation of the image reception apparatus 200 related to the control of the third wireless circuit 213.

When the image reception apparatus 200 is powered on, the control unit 230 initializes each functional block related to the third wireless circuit 213 (step S301). In step S301, the control unit 230 initializes setting of the communication channel, an RF3CAC timer, an RF3CAC completion flag, and an operation mode of the third wireless circuit 213.

In step S301, any communication channel belonging to a band other than W52 may be set in the third wireless circuit 213. For example, a communication channel corresponding to a channel number 9 is set in the third wireless circuit 213. As shown in FIG. 4, the communication channel corresponding to the channel number 9 is channel 100 belonging to W56.

For example, an initial value of the RF3CAC timer is 0. After the RF3CAC timer is initialized, the value of the RF3CAC timer increases with the passage of time.

For example, an initial value of the RF3CAC completion flag is 0.

Information on the communication channel set in the third wireless circuit 213 is stored in the RAM 222. The value of the RF3CAC timer and the value of the RF3CAC completion flag are stored in the RAM 222. The RF3 mode is set to be "initialized." Information indicating the set operation mode is stored in the RAM 222.

In step S301, the third radar detection unit 2130 starts a detection process on radio waves of the radar.

After each functional block is initialized, the channel use confirmation unit 2300 executes CAC using the communication channel set in the third wireless circuit 213 (step S302). In step S302, the process shown in FIG. 17 is executed.

After the processing in step S302 is executed, the control unit 230 determines whether or not the RF3CAC completion flag is 1 (step S303). If the RF3CAC completion flag is not 1 in step S303, CAC using the communication channel set in the third wireless circuit 213 is not completed. Thus, the processing in step S302 is executed again.

If the RF3CAC completion flag is 1 in step S303, the control unit 230 performs control for performing a connection to the wireless communication unit 110 (the third wireless circuit 113) using the wireless communication unit 210 (the third wireless circuit 213) (step S304). Thereby, the wireless communication unit 210 (the third wireless circuit 213) is connected to the wireless communication unit 110 (the third wireless circuit 113). In step S304, the communication channel set when CAC is completed is used. In step S304, the process shown in FIG. 18 is executed.

After the connection is completed, the control unit 230 sets the RF3 mode to "standby (connection complete)" (step S305). After the RF3 mode is set to "standby (connection complete)," the control unit 230 determines whether or not the RF3 mode is "standby (connection complete)" (step S306).

If the RF3 mode is "standby (connection complete)" in step S306, the channel use confirmation unit 2300 receives information from the third radar detection unit 2130. By confirming the received information, the channel use confirmation unit 2300 determines whether or not radio waves of the radar have been detected in the communication channel set in the third wireless circuit 213 (step S307).

If the radio waves of the radar have been detected in step S307, the channel use confirmation unit 2300 determines a communication channel to be set in the third wireless circuit 213 (step S308). In step S308, any communication channel belonging to a band other than W52 may be selected. For example, a communication channel whose channel number is different by one number from the channel number of the set communication channel is selected. In the channel state table, the communication channel for which 1 is recorded in the radar detection history may not be selected.

After the communication channel is determined, the channel use confirmation unit 2300 changes the communication channel set in the third wireless circuit 213 (step S309). In step S309, the channel use confirmation unit 2300 sets the communication channel determined in step S308 in the third wireless circuit 213.

After the communication channel is changed, the channel use confirmation unit 2300 clears the RF3CAC timer (step S310). That is, the RF3CAC timer is initialized. After the RF3CAC timer is cleared, the channel use confirmation unit 2300 sets the RF3 mode to "CAC" (step S311). After the RF3 mode is set to "CAC," the processing in step S306 is executed.

If the RF3 mode is not "standby (connection complete)" in step S306, the control unit 230 determines whether or not the RF3 mode is "CAC" (step S312).

If the RF3 mode is "CAC" in step S312, the channel use confirmation unit 2300 executes CAC using the communication channel set in the third wireless circuit 213 (step S313). In step S313, the process shown in FIG. 17 is executed.

After the processing is executed in step S313, the control unit 230 determines whether or not the RF3CAC completion flag is 1 (step S314). If the RF3CAC completion flag is not 1 in step S314, CAC using the communication channel set in the third wireless circuit 213 is not completed. Thus, the processing in step S313 is executed again.

If the RF3CAC completion flag is 1 in step S314, the control unit 230 performs control for performing a connection to the wireless communication unit 110 (the third wireless circuit 113) using the wireless communication unit 210 (the third wireless circuit 213) (step S315). Thereby, the wireless communication unit 210 (the third wireless circuit 213) is connected to the wireless communication unit 110 (the third wireless circuit 113). In step S315, the communication channel set when CAC is completed is used. In step S315, the process shown in FIG. 18 is executed.

After the connection is completed, the control unit 230 sets the RF3 mode to "standby (connection complete)" (step S316). After the RF3 mode is set to "standby (connection complete)," the processing in step S306 is executed.

If the RF3 mode is not "CAC" in step S312, the control unit 230 determines whether or not the RF3 mode is "waiting for RF3" (step S317).

If the RF3 mode is "waiting for RF3" in step S317, image reception preparation of the third wireless circuit 213 is completed (step S318). In step S318, information indicating that the image reception preparation of the third wireless circuit 213 is completed is stored in the RAM 222. After the image reception preparation of the third wireless circuit 213 is completed, the processing in step S306 is executed.

If the RF3 mode is not "waiting for RF3" in step S317, the control unit 230 determines whether or not the RF3 mode is "image reception" (step S319).

If the RF3 mode is "image reception" in step S319, the control unit 230 performs control for receiving image data by radio waves using the wireless communication unit 210 (the third wireless circuit 213) (step S320). Thereby, the wireless communication unit 210 (the third wireless circuit 213) receives the image data from the image transmission apparatus 100 by radio waves. For example, in step S320, image data of one frame is received. The image processing unit 201 performs image processing on the received image data to generate display data. The display apparatus 300 displays an image on the basis of the display data. A time from the detection of the radio waves of the radar in step S119 to the start of the reception of the image data in step S320 is shorter than a communicable period determined by the Radio Law (equal to the above "a DFS time").

After the image data is received, the channel use confirmation unit 2300 receives information from the third radar detection unit 2130. By confirming the received information, the channel use confirmation unit 2300 determines whether or not radio waves of the radar have been detected in the communication channel set in the third wireless circuit 213 (step S321).

If radio waves of the radar have not been detected in step S321, the processing in step S306 is executed. If the radio waves of the radar have been detected in step S321, the control unit 230 determines whether or not the RF1 mode is "CAC" (step S322).

If the RF1 mode is "CAC" in step S322, the control unit 230 performs control for transmitting an RF2 switching instruction by radio waves using the wireless communication unit 210 (the third wireless circuit 213) (step S323). Thereby, the wireless communication unit 210 (the third wireless circuit 213) transmits the RF2 switching instruction to the image transmission apparatus 100 by radio waves.

After the RF2 switching instruction is transmitted, the control unit 230 sets the RF3 mode and the RF2 mode to "waiting for RF2" (steps S324 and S325). After the RF1 mode and the RF2 mode are set to "waiting for RF2," the processing in step S306 is executed.

If the RF1 mode is not "CAC" in step S322, the control unit 230 performs control for transmitting an RF1 switching instruction by radio waves using the wireless communication unit 210 (the third wireless circuit 213) (step S326). Thereby, the wireless communication unit 210 (the third wireless circuit 213) transmits an RF1 switching instruction to the image transmission apparatus 100 by radio waves.

After the RF1 switching instruction is transmitted, the control unit 230 sets the RF3 mode and the RF1 mode to "waiting for RF1" (steps S327 and S328). After the RF3 mode and the RF1 mode are set to "waiting for RF1," the processing in step S306 is executed.

If the RF3 mode is not "image reception" in step S319, the control unit 230 determines whether or not the RF3 mode is "waiting for RF1" (step S329).

If the RF3 mode is "waiting for RF1" in step S329, the control unit 230 performs control for receiving image data by radio waves using the wireless communication unit 210 (the third wireless circuit 213) (step S330). Thereby, the wireless communication unit 210 (the third wireless circuit 213) receives the image data from the image transmission apparatus 100 by radio waves. The processing in step S330 is similar to the processing in step S320.

After receiving the image data, the control unit 230 determines whether or not the image reception preparation of the first wireless circuit 211 has been completed (step S331). In step S331, processing is executed on the basis of the information stored in the RAM 222.

If the image reception preparation of the first wireless circuit 211 has not been completed in step S331, the processing in step S306 is executed. If image reception preparation of the first wireless circuit 211 has been completed in step S331, the control unit 230 performs control for transmitting an image transmission switching instruction by radio waves using the wireless communication unit 210 (the third wireless circuit 213) (step S332). Thereby, the wireless communication unit 210 (the third wireless circuit 213) transmits the image transmission switching instruction to the image transmission apparatus 100 by radio waves. Because the image reception preparation of the first wireless circuit 211 is completed, the communication channel to be used for image transmission is switched from the third communication channel to the communication channel set in the first wireless circuit 211.

After the image transmission switching instruction is transmitted, the control unit 230 sets the RF1 mode to "image reception" (step S333). After the RF1 mode is set to "image reception," the processing in steps S334, S335, S336, and S337 is executed. The processing in steps S334, S335, S336, and S337 is similar to the processing in steps S308, S309, S310, and S311, respectively. After the processing in step S337 is executed, the processing in step S306 is executed.

If the RF3 mode is not "waiting for RF1" in step S329, the control unit 230 determines whether or not the RF3 mode is "waiting for RF2" (step S338).

If the RF3 mode is not "waiting for RF2" in step S338, the processing in step S306 is executed. If the RF3 mode is "waiting for RF2" in step S338, the control unit 230 performs control for receiving image data by radio waves using the wireless communication unit 210 (the third wireless circuit 213) (step S339). Thereby, the wireless communication unit 210 (the third wireless circuit 213) receives the image data from the image transmission apparatus 100 by radio waves. The processing in step S339 is similar to the processing in step S320.

After the image data is received, the control unit 230 determines whether or not image reception preparation of the second wireless circuit 212 has been completed (step S340). In step S340, processing is executed on the basis of the information stored in the RAM 222.

If the image reception preparation by the second wireless circuit 212 has not been completed in step S340, the processing in step S306 is executed. If the image reception preparation of the second wireless circuit 212 has been completed in step S340, the control unit 230 performs control for transmitting an image transmission switching instruction by radio waves using the wireless communication unit 210 (the third wireless circuit 213) (step S341). Thereby, the wireless communication unit 210 (the third wireless circuit 213) transmits the image transmission switching instruction to the image transmission apparatus 100 by radio waves. Because the image reception preparation of the second wireless circuit 212 is completed, the communication channel to be used for image transmission is switched from the third communication channel to the second communication channel.

After the image transmission switching instruction is transmitted, the control unit 230 sets the RF2 mode to "image reception" (step S342). After the RF2 mode is set to "image reception," the processing in steps S343, S344, S345, and S346 is executed. The processing in steps S343, S344, S345, and S346 is similar to the processing in steps S308, S309, S310, and S311, respectively. After the processing in step S346 is executed, the processing in step S306 is executed.

As described above, when the radio waves of the radar are detected in the first communication channel by ISM while the image data communication using the first communication channel is performed, the communication channel is switched in accordance with a state of CAC using the third communication channel. If CAC using the third communication channel is completed at a point in time at which the radio waves of the radar are detected (corresponding to step S119), the wireless communication unit 210 (the third wireless circuit 213) starts image data communication using the third communication channel within a predetermined period (equal to "period in which communication is possible (a DFS time) defined by the Radio Law.")(corresponding to steps S126, S131, S318, and S320). If CAC using the third communication channel is not completed at the point in time at which the radio waves of the radar are detected (step S119), the wireless communication unit 210 (the second wireless circuit 212) starts image data communication using the second communication channel within a predetermined period (equal to "period in which communication is possible (a DFS time) defined by the Radio Law.") (corresponding to S123, S140, S206, and S208). The wireless communication unit 210 (the first wireless circuit 211) stops the image data communication using the first communication channel within a predetermined period (equal to "period in which communication is possible (a DFS time) defined by the Radio Law.") from the point in time at which the radio waves of the radar are detected (corresponding to step S119) (corresponding to steps S122, S125, S132, S133, S141, S142, S206, and S318).

As described above, while image data communication using the second communication channel is performed, the communication channel is switched in accordance with states of CAC using the communication channel set in the third wireless circuit 213 and CAC using the communication channel set in the first wireless circuit 211. If CAC using the communication channel set in the third wireless circuit 213 is completed, the wireless communication unit 210 (the third wireless circuit 213) starts image data communication using the communication channel on which CAC is completed (corresponding to steps S212, S221, S318, and S320) and the wireless communication unit 210 (the second wireless circuit 212) stops the image data communication using the second communication channel (corresponding to steps S211, S222, and S318). If CAC using the communication channel set in the first wireless circuit 211 is completed, the wireless communication unit 210 (the first wireless circuit 211) starts image data communication using the communication channel on which CAC is completed (corresponding to steps S227, S146, and S118) and the wireless communication unit 210 (the second wireless circuit 212) stops the image data communication using the second communication channel (corresponding to steps S215, S228, and S146).

As described above, when the radio waves of the radar are detected in the third communication channel by ISM while the image data communication using the third communication channel is performed, the communication channel is switched in accordance with a state of CAC using the communication channel set in the first wireless circuit 211. If CAC using the communication channel set in the first wireless circuit 211 is not completed at the point in time at which the radio waves of the radar are detected (step S321), the wireless communication unit 210 (the second wireless circuit 212) starts the image data communication using the second communication channel (corresponding to steps S325, S342, S206, and S208). If CAC using the communication channel set in the first wireless circuit 211 is completed at the point in time at which the radio waves of the radar are detected (step S321), the wireless communication unit 210 (the first wireless circuit 211) starts image data communication using the communication channel on which CAC is completed (corresponding to steps S328, S333, S146, and S118). The wireless communication unit 210 (the third wireless circuit 213) stops the image data communication using the third communication channel within a predetermined period (equal to "period in which communication is possible (a DFS time) defined by the Radio Law.") from the point in time at which the radio waves of the radar are detected (step S321) (corresponding to steps S324, S327, S334, S335, S343, S344, S146, and S206).

Figure 19:
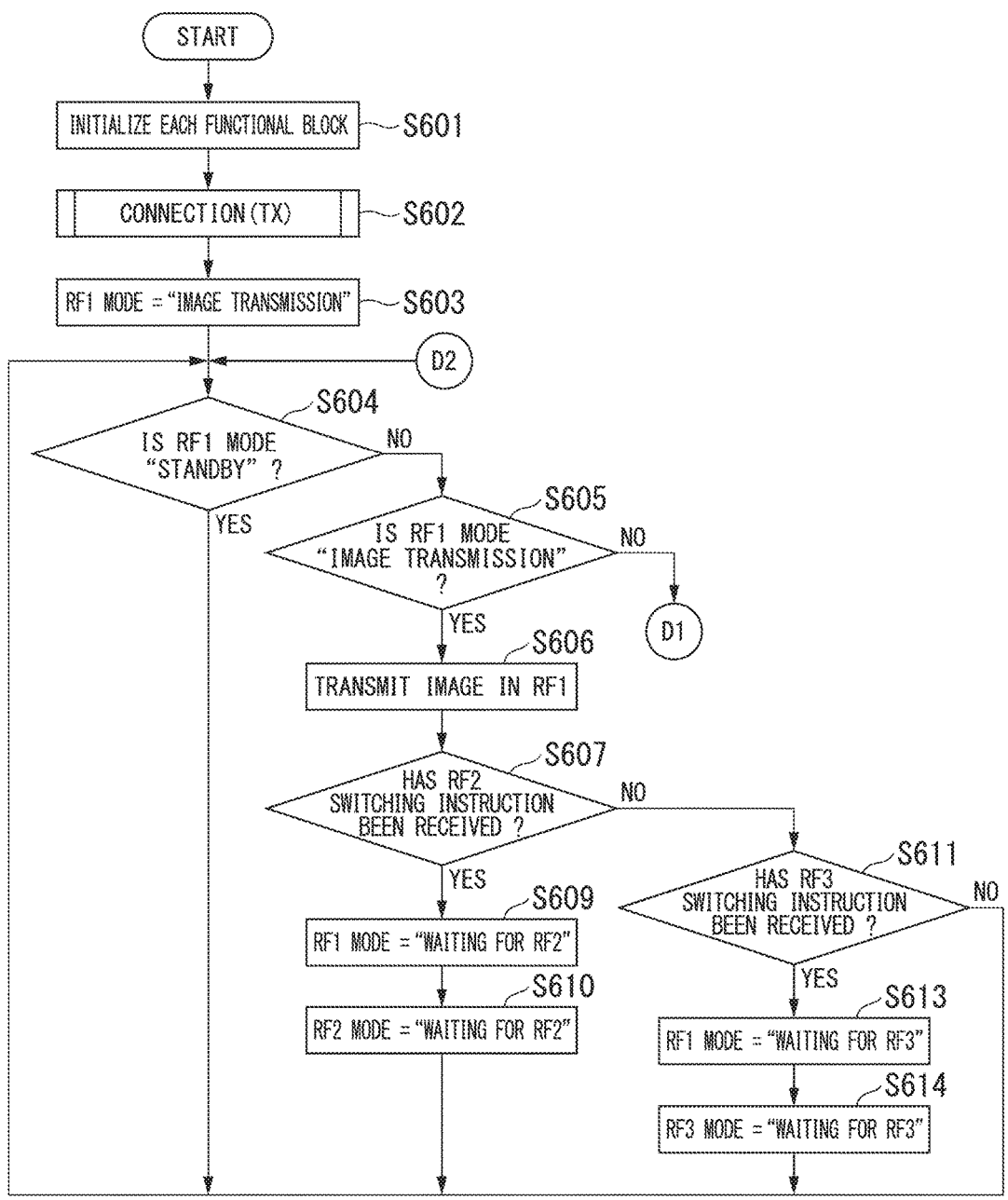
FIG. 19 is a flowchart showing a procedure of an operation of the image transmission apparatus according to the first embodiment of the present invention.
Figure 20:
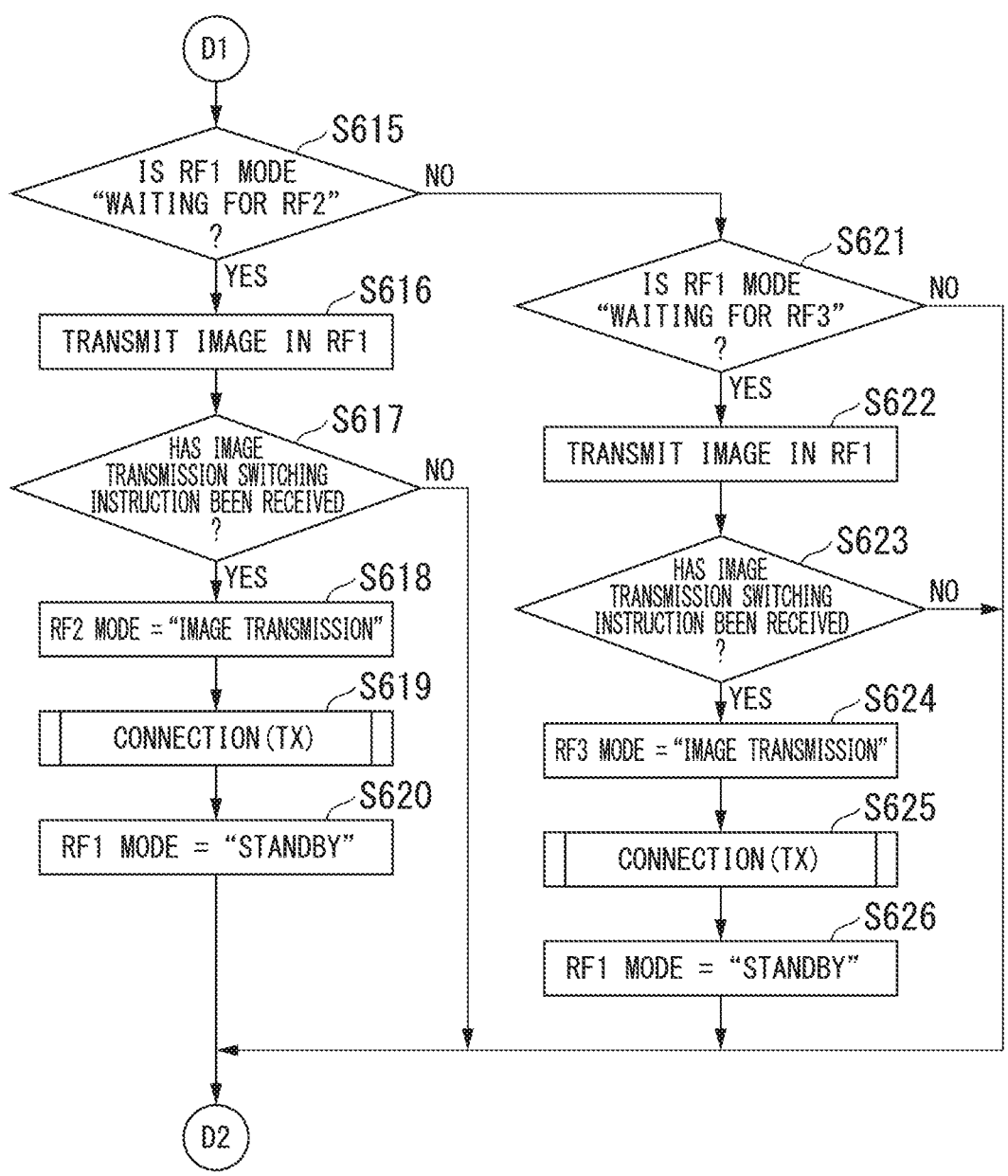
FIG. 20 is a flowchart showing a procedure of an operation of the image transmission apparatus according to the first embodiment of the present invention.

The operation of the image transmission apparatus 100 will be described. FIGS. 19 to 25 show a procedure of an operation of the image transmission apparatus 100. FIGS. 19 and 20 show a procedure of an operation of the image transmission apparatus 100 related to the control of the first wireless circuit 111.

When the image transmission apparatus 100 is powered on, the control unit 130 initializes each functional block related to the first wireless circuit 111 (step S601). In step S601, the control unit 130 initializes the setting of the communication channel, the SSID, and the operation mode of the first wireless circuit 111.

In step S601, any communication channel may be set in the first wireless circuit 111. Information on the communication channel set in the first wireless circuit 111 is stored in the RAM 122. The SSID is stored in the RAM 122. The operation mode of the first wireless circuit 111 is set to be "initialized." Information indicating the set operation mode is stored in the RAM 122.

In step S601, the imaging unit 101 starts imaging. Also, the image processing unit 102 starts image processing.

Figure 25:
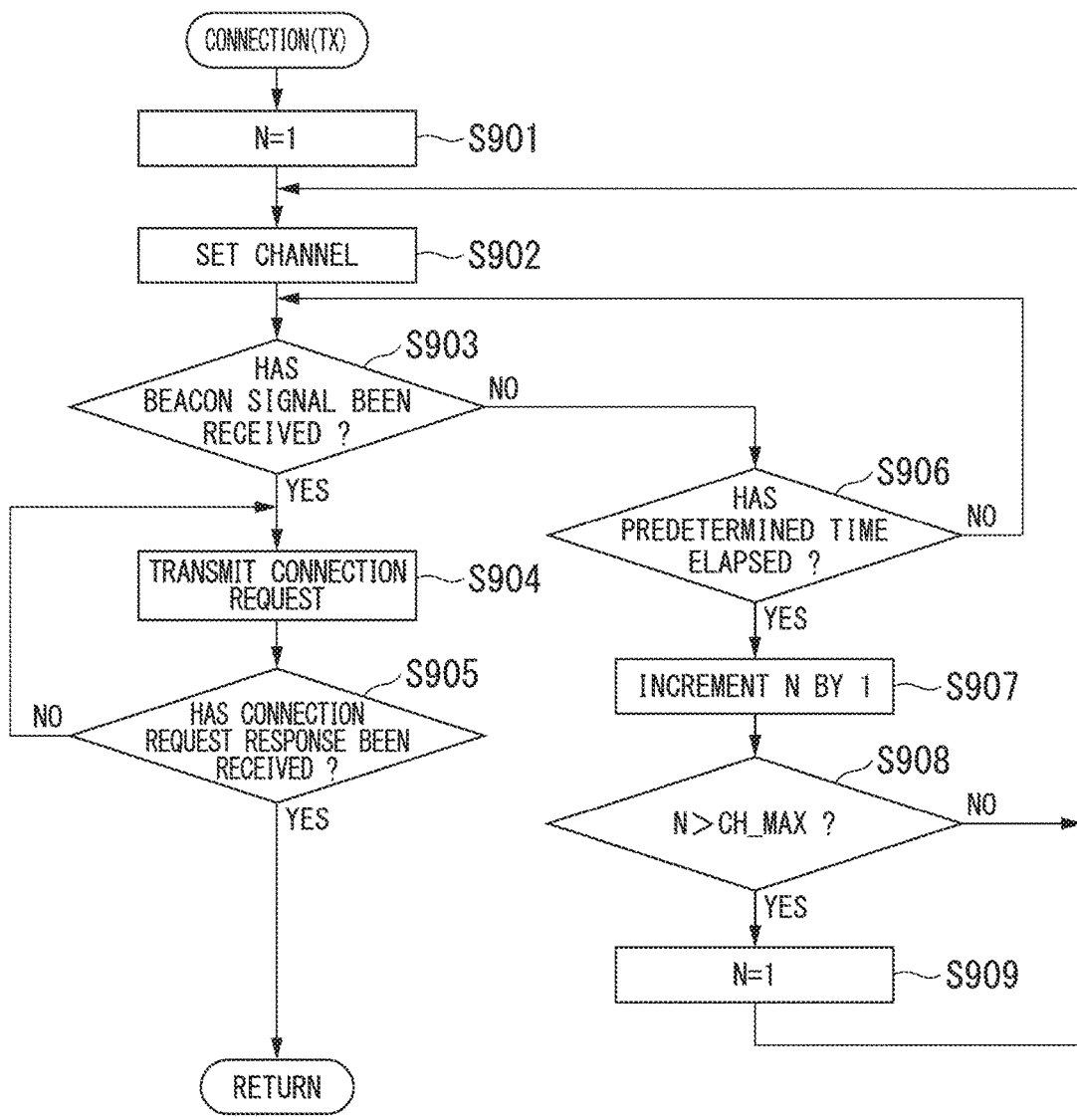
FIG. 25 is a flowchart showing a procedure of an operation of the image transmission apparatus according to the first embodiment of the present invention.

After each functional block is initialized, the control unit 130 performs control for performing a connection to the wireless communication unit 210 (the first wireless circuit 211) using the wireless communication unit 110 (the first wireless circuit 111) (step S602). Thereby, the wireless communication unit 110 (the first wireless circuit 111) is connected to the wireless communication unit 210 (the first wireless circuit 211). In step S602, the process shown in FIG. 25 is executed. Step S602 is associated with step S104.

FIG. 25 shows a procedure of an operation of the image transmission apparatus 100 when the connection is performed. When a connection using a communication channel set in any one of the three wireless circuits of the image transmission apparatus 100 is performed, the process is executed in accordance with FIG. 25. Hereinafter, a process executed in the connection using the communication channel set in the first wireless circuit 111 will be described.

The control unit 130 sets a variable N to 1 (step S901). The variable N corresponds to the channel number A1 shown in FIG. 4.

After the variable N is set to 1, the control unit 130 sets a communication channel in the first wireless circuit 111 (step S902). In step S902, the control unit 130 sets the communication channel corresponding to the variable N in the first wireless circuit 111. For example, if the variable N is 1, a communication channel corresponding to a channel number 1 is set in the first wireless circuit 111. As shown in FIG. 4, the communication channel corresponding to the channel number 1 is channel 36 belonging to W52.

After the communication channel is set, the control unit 130 monitors the wireless communication unit 110 (the first wireless circuit 111) and determines whether or not a beacon signal has been received (step S903). If the communication channel set in the wireless communication unit 110 (the first wireless circuit 111) is the same as the communication channel set in the wireless communication unit 210 (the first wireless circuit 211), the wireless communication unit 110

(the first wireless circuit 111) receives a beacon signal by radio waves. Until the beacon signal is received, outputting the radio waves from the first wireless circuit 111 is stopped.

If the beacon signal has been received in step S903, the control unit 130 performs control for transmitting a connection request by radio waves using the wireless communication unit 110 (the first wireless circuit 111) (step S904). Thereby, the wireless communication unit 110 (the first wireless circuit 111) transmits the connection request to the image reception apparatus 200 by radio waves.

After the connection request is transmitted, a connection request response is transmitted from the image reception apparatus 200 that has received the connection request. The wireless communication unit 110 (the first wireless circuit 111) receives the connection request response by radio waves. The control unit 130 monitors the wireless communication unit 110 (the first wireless circuit 111) and determines whether or not the connection request response has been received (step S905).

If the connection request response has not been received in step S905, the processing in step S904 is executed. If the connection request response has been received in step S905, the connection is completed. After the connection is completed, the processing in step S603 is executed.

If the beacon signal has not been received in step S903, the control unit 130 determines whether or not a predetermined time has elapsed from a point in time at which the communication channel was set in the first wireless circuit 111 (corresponding to step S902) (step S906). The predetermined time is different from the time concerning DFS. The time concerning DFS is the CAC time, the period in which communication is possible (260 milliseconds), the period in which communication is possible (10 seconds), and the like. If the predetermined time has not elapsed, the processing in step S903 is executed.

If the predetermined time has elapsed, the control unit 130 increments the variable N by 1 (step S907). After the variable N is incremented by 1, the control unit 130 determines whether or not the variable N is larger than a maximum channel number CH_MAX (step S908). As shown in FIG. 4, the maximum channel number CH_MAX is 19.

If the variable N is less than or equal to the maximum channel number CH_MAX in step S908, the processing in step S902 is executed. If the variable N is larger than the maximum channel number CH_MAX in step S908, the control unit 130 sets the variable N to 1 (step S909). After the variable N is set to 1, the processing in step S902 is executed.

After the connection is completed, the control unit 130 sets the RF1 mode to "image transmission" (step S603). "Image transmission" is a mode for transmitting image data.

After the RF1 mode is set to "image transmission," the control unit 130 determines whether or not the RF1 mode is "standby" (step S604). "Standby" is a standby mode in which a connection is not performed.

If the RF1 mode is "standby" in step S604, the determination in step S604 is executed again. If the RF1 mode is not "standby" in step S604, the control unit 130 determines whether or not the RF1 mode is "image transmission" (step S605).

If the RF1 mode is "image transmission" in step S605, the control unit 130 performs control for transmitting image data by radio waves using the wireless communication unit 110 (the first wireless circuit 111) (step S606). Thereby, the wireless communication unit 110 (the first wireless circuit 111) transmits the image data to the image reception apparatus 200 by radio waves. In step S606, image data of one frame is transmitted.

After the image data is transmitted, the control unit 130 monitors the wireless communication unit 110 (the first wireless circuit 111) and determines whether or not the RF2 switching instruction has been received (step S607). The wireless communication unit 110 (the first wireless circuit 111) receives the RF2 switching instruction from the image reception apparatus 200 transmitted in step S121 or step S323 by radio waves.

If the RF2 switching instruction has been received in step S607, the control unit 130 sets the RF1 mode and the RF2 mode to "waiting for RF2" (steps S609 and S610). After the RF1 mode and the RF2 mode are set to "waiting for RF2," the processing in step S604 is executed.

If the RF2 switching instruction has not been received in step S607, the control unit 130 monitors the wireless communication unit 110 (the first wireless circuit 111) and determines whether or not an RF3 switching instruction has been received (step S611). The wireless communication unit 110 (the first wireless circuit 111) receives the RF3 switching instruction from the image reception apparatus 200 transmitted in step S124 by radio waves.

If the RF3 switching instruction has been received in step S611, the control unit 130 sets the RF1 mode and the RF3 mode to "waiting for RF3" (steps S613 and S614). After the RF1 mode and the RF3 mode are set to "waiting for RF3," the processing in step S604 is executed.

If the RF1 mode is not "image transmission" in step S605, the control unit 130 determines whether or not the RF1 mode is "waiting for RF2" (step S615).

If the RF1 mode is "waiting for RF2" in step S615, the control unit 130 performs control for transmitting image data by radio waves using the wireless communication unit 110 (the first wireless circuit 111) (step S616). Thereby, the wireless communication unit 110 (the first wireless circuit 111) transmits the image data to the image reception apparatus 200 by radio waves. The processing in step S616 is similar to the processing in step S606.

After the image data is transmitted, the control unit 130 monitors the wireless communication unit 110 (the first wireless circuit 111) and determines whether or not an image transmission switching instruction has been received (step S617). The wireless communication unit 110 (the first wireless circuit 111) receives the image transmission switching instruction from the image reception apparatus 200 transmitted in step S139 by radio waves.

If the image transmission switching instruction has not been received in step S617, the processing in step S604 is executed. If the image transmission switching instruction has been received in step S617, the control unit 130 sets the RF2 mode to "image transmission" (step S618).

After the RF2 mode is set to "image transmission," the control unit 130 performs control for performing a connection to the wireless communication unit 210 (the first wireless circuit 211) using the wireless communication unit 110 (the first wireless circuit 111) (step S619). Thereby, the wireless communication unit 110 (the first wireless circuit 111) is connected to the wireless communication unit 210 (the first wireless circuit 211). In step S619, the process shown in FIG. 25 is executed. Step S619 is associated with step S115.

After the connection is completed, the control unit 130 sets the RF1 mode to "standby" (step S620). After the RF1 mode is set to "standby," the processing in step S604 is executed.

If the RF1 mode is not "waiting for RF2" in step S615, the control unit 130 determines whether or not the RF1 mode is "waiting for RF3" (step S621).

If the RF1 mode is "waiting for RF3" in step S621, the control unit 130 performs control for transmitting image data by radio waves using the wireless communication unit 110 (the first wireless circuit 111) (step S622). Thereby, the wireless communication unit 110 (the first wireless circuit 111) transmits the image data to the image reception apparatus 200 by radio waves. The processing in step S622 is similar to the processing in step S606.

After the image data is transmitted, the control unit 130 monitors the wireless communication unit 110 (the first wireless circuit 111) and determines whether or not an image transmission switching instruction has been received (step S623). The wireless communication unit 110 (the first wireless circuit 111) receives the image transmission switching instruction from the image reception apparatus 200 transmitted in step S130 by radio waves.

If the image transmission switching instruction has not been received in step S623, the processing in step S604 is executed. If the image transmission switching instruction has been received in step S623, the control unit 130 sets the RF3 mode to "image transmission" (step S624).

After the RF3 mode is set to "image transmission," the control unit 130 performs control for performing a connection to the wireless communication unit 210 (the first wireless circuit 211) using the wireless communication unit 110 (the first wireless circuit 111) (step S625). Thereby, the wireless communication unit 110 (the first wireless circuit 111) is connected to the wireless communication unit 210 (the first wireless circuit 211). In step S625, the process shown in FIG. 25 is executed. Step S625 is associated with step S115.

After the connection is completed, the control unit 130 sets the RF1 mode to "standby" (step S626). After the RF1 mode is set to "standby," the processing in step S604 is executed.

Figure 21:
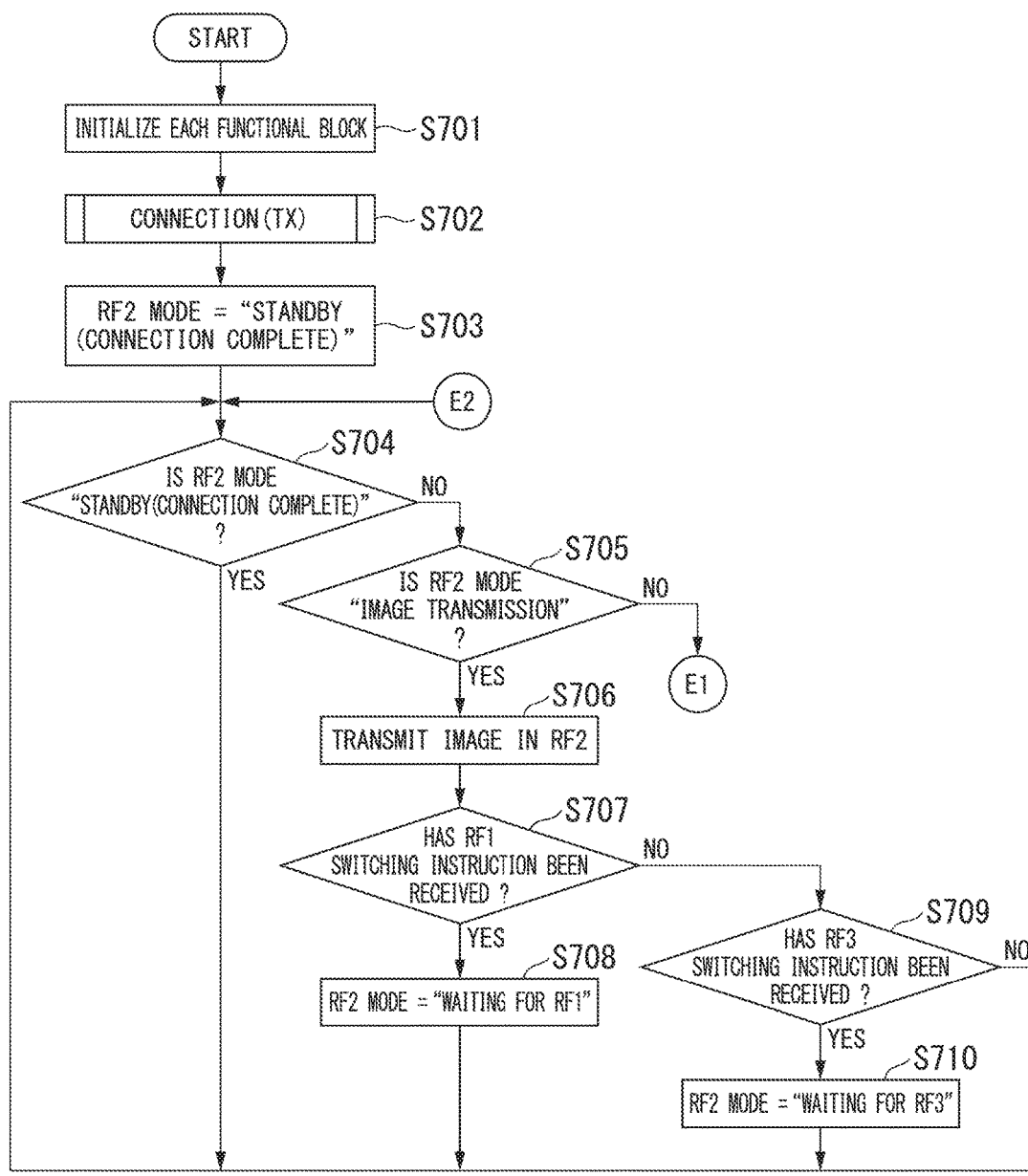
FIG. 21 is a flowchart showing a procedure of an operation of the image transmission apparatus according to the first embodiment of the present invention.
Figure 22:
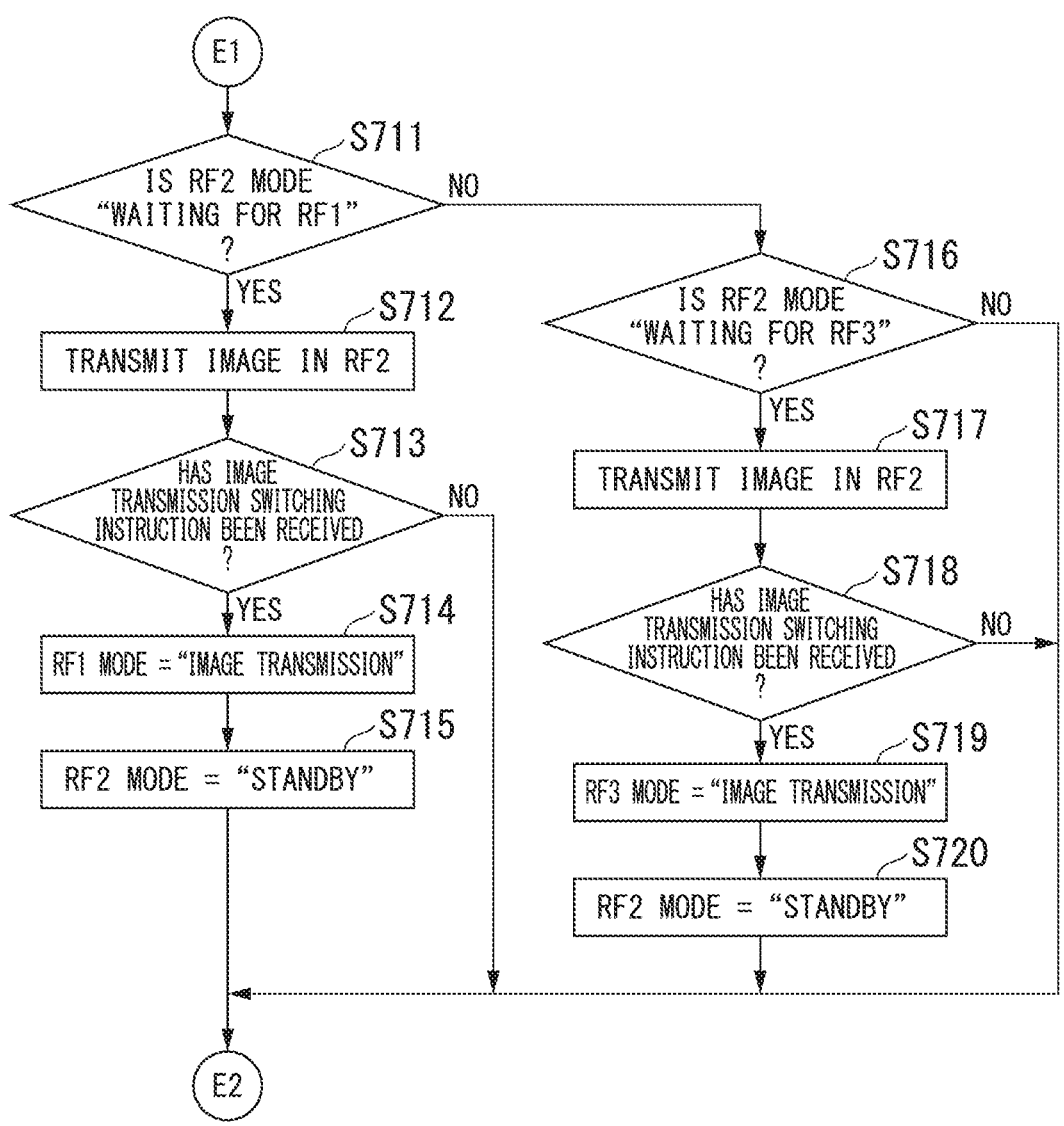
FIG. 22 is a flowchart showing a procedure of an operation of the image transmission apparatus according to the first embodiment of the present invention.

FIGS. 21 and 22 show a procedure of an operation of the image transmission apparatus 100 related to the control of the second wireless circuit 112.

When the image transmission apparatus 100 is powered on, the control unit 130 initializes each function block related to the second wireless circuit 112 (step S701). In step S701, the control unit 130 initializes the setting of the communication channel, the SSID, and the operation mode of the second wireless circuit 112.

In step S701, any communication channel may be set in the second wireless circuit 112. Information on the communication channel set in the second wireless circuit 112 is stored in the RAM 122. The SSID is stored in the RAM 122. The operation mode of the second wireless circuit 112 is set to be "initialized." Information indicating the set operation mode is stored in the RAM 122.

After each function block is initialized, the control unit 130 performs control for performing a connection to the wireless communication unit 210 (the second wireless circuit 212) using the wireless communication unit 110 (the second wireless circuit 112) (step S702). Thereby, the wireless communication unit 110 (the second wireless circuit 112) is connected to the wireless communication unit 210 (the second wireless circuit 212). In step S702, the process shown in FIG. 25 is executed.

The second wireless circuit 112 and the second wireless circuit 212 use a communication channel belonging to W52. Thus, in step S702, only the communication channel belonging to W52 may be set in the second wireless circuit 112. In this case, radio waves may be output from the second wireless circuit 112 because DFS procedure is not necessary for the communication channels belonging to W52.

After the connection is completed, the control unit 130 sets the RF2 mode to "standby (connection complete)" (step S703). After the RF2 mode is set to "standby (connection complete)," the control unit 130 determines whether or not the RF2 mode is "standby (connection complete)" (step S704).

If the RF2 mode is "standby" in step S704, the determination in step S704 is executed again. If the RF2 mode is not "standby" in step S704, the control unit 130 determines whether or not the RF2 mode is "image transmission" (step S705).

If the RF2 mode is "image transmission" in step S705, the control unit 130 performs control for transmitting image data by radio waves using the wireless communication unit 110 (the second wireless circuit 112) (step S706). Thereby, the wireless communication unit 110 (the second wireless circuit 112) transmits image data to the image reception apparatus 200 by radio waves. For example, in step S706, image data of one frame is transmitted.

After the image data is transmitted, the control unit 130 monitors the wireless communication unit 110 (the second wireless circuit 112) and determines whether or not an RF1 switching instruction has been received (step S707). The wireless communication unit 110 (the second wireless circuit 112) receives the RF1 switching instruction from the image reception apparatus 200 transmitted in step S214 by radio waves.

If the RF1 switching instruction has been received in step S707, the control unit 130 sets the RF2 mode to "waiting for RF1" (step S708). After the RF2 mode is set to "waiting for RF1," the processing in step S704 is executed.

If the RF1 switching instruction has not been received in step S707, the control unit 130 monitors the wireless communication unit 110 (the second wireless circuit 112) and determines whether or not the RF3 switching instruction has been received (step S709). The wireless communication unit 110 (the second wireless circuit 112) receives the RF3 switching instruction from the image reception apparatus 200 transmitted in step S210 by radio waves.

If the RF3 switching instruction has not been received in step S709, the processing in step S704 is executed. If the RF3 switching instruction has been received in step S709, the control unit 130 sets the RF2 mode to "waiting for RF3" (step S710). After the RF2 mode is set to "waiting for RF3," the processing in step S704 is executed.

If the RF2 mode is not "image transmission" in step S705, the control unit 130 determines whether or not the RF2 mode is "waiting for RF1" (step S711).

If the RF2 mode is "waiting for RF1" in step S711, the control unit 130 performs control for transmitting image data by radio waves using the wireless communication unit 110 (the second wireless circuit 112) (step S712). Thereby, the wireless communication unit 110 (the second wireless circuit 112) transmits image data to the image reception apparatus 200 by radio waves. The processing in step S712 is similar to the processing in step S706.

After the image data is transmitted, the control unit 130 monitors the wireless communication unit 110 (the second wireless circuit 112) and determines whether or not an image transmission switching instruction has been received (step S713). The wireless communication unit 110 (the second wireless circuit 112) receives the image transmission switching instruction transmitted from the image reception apparatus 200 in step S226 by radio waves.

If the image transmission switching instruction has not been received in step S713, the processing in step S704 is executed. If the image transmission switching instruction has been received in step S713, the control unit 130 sets the RF1 mode to "image transmission" (step S714). After the RF1 mode is set to "image transmission," the control unit 130 sets the RF2 mode to "standby" (step S715). After the RF2 mode is set to "standby," the processing in step S704 is executed.

If the RF2 mode is not "waiting for RF1" in step S711, the control unit 130 determines whether or not the RF2 mode is "waiting for RF3" (step S716).

If the RF2 mode is "waiting for RF3" in step S716, the control unit 130 performs control for transmitting image data by radio waves using the wireless communication unit 110 (the second wireless circuit 112) (step S717). Thereby, the wireless communication unit 110 (the second wireless circuit 112) transmits image data to the image reception apparatus 200 by radio waves. The processing in step S717 is similar to the processing in step S706.

After the image data is transmitted, the control unit 130 monitors the wireless communication unit 110 (the second wireless circuit 112) and determines whether or not an image transmission switching instruction has been received (step S718). The wireless communication unit 110 (the second wireless circuit 112) receives the image transmission switching instruction transmitted from the image reception apparatus in step S220 by radio waves.

If the image transmission switching instruction has not been received in step S718, the processing in step S704 is executed. If the image transmission switching instruction has been received in step S718, the control unit 130 sets the RF3 mode to "image transmission" (step S719). After the RF3 mode is set to "image transmission," the control unit 130 sets the RF2 mode to "standby" (step S720). After the RF2 mode is set to "standby," the processing in step S704 is executed.

Figure 23:
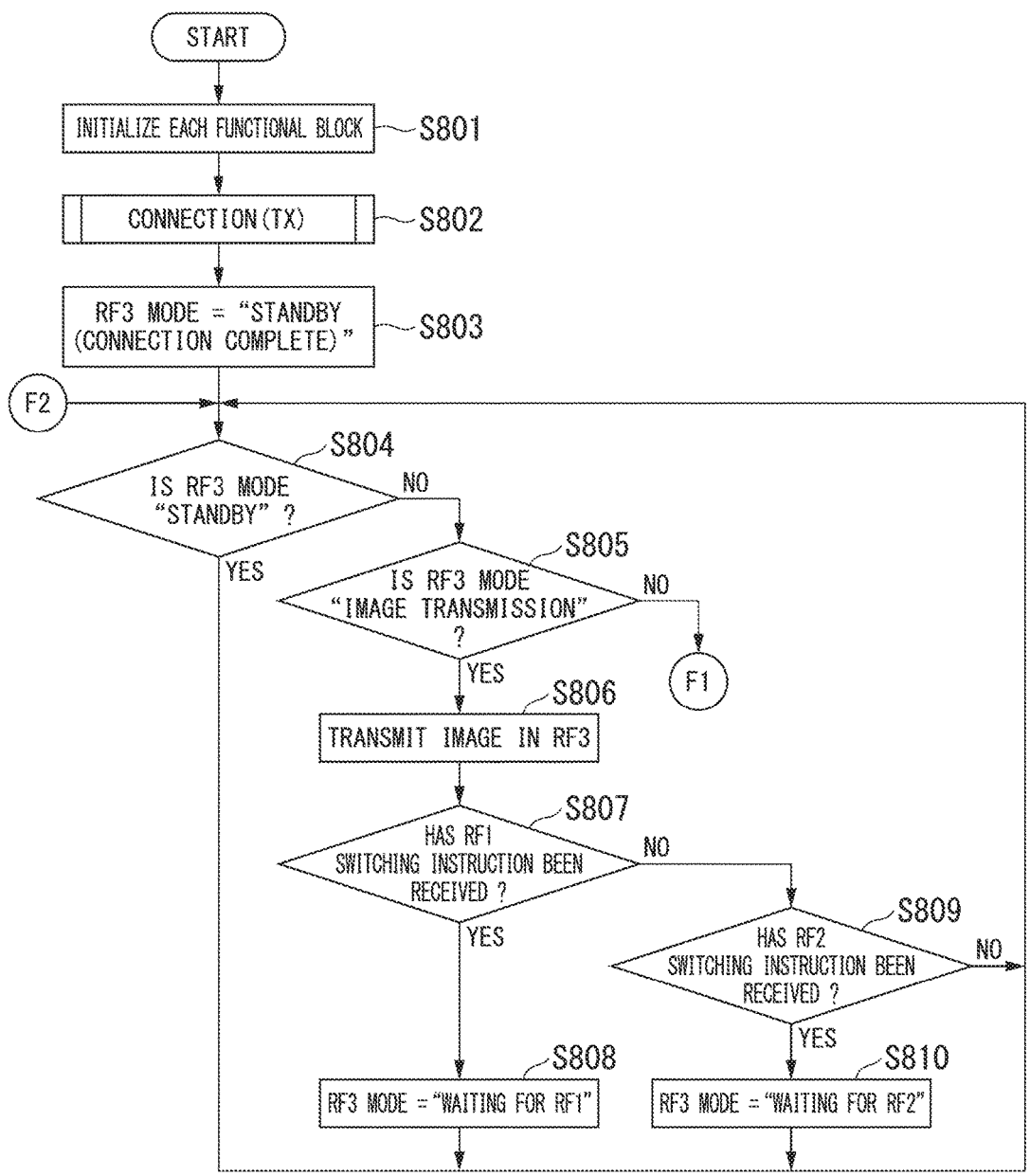
FIG. 23 is a flowchart showing a procedure of an operation of the image transmission apparatus according to the first embodiment of the present invention.
Figure 24:
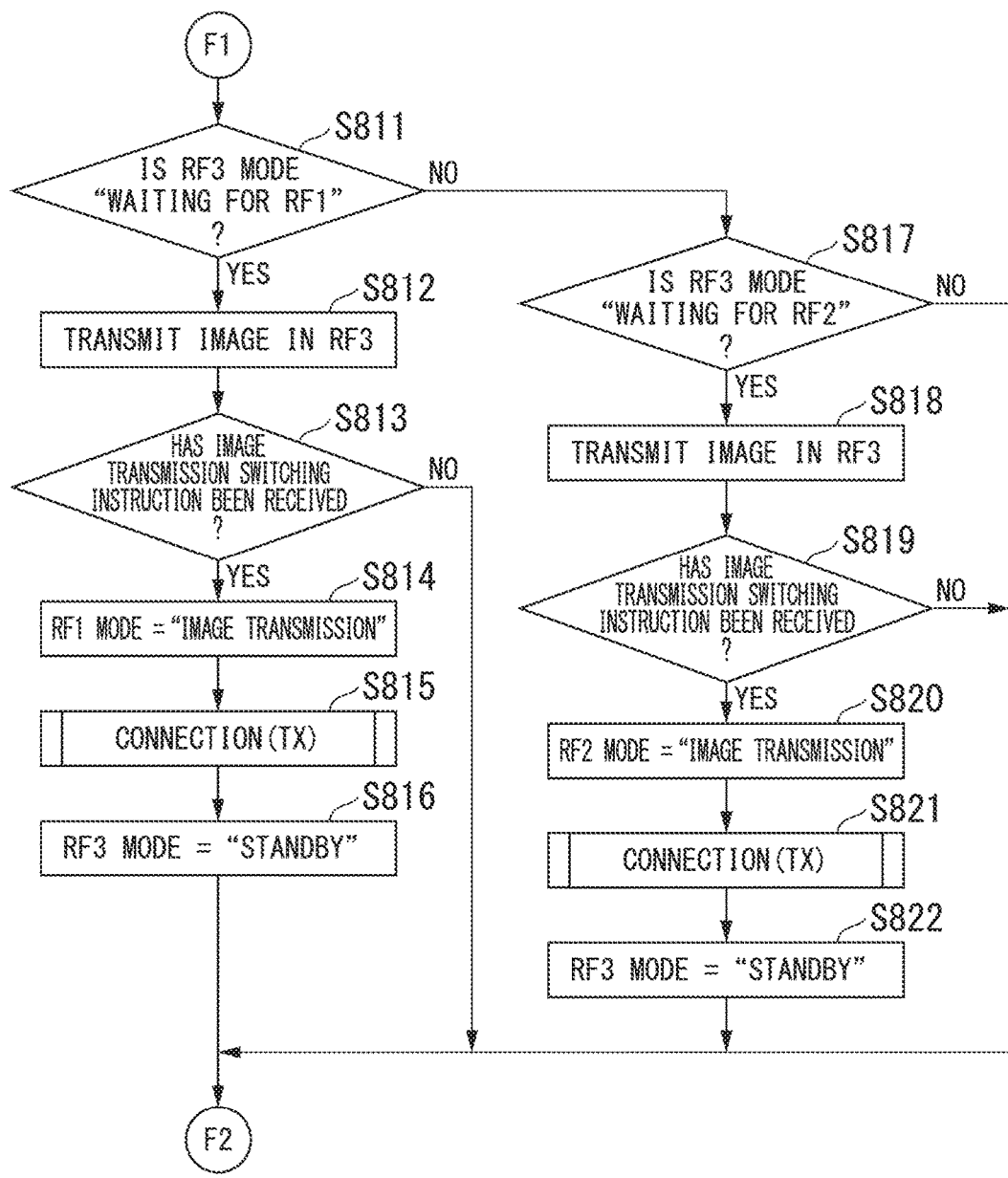
FIG. 24 is a flowchart showing a procedure of an operation of the image transmission apparatus according to the first embodiment of the present invention.

FIGS. 23 and 24 show a procedure of an operation of the image transmission apparatus 100 related to the control of the third wireless circuit 113.

When the image transmission apparatus 100 is powered on, the control unit 130 initializes each functional block related to the third wireless circuit 113 (step S801). In step S801, the control unit 130 initializes the setting of the communication channel, the SSID, and the operation mode of the third wireless circuit 113.

In step S801, any communication channel may be set in the third wireless circuit 113. Information on the communication channel set in the third wireless circuit 113 is stored in the RAM 122. The SSID is stored in the RAM 122. The operation mode of the third wireless circuit 113 is set to be "initialized." Information indicating the set operation mode is stored in the RAM 122.

After each functional block is initialized, the control unit 130 performs control for performing a connection to the wireless communication unit 210 (the third wireless circuit 213) using the wireless communication unit 110 (the third wireless circuit 113) (step S802). Thereby, the wireless communication unit 110 (the third wireless circuit 113) is connected to the wireless communication unit 210 (the third wireless circuit 213). In step S802, the process shown in FIG. 25 is executed.

After the connection is completed, the control unit 130 sets the RF3 mode to "standby (connection complete)" (step S803). After the RF3 mode is set to "standby (connection complete)," the control unit 130 determines whether or not the RF3 mode is "standby" (step S804).

If the RF3 mode is "standby" in step S804, the determination in step S804 is executed again. If the RF3 mode is not "standby" in step S804, the control unit 130 determines whether or not the RF3 mode is "image transmission" (step S805).

If the RF3 mode is "image transmission" in step S805, the control unit 130 performs control for transmitting image data by radio waves using the wireless communication unit 110 (the third wireless circuit 113) (step S806). Thereby, the wireless communication unit 110 (the third wireless circuit 113) transmits the image data to the image reception apparatus 200 by radio waves. For example, in step S806, image data of one frame is transmitted.

After the image data is transmitted, the control unit 130 monitors the wireless communication unit 110 (the third wireless circuit 113) and determines whether or not an RF1 switching instruction has been received (step S807). The wireless communication unit 110 (the third wireless circuit 113) receives the RF1 switching instruction transmitted from the image reception apparatus 200 in step S326 by radio waves.

If the RF1 switching instruction has been received in step S807, the control unit 130 sets the RF3 mode to "waiting for RF1" (step S808). After the RF3 mode is set to "waiting for RF1," the processing in step S804 is executed.

If the RF1 switching instruction has not been received in step S807, the control unit 130 monitors the wireless communication unit 110 (the third wireless circuit 113) and determines whether or not the RF2 switching instruction has been received (step S809). The wireless communication unit 110 (the third wireless circuit 113) receives the RF2 switching instruction from the image reception apparatus 200 transmitted in step S323 by radio waves.

If the RF2 switching instruction has not been received in step S809, the processing in step S804 is executed. If the RF2 switching instruction has been received in step S809, the control unit 130 sets the RF3 mode to "waiting for RF2" (step S810). After the RF3 mode is set to "waiting for RF2," the processing in step S804 is executed.

If the RF3 mode is not "image transmission" in step S805, the control unit 130 determines whether or not the RF3 mode is "waiting for RF1" (step S811).

If the RF3 mode is "waiting for RF1" in step S811, the control unit 130 performs control for transmitting image data by radio waves using the wireless communication unit 110 (the third wireless circuit 113) (step S812). Thereby, the wireless communication unit 110 (the third wireless circuit 113) transmits the image data to the image reception apparatus 200 by radio waves. The processing in step S812 is similar to the processing in step S806.

After the image data is transmitted, the control unit 130 monitors the wireless communication unit 110 (the third wireless circuit 113) and determines whether or not an image transmission switching instruction has been received (step S813). The wireless communication unit 110 (the third wireless circuit 113) receives the image transmission switching instruction from the image reception apparatus 200 transmitted in step S332 by radio waves.

If the image transmission switching instruction has not been received in step S813, the processing in step S804 is executed. If the image transmission switching instruction has been received in step S813, the control unit 130 sets the RF1 mode to "image transmission" (step S814).

After the RF1 mode is set to "image transmission," the control unit 130 performs control for performing a connection to the wireless communication unit 210 (the third wireless circuit 213) using the wireless communication unit 110 (the third wireless circuit 113) (step S815). Thereby, the wireless communication unit 110 (the third wireless circuit 113) is connected to the wireless communication unit 210 (the third wireless circuit 213). In step S815, the process shown in FIG. 25 is executed. Step S815 is associated with step S315.

After the connection is completed, the control unit 130 sets the RF3 mode to "standby" (step S816). After the RF3 mode is set to "standby," the processing in step S804 is executed.

If the RF3 mode is not "waiting for RF1" in step S811, the control unit 130 determines whether or not the RF3 mode is "waiting for RF2" (step S817).

If the RF3 mode is "waiting for RF2" in step S817, the control unit 130 performs control for transmitting image data by radio waves using the wireless communication unit 110 (the third wireless circuit 113) (step S818). Thereby, the wireless communication unit 110 (the third wireless circuit 113) transmits the image data to the image reception apparatus 200 by radio waves. The processing in step S818 is similar to the processing in step S806.

After the image data is transmitted, the control unit 130 monitors the wireless communication unit 110 (the third wireless circuit 113) and determines whether or not an image transmission switching instruction has been received (step S819). The wireless communication unit 110 (the third wireless circuit 113) receives the image transmission switching instruction from the image reception apparatus 200 transmitted in step S341 by radio waves.

If the image transmission switching instruction has not been received in step S819, the processing in step S804 is executed. If the image transmission switching instruction has been received in step S819, the control unit 130 sets the RF2 mode to "image transmission" (step S820).

After the RF2 mode is set to "image transmission," the control unit 130 performs control for performing a connection to the wireless communication unit 210 (the third wireless circuit 213) using the wireless communication unit 110 (the third wireless circuit 113) (step S821). Thereby, the wireless communication unit 110 (the third wireless circuit 113) is connected to the wireless communication unit 210 (the third wireless circuit 213). In step S821, the process shown in FIG. 25 is executed. Step S821 is associated with step S315.

After the connection is completed, the control unit 130 sets the RF3 mode to "standby" (step S822). After the RF3 mode is set to "standby," the processing in step S804 is executed.

Figure 26:
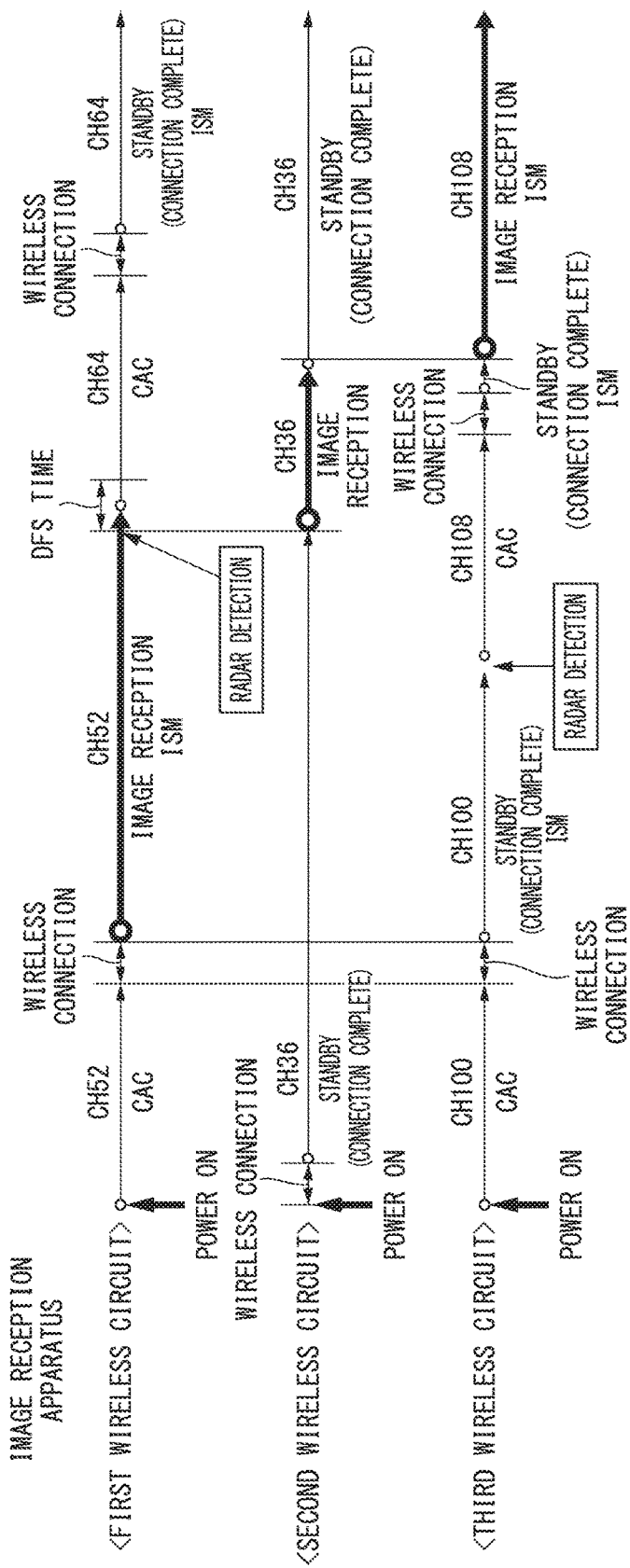
FIG. 26 is a sequence diagram showing an operation of each wireless circuit included in the image reception apparatus according to the first embodiment of the present invention.

FIG. 26 shows an operation of each wireless circuit included in the image reception apparatus 200. After the image reception apparatus 200 is powered on, CAC using channel 52 belonging to a band other than W52 is executed in the first wireless circuit 211 (corresponding to step S102). After CAC is completed, the first wireless circuit 211 is connected to the first wireless circuit 111 using channel 52 (corresponding to step S104). After the connection is completed, the first wireless circuit 211 receives the image data using channel 52 (the first communication channel) (corresponding to step S118). When image data is being received, ISM is executed in the first wireless circuit 211 (corresponding to step S119).

After the image reception apparatus 200 is powered on, the second wireless circuit 212 is connected to the second wireless circuit 112 using channel 36 belonging to W52 (corresponding to step S202). After the connection is completed, the second wireless circuit 212 is on standby (corresponding to step S203).

After the image reception apparatus 200 is powered on, CAC using channel 100 belonging to the band other than W52 is executed in the third wireless circuit 213 (corresponding to step S302). After CAC is completed, the third wireless circuit 213 is connected to the third wireless circuit 113 using channel 100 (corresponding to step S304). After the connection is completed, the third wireless circuit 213 is on standby (corresponding to step S305). During standby, ISM is executed in the third wireless circuit 213 (corresponding to step S307). If radio waves of the radar are detected (corresponding to step S307), the communication channel is changed to channel 108 in the third wireless circuit 213 and CAC is executed (corresponding to steps S308 to S311 and step S313). After CAC is completed, the third wireless circuit 213 is connected to the third wireless circuit 113 using channel 108 (the third communication channel) (corresponding to step S315). After the connection is completed, the third wireless circuit 213 is on standby (corresponding to step S316). During standby, ISM is executed in the third wireless circuit 213 (corresponding to step S307).

When the first wireless circuit 211 is receiving image data, radio waves of the radar are detected (corresponding to step S119). Because CAC using the third communication channel is not completed at this point in time, the communication channel to be used for image transmission is switched from the first communication channel to the second communication channel (steps S121 to S123, steps S139 to S144, and step S206). Thereby, the second wireless circuit 212 receives image data using channel 36 (the second communication channel) (corresponding to step S208). Switching of the communication channel is performed within a DFS time from a point in time at which the radio waves of the radar are detected. Also, the first wireless circuit 211 stops receiving the image data after the switching of the communication channel.

After receiving of the image data is stopped, CAC using channel 64 different from channel 52 used for receiving the image data is executed in the first wireless circuit 211 (corresponding to step S113). After CAC is completed, the first wireless circuit 211 is connected to the first wireless circuit 111 using channel 64 (corresponding to step S115). After the connection is completed, the first wireless circuit 211 is on standby (corresponding to step S116).

If CAC is completed in the third wireless circuit 213 after the second wireless circuit 212 starts receiving the image data, the communication channel to be used for image transmission is switched from the second communication channel to the third communication channel (corresponding to steps S210 to S212, steps S220 to S222, and step S318). Thereby, the third wireless circuit 213 receives the image data using channel 108 (corresponding to step S320). When image data is being received, ISM is executed in the third wireless circuit 213 (corresponding to step S321). Also, the second wireless circuit 212 stops receiving the image data.

Figure 27:
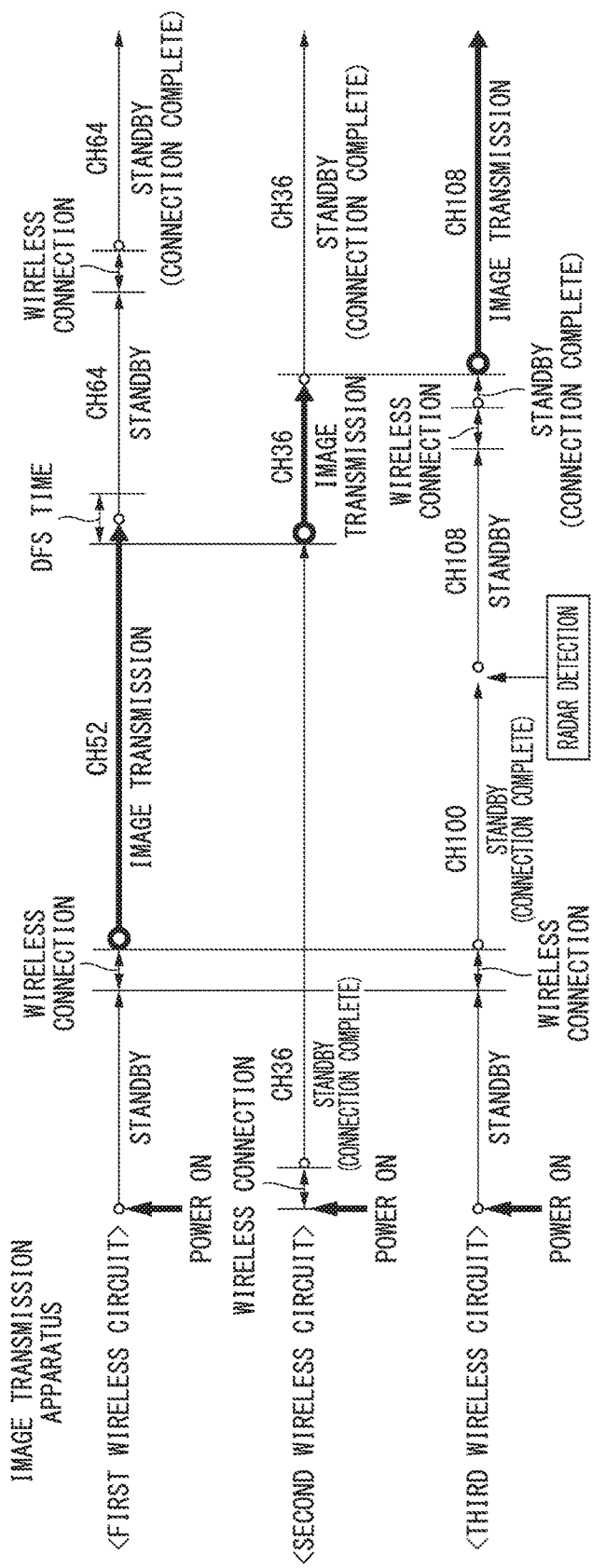
FIG. 27 is a sequence diagram showing an operation of each wireless circuit included in the image transmission apparatus according to the first embodiment of the present invention.

FIG. 27 shows the operation of each wireless circuit included in the image transmission apparatus 100. After the image transmission apparatus 100 is powered on, the first wireless circuit 111 is connected to the first wireless circuit 211 using channel 52 belonging to a band other than W52 (corresponding to step S602). After the connection is completed, the first wireless circuit 111 transmits the image data using channel 52 (corresponding to step S606).

After the image transmission apparatus 100 is powered on, the second wireless circuit 112 is connected to the second wireless circuit 212 using channel 36 belonging to W52 (corresponding to step S702). After the connection is completed, the second wireless circuit 112 is on standby (corresponding to step S703).

After the image transmission apparatus 100 is powered on, the third wireless circuit 113 is connected to the third wireless circuit 213 using channel 100 belonging to a band other than W52 (corresponding to step S802). After the connection is completed, the third wireless circuit 113 is on standby (corresponding to step S803).

When the first wireless circuit 111 is transmitting image data, the radio waves of the radar are detected by the image reception apparatus 200. Because CAC using the third communication channel is not completed at that point in time, the communication channel to be used for image transmission is switched from the first communication channel to the second communication channel (corresponding to steps S609, S610, and S618). Thereby, the second wireless circuit 112 transmits image data using channel 36 (corresponding to step S706). Switching of the communication channel is performed within a DFS time from a point in time at which the radio waves of the radar are detected. Also, the first wireless circuit 111 stops transmitting image data.

After transmitting the image data is stopped, the first wireless circuit 111 is on standby until CAC using the communication channel set in the first wireless circuit 211 is completed. After CAC is completed, the first wireless circuit 111 is connected to the first wireless circuit 211 using channel 64 (corresponding to step S619). After the connection is completed, the first wireless circuit 111 is on standby (corresponding to step S620).

After the second wireless circuit 112 starts transmitting the image data, if CAC using the communication channel set in the third wireless circuit 213 is completed, the communication channel to be used for image transmission is switched from the second communication channel to the third communication channel (corresponding to steps S710, S719, and S720). Thereby, the third wireless circuit 113 transmits the image data using channel 108 (corresponding to step S806). Also, the second wireless circuit 112 stops transmitting the image data.

Modified Example of First Embodiment

Figure 28:
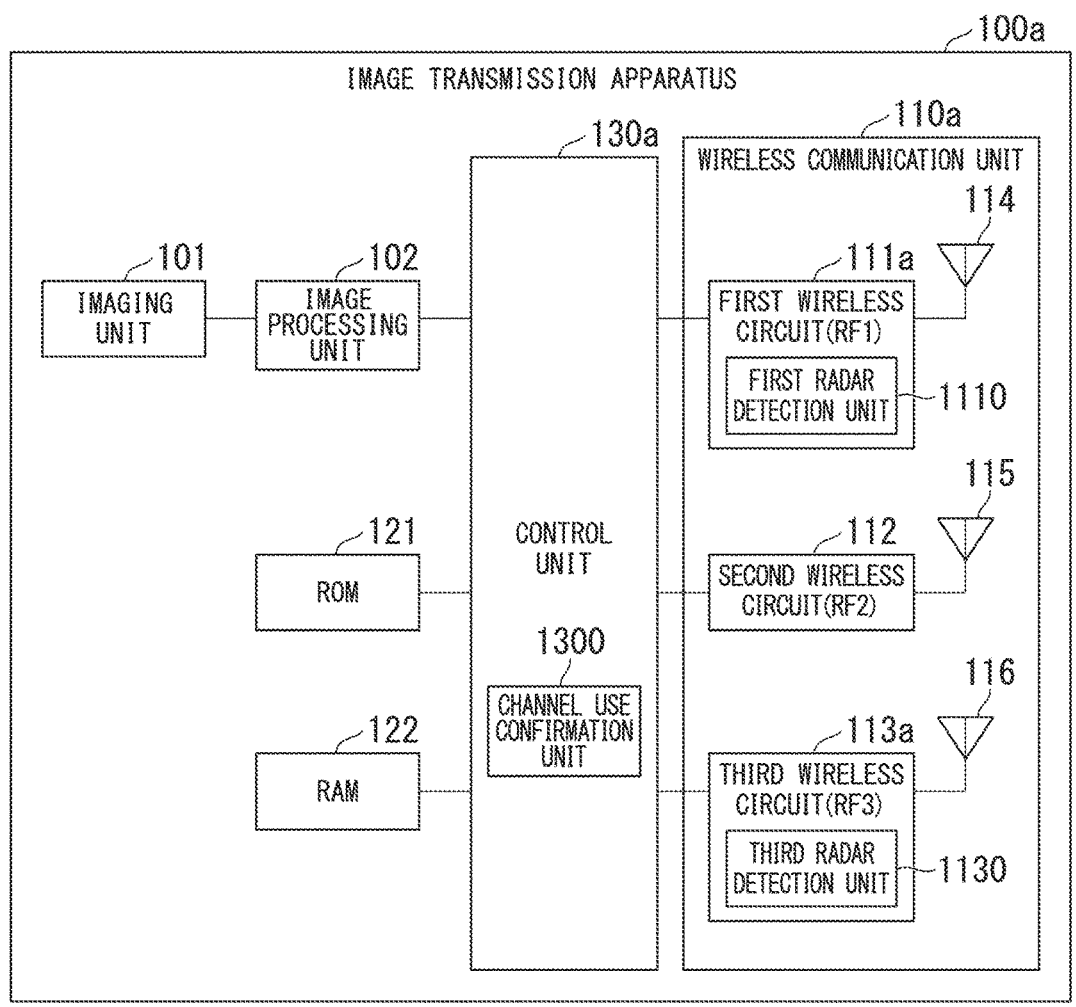
FIG. 28 is a block diagram showing a configuration of an image transmission apparatus according to a modified example of the first embodiment of the present invention.

FIG. 28 shows a configuration of an image transmission apparatus 100a according to the modified example of the first embodiment. With respect to the configuration shown in FIG. 28, differences from the configuration shown in FIG. 2 will be described.

In the image transmission apparatus 100a, the wireless communication unit 110 in the image transmission apparatus 100 shown in FIG. 2 is changed to a wireless communication unit 110a. In the wireless communication unit 110a, the first wireless circuit 111 in the wireless communication unit 110 shown in FIG. 2 is changed to a first wireless circuit 111a. In the wireless communication unit 110a, the third wireless circuit 113 in the wireless communication unit 110 shown in FIG. 2 is changed to a third wireless circuit 113a.

The first wireless circuit 111a includes a first radar detection unit 1110. The third wireless circuit 113a includes a third radar detection unit 1130. The first radar detection unit 1110 and the third radar detection unit 1130 execute a detection process on radio waves of radar in a communication channel that has a possibility of being used for image transmission. The first radar detection unit 1110 executes a detection process on radio waves of the radar in the communication channel set in the first wireless circuit 111a. The third radar detection unit 1130 executes the detection process on the radio waves of the radar in the communication channel set in the third wireless circuit 113a. The first radar detection unit 1110 and the third radar detection unit 1130 can execute the detection process on the radio waves of the radar at the same time.

In the image transmission apparatus 100a, the control unit 130 in the image transmission apparatus 100 shown in FIG. 2 is changed to a control unit 130a. The control unit 130a includes a channel use confirmation unit 1300. The channel use confirmation unit 1300 executes channel use confirmation, i.e., CAC.

With respect to points other than the above, the configuration shown in FIG. 28 is similar to the configuration shown in FIG. 2.

In the modified example of the first embodiment, the image reception apparatus 200 may not include the first radar detection unit 2110 and the third radar detection unit 2130. In the modified example of the first embodiment, the image transmission apparatus 100a executes CAC. Also, in the modified example of the first embodiment, the image transmission apparatus 100a performs control related to switching of communication channels. Except for this point, the operation in the modified example of the first embodiment is similar to the operation in the first embodiment.

It is only necessary for at least one of the image transmission apparatus 100 and the image reception apparatus 200 to include a radar detection unit. Therefore, only one of the image transmission apparatus 100 and the image reception apparatus 200 may include the radar detection unit. Alternatively, the image transmission apparatus 100 and the image reception apparatus 200 may include the radar detection unit.

It is only necessary for at least one of the image transmission apparatus 100 and the image reception apparatus 200 to include a channel use confirmation unit. Therefore, only one of the image transmission apparatus 100 and the image reception apparatus 200 may include the channel use confirmation unit. Alternatively, the image transmission apparatus 100 and the image reception apparatus 200 may include the channel use confirmation unit.

According to the first embodiment, the image communication system 10 including the image transmission apparatus 100 or 100a and the image reception apparatus 200 is configured. The image transmission apparatus 100 includes a transmission-side wireless communication unit (the wireless communication unit 110 or 110a). The image reception apparatus includes a reception-side wireless communication unit (the wireless communication unit 210). At least one of the image transmission apparatuses 100 and 100a and the image reception apparatus 200 has a radar detection unit (the first radar detection unit 1110 or 2110 and the third radar detection unit 1130 or 2130). At least one of the image transmission apparatuses 100 and 100a and the image reception apparatus 200 includes a channel use confirmation unit 1300 or 2300.

The image communication system of each aspect of the present invention may not include a configuration corresponding to at least one of the imaging unit 101, the image processing unit 102, the ROM 121, the RAM 122, the image processing unit 201, the ROM 221, and the RAM 222.

According to the first embodiment, the image reception apparatus 200 is configured to include the reception-side wireless communication unit (the wireless communication unit 210), the radar detection unit (the first radar detection unit 2110 and the third radar detecting unit 2130), and the channel use confirmation unit 2300.

The image reception apparatus according to each aspect of the present invention may not include a configuration corresponding to at least one of the image processing unit 201, the ROM 221, and the RAM 222.

According to the first embodiment, the image transmission apparatus 100*a* is configured to include the transmission side wireless communication unit (the wireless communication unit 110*a*), the radar detection unit (the first radar detection unit 1110 and the third radar detection unit 1130), and the channel use confirmation unit 1300.

The image transmission apparatus of each aspect of the present invention may not include a configuration corresponding to at least one of the imaging unit 101, the image processing unit 102, the ROM 121, and the RAM 122.

According to the first embodiment, the image receiving method having the first step, the second step, the third step, the fourth step, the fifth step, and the sixth step is configured. The first step corresponds to steps S118, S128, S137, S208, S218, S224, S320, S330, and S339. The second step corresponds to step S119. The third step corresponds to steps S302 and S313. The fourth step corresponds to steps S122, S125, S132, S133, S141, S142, S206, and S318. The fifth step corresponds to steps S126, S131, S318, and S320. The sixth step corresponds to steps S123, S140, S206, and S208.

In the first step, image data are received by radio waves. The image data is generated in synchronization with an imaging clock. The image data is transmitted in the order in which the image data is generated. In the second step, a detection process on radio waves of radar in a communication channel that has a possibility of being used for image data communication in the first step is executed. In the third step, channel use confirmation for confirming whether or not the communication channel is usable is executed by continuously executing the detection process for a predetermined time in the second step. In the third step, the channel use confirmation using a third communication channel is further executed when image data communication using a first communication channel is being performed. The first communication channel and the third communication channel are communication channels in which detection of the radar is necessary or that have a possibility of being used by the radar. The third communication channel is different from the first communication channel. In the fourth step, the image data communication using the first communication channel is stopped within a predetermined period from a point in time at which the radio waves of the radar are detected in the first communication channel in the second step while the image data communication using the first communication channel is performed. In the fifth step, image data communication using the third communication channel is started within the predetermined period from the point in time at which the radio waves of the radar are detected if the channel use confirmation using the third communication channel is completed at the point in time at which the radio waves of the radar are detected. In the sixth step, image data communication using a second communication channel is started within the predetermined period from the point in time at which the radio waves of the radar are detected if the channel use confirmation using the third communication channel is not completed at the point in time at which the radio waves of the radar are detected. The second communication channel is a communication channel in which detection of the radar is not necessary or that is not used by the radar.

According to the first embodiment, an image transmission method including steps corresponding to the first to sixth steps is configured.

According to the first embodiment, a program for causing the computer of the image reception apparatus 200 to execute the first to sixth steps is configured.

According to the first embodiment, a program for causing the computer of the image transmission apparatus 100*a* to execute the steps corresponding to the first to sixth steps is configured.

In each aspect of the present invention, switching of the communication channel from the second communication channel to the other communication channel may not be performed while image data communication using the second communication channel is performed. Likewise, in each aspect of the present invention, while image data communication using the third communication channel is performed, switching of the communication channel from the third communication channel to another communication channel may not be performed. When the radio waves of the radar are detected by the channel use confirmation using the third communication channel, switching of the communication channel from the third communication channel to another communication channel may be performed.

In the first embodiment, the wireless communication unit 110 and the wireless communication unit 210 start image data communication using the third communication channel within a predetermined period from a point in time at which the radio waves of the radar are detected if the channel use confirmation using the third communication channel is completed at the point in time at which the radio waves of the radar are detected. The wireless communication unit 110 and the wireless communication unit 210 start image data communication using the second communication channel within a predetermined period from a point in time at which the radio waves of the radar are detected if the channel use confirmation using the third communication channel is not completed at the point in time at which the radio waves of the radar are detected. Thus, image transmission can be continued when the radio waves of the radar are detected in the communication channel being used for image transmission.

Second Embodiment

Figure 29:
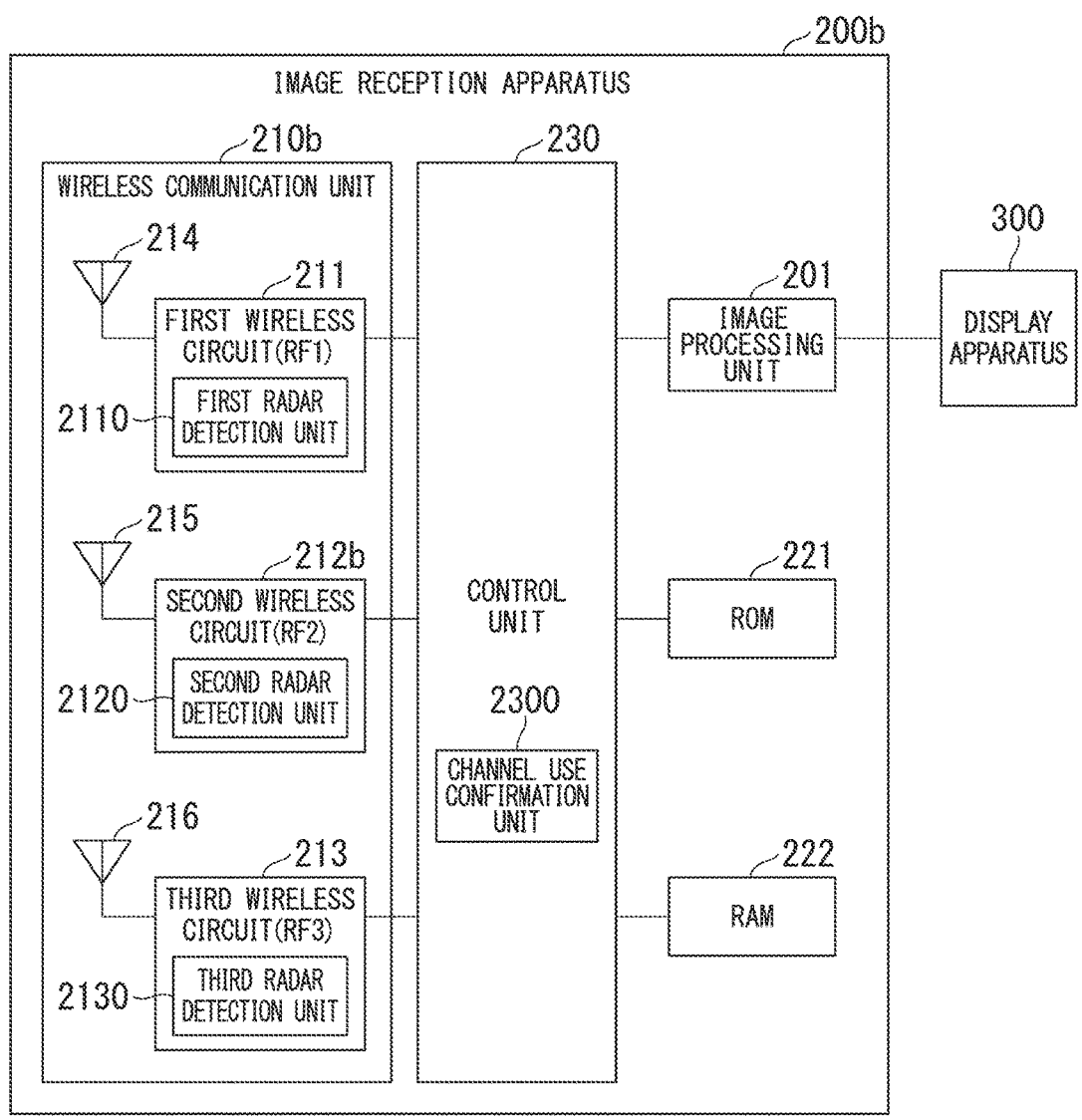
FIG. 29 is a block diagram showing a configuration of an image reception apparatus according to a second embodiment of the present invention.
Figure 30:
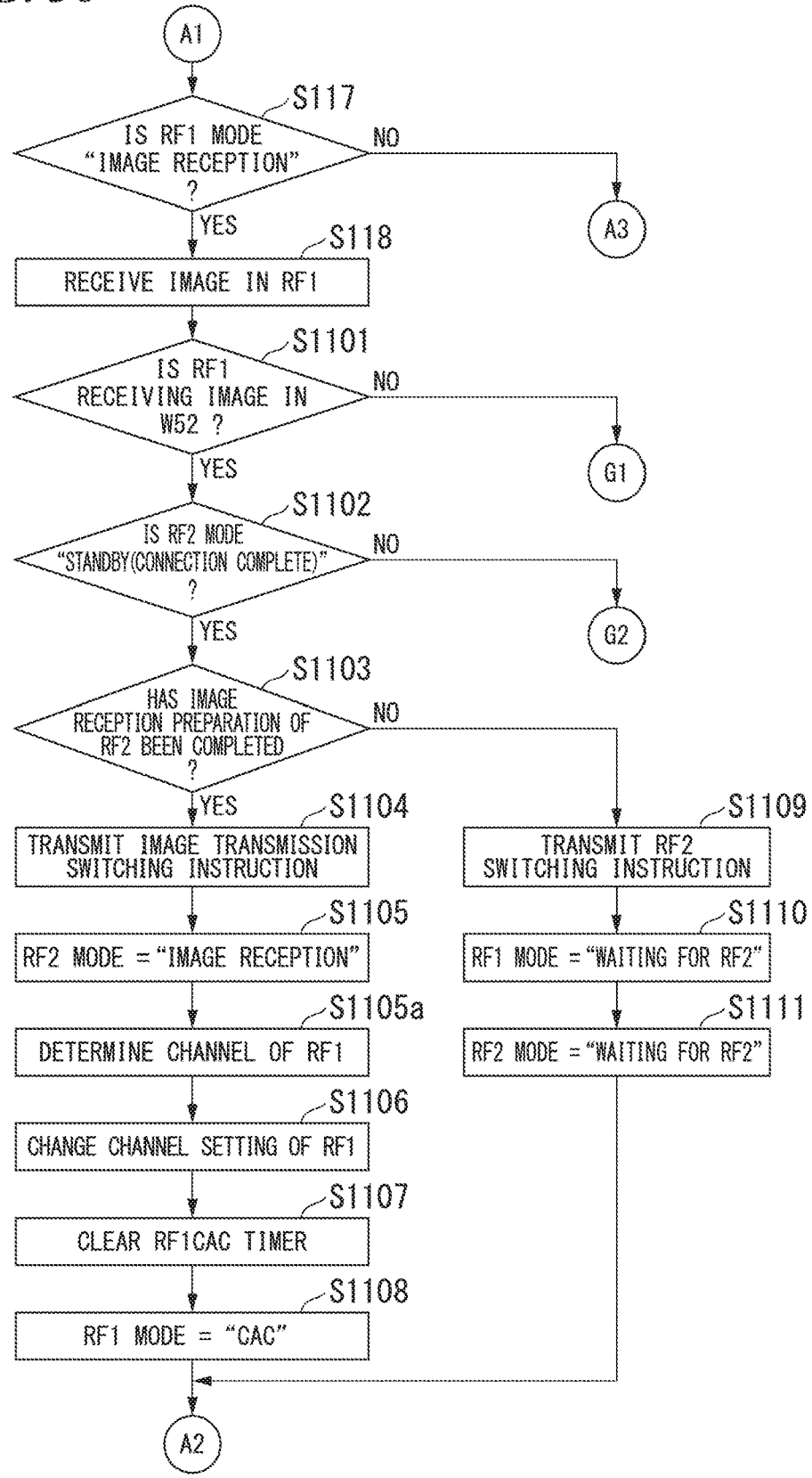
FIG. 30 is a flowchart showing a procedure of an operation of the image reception apparatus according to the second embodiment of the present invention.
Figure 31:
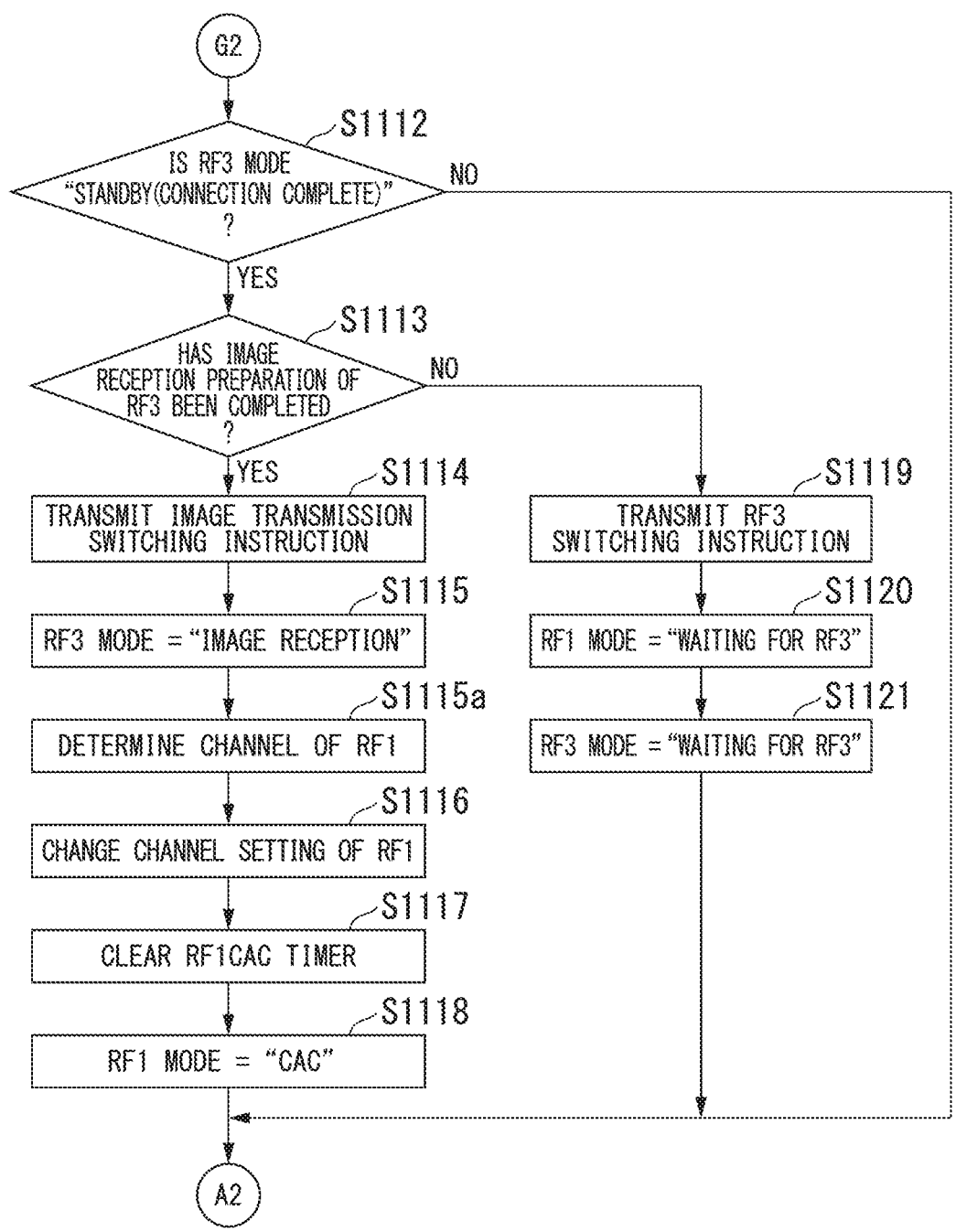
FIG. 31 is a flowchart showing a procedure of an operation of the image reception apparatus according to the second embodiment of the present invention.
Figure 32:
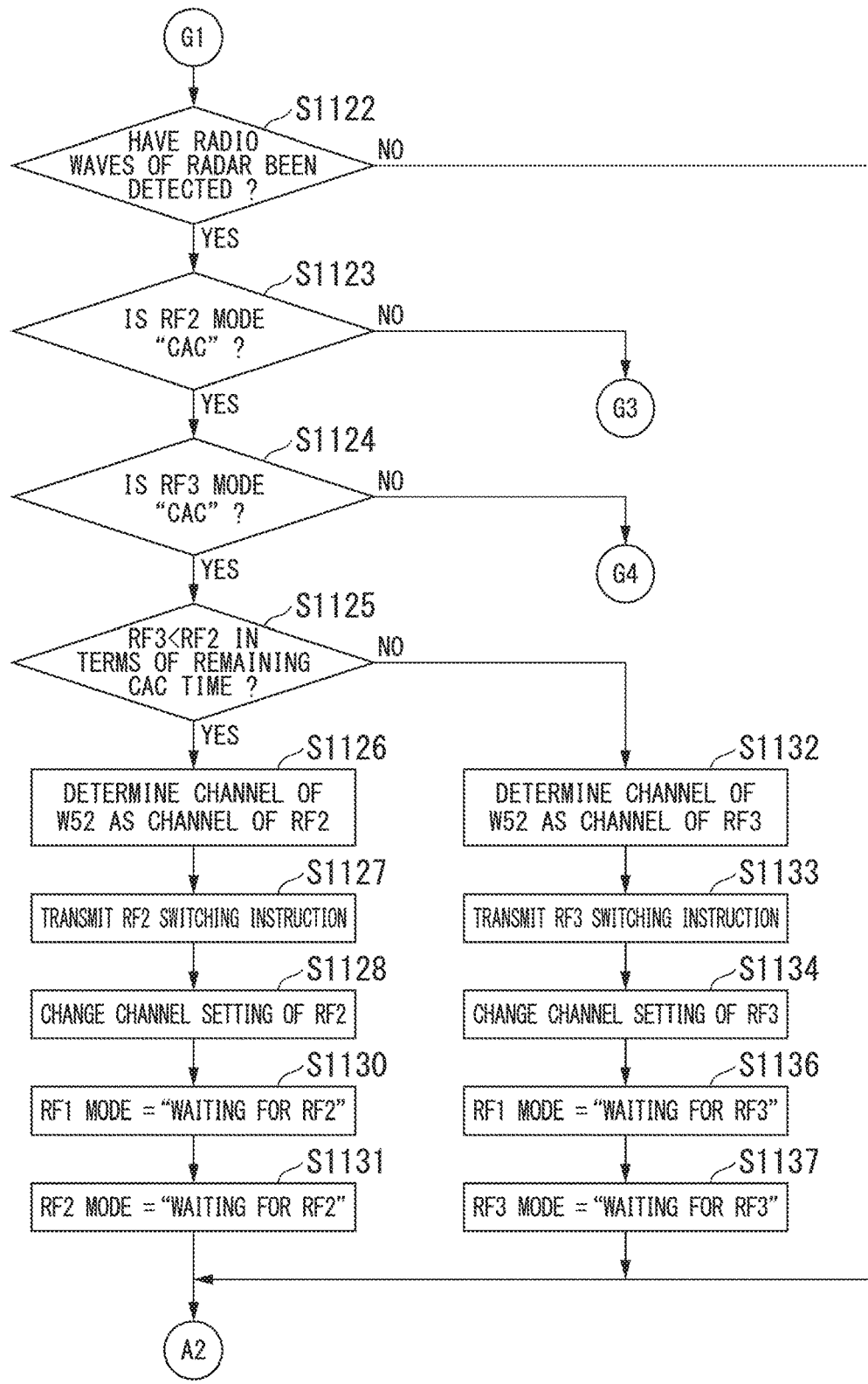
FIG. 32 is a flowchart showing a procedure of an operation of the image reception apparatus according to the second embodiment of the present invention.
Figure 33:
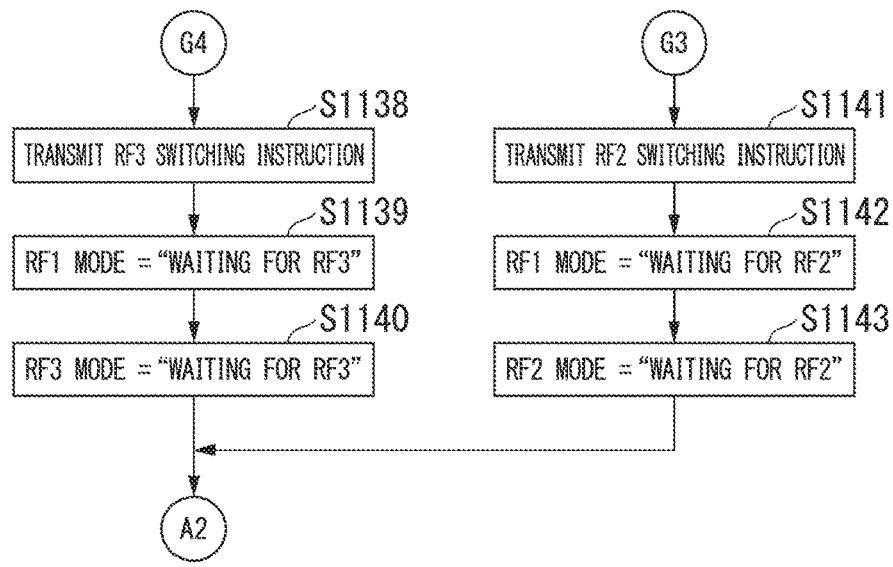
FIG. 33 is a flowchart showing a procedure of an operation of the image reception apparatus according to the second embodiment of the present invention.
Figure 34:
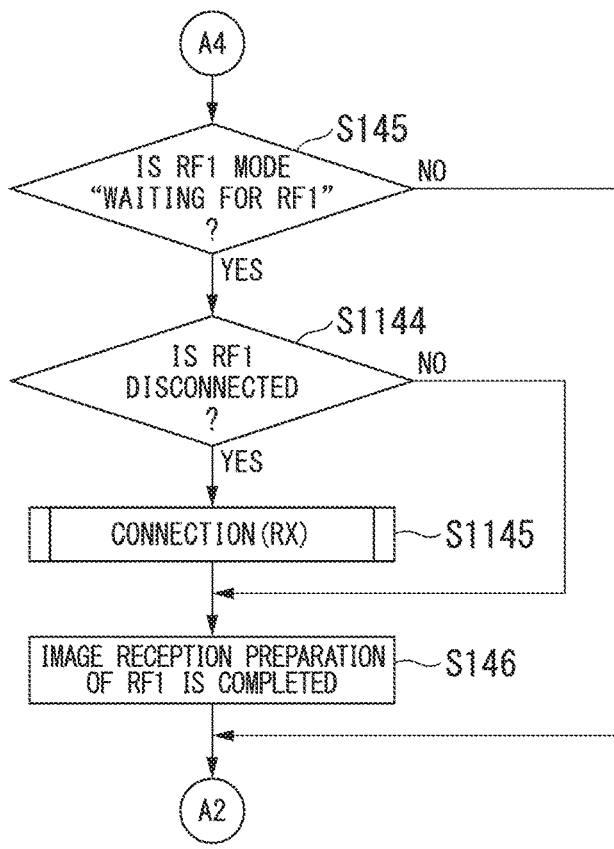
FIG. 34 is a flowchart showing a procedure of an operation of the image reception apparatus according to the second embodiment of the present invention.
Figure 35:
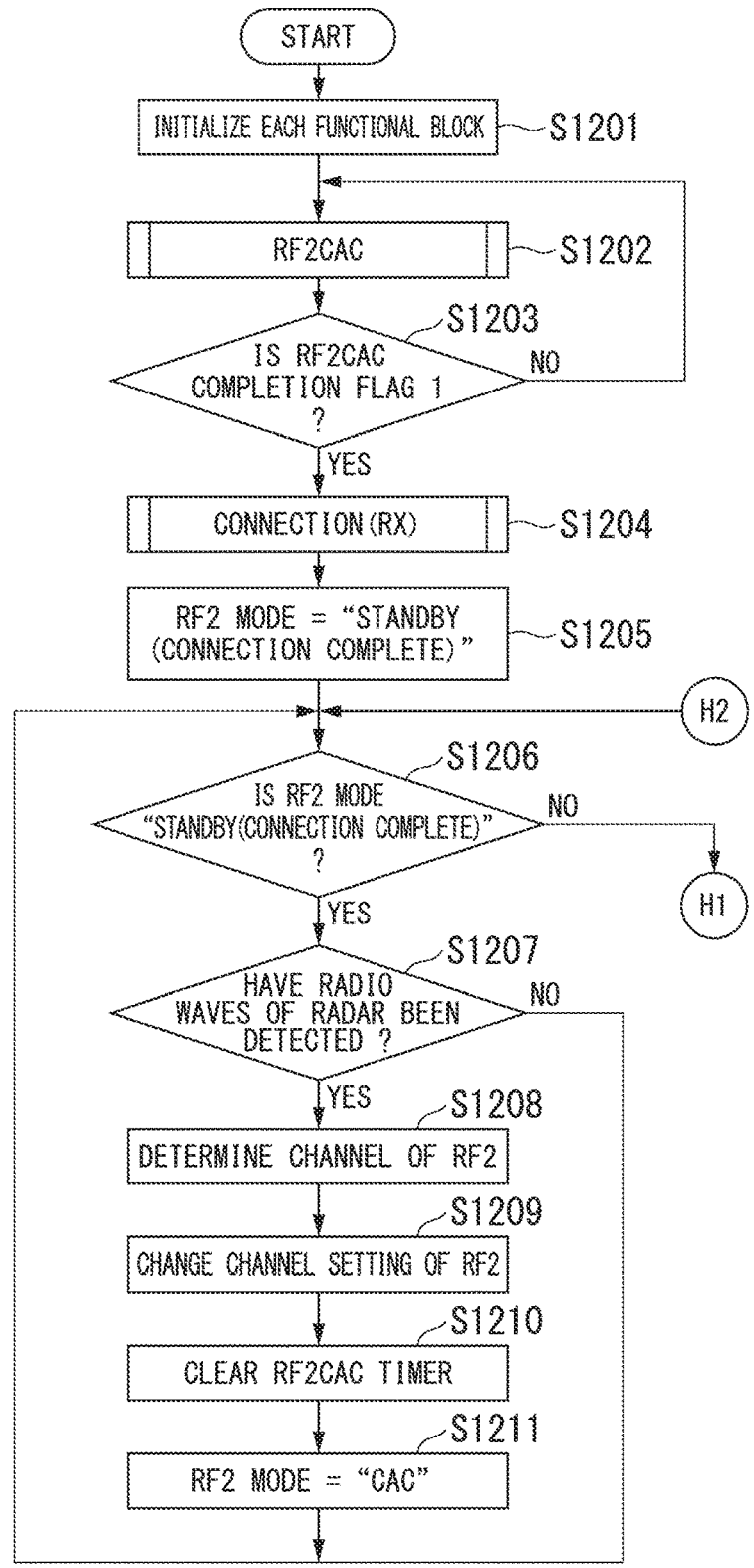
FIG. 35 is a flowchart showing a procedure of an operation of the image reception apparatus according to the second embodiment of the present invention.
Figure 36:
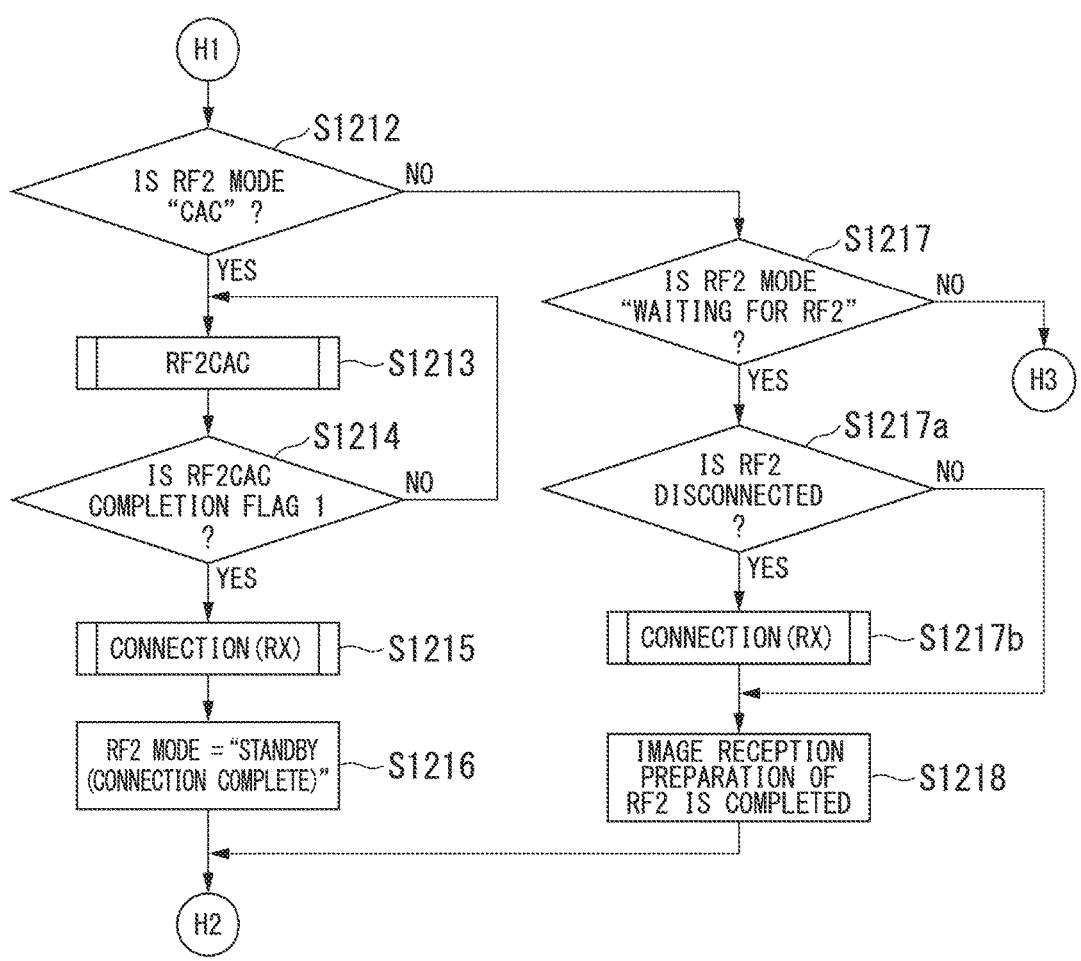
FIG. 36 is a flowchart showing a procedure of an operation of the image reception apparatus according to the second embodiment of the present invention.
Figure 37:
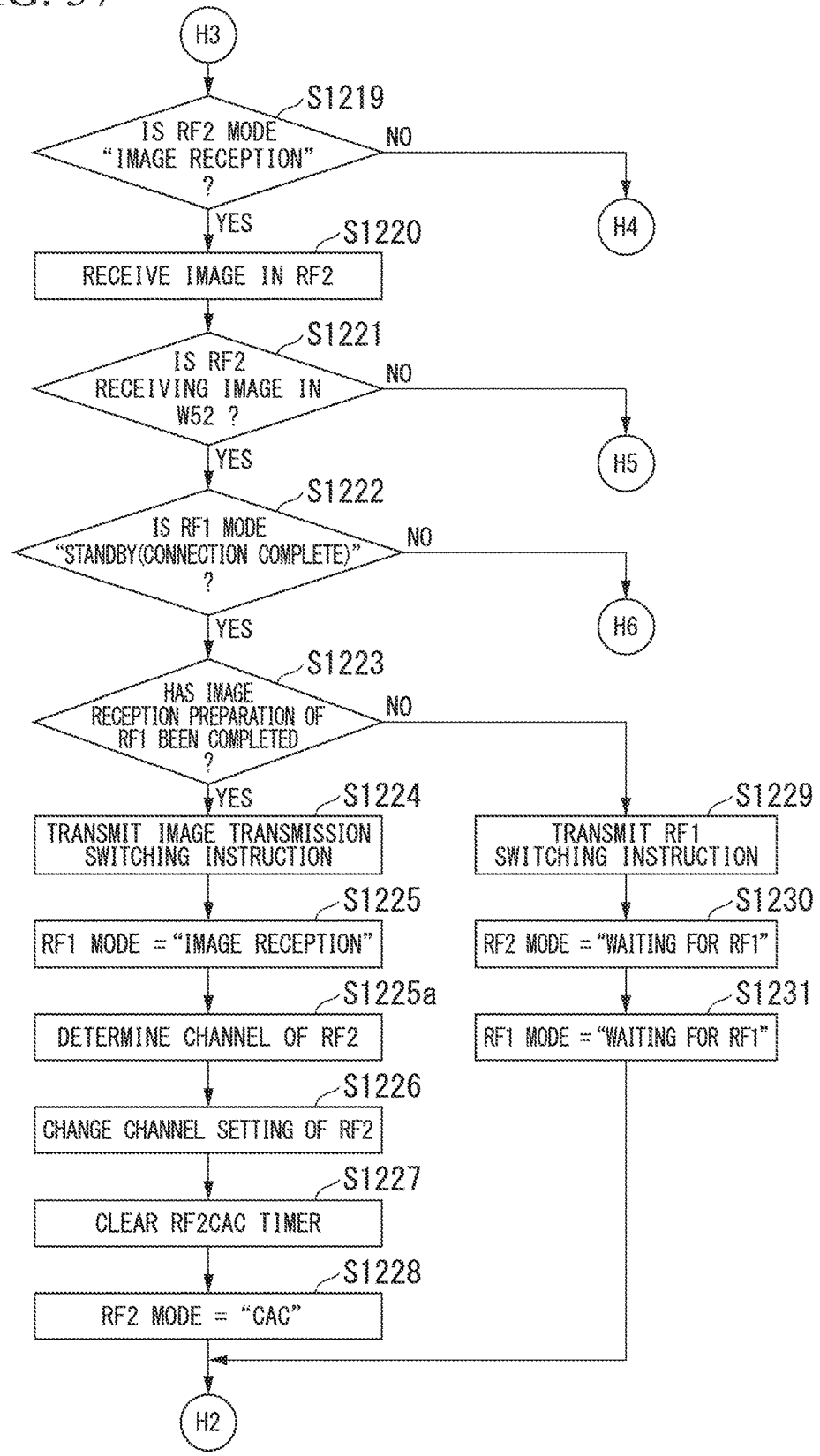
FIG. 37 is a flowchart showing a procedure of an operation of the image reception apparatus according to the second embodiment of the present invention.
Figure 38:
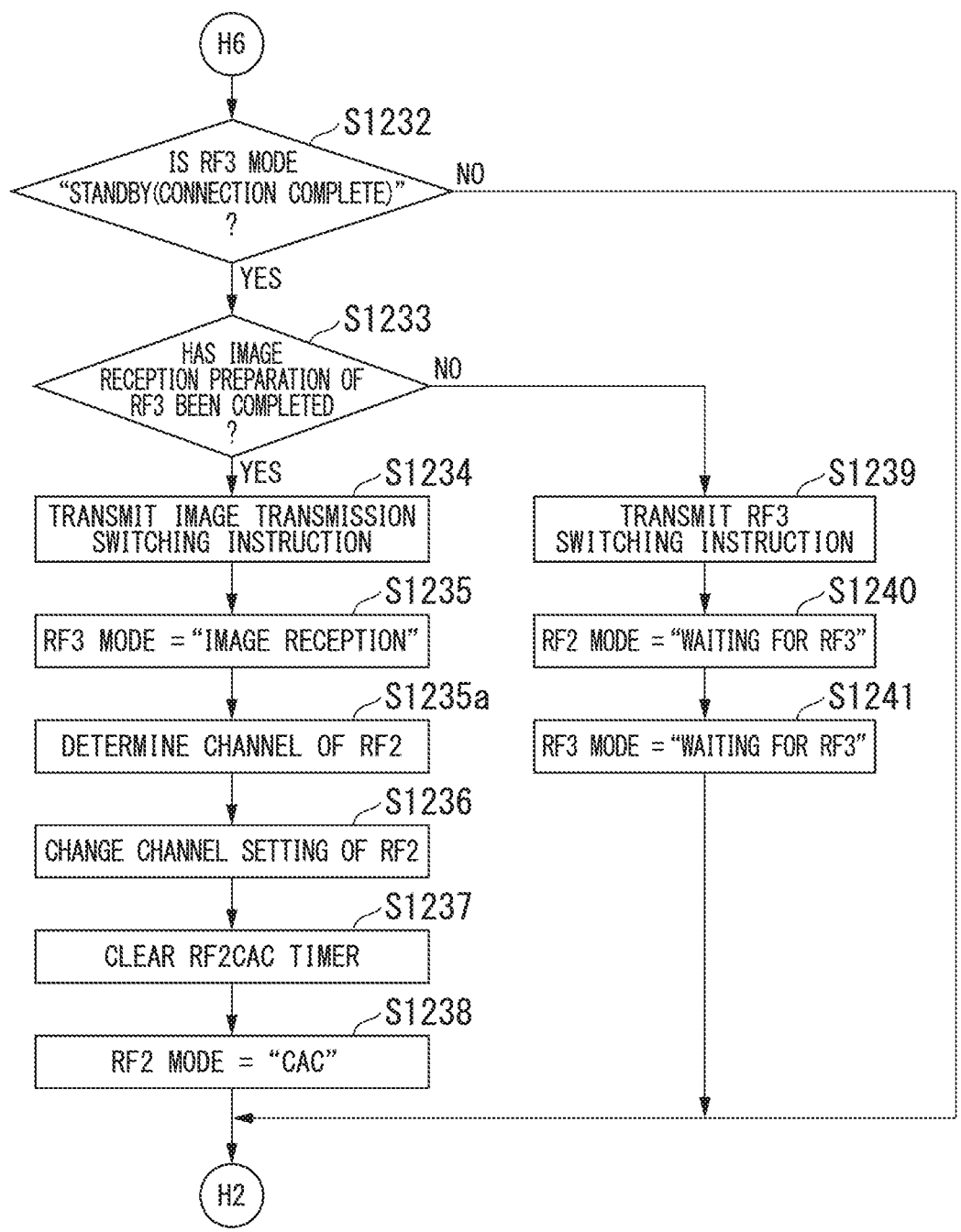
FIG. 38 is a flowchart showing a procedure of an operation of the image reception apparatus according to the second embodiment of the present invention.
Figure 39:
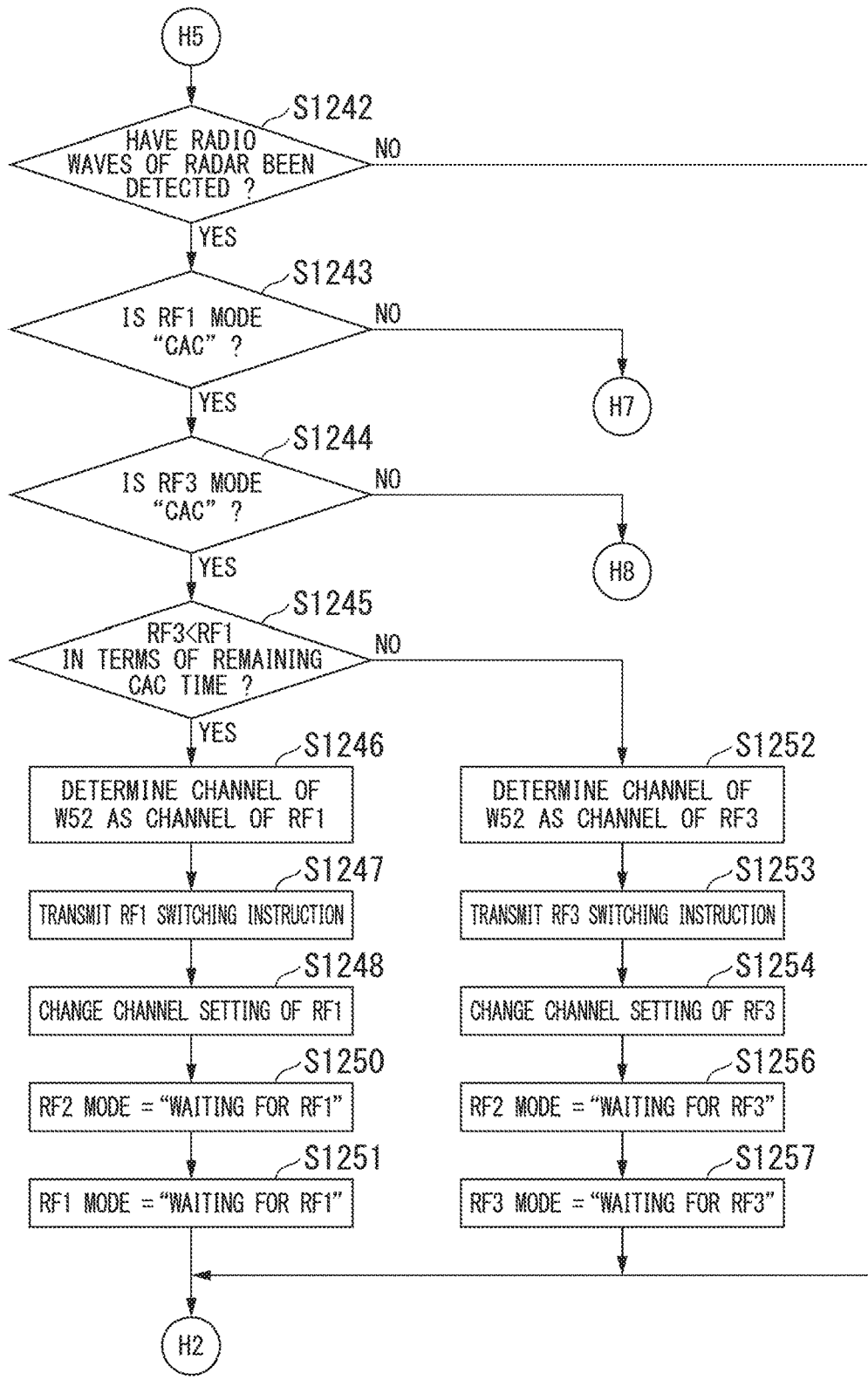
FIG. 39 is a flowchart showing a procedure of an operation of the image reception apparatus according to the second embodiment of the present invention.
Figure 40:
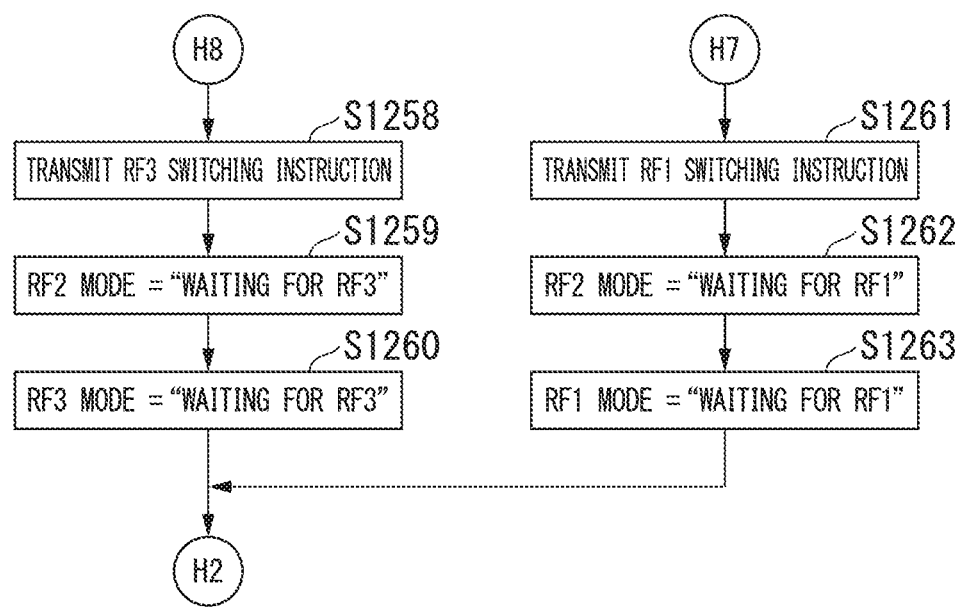
FIG. 40 is a flowchart showing a procedure of an operation of the image reception apparatus according to the second embodiment of the present invention.
Figure 41:
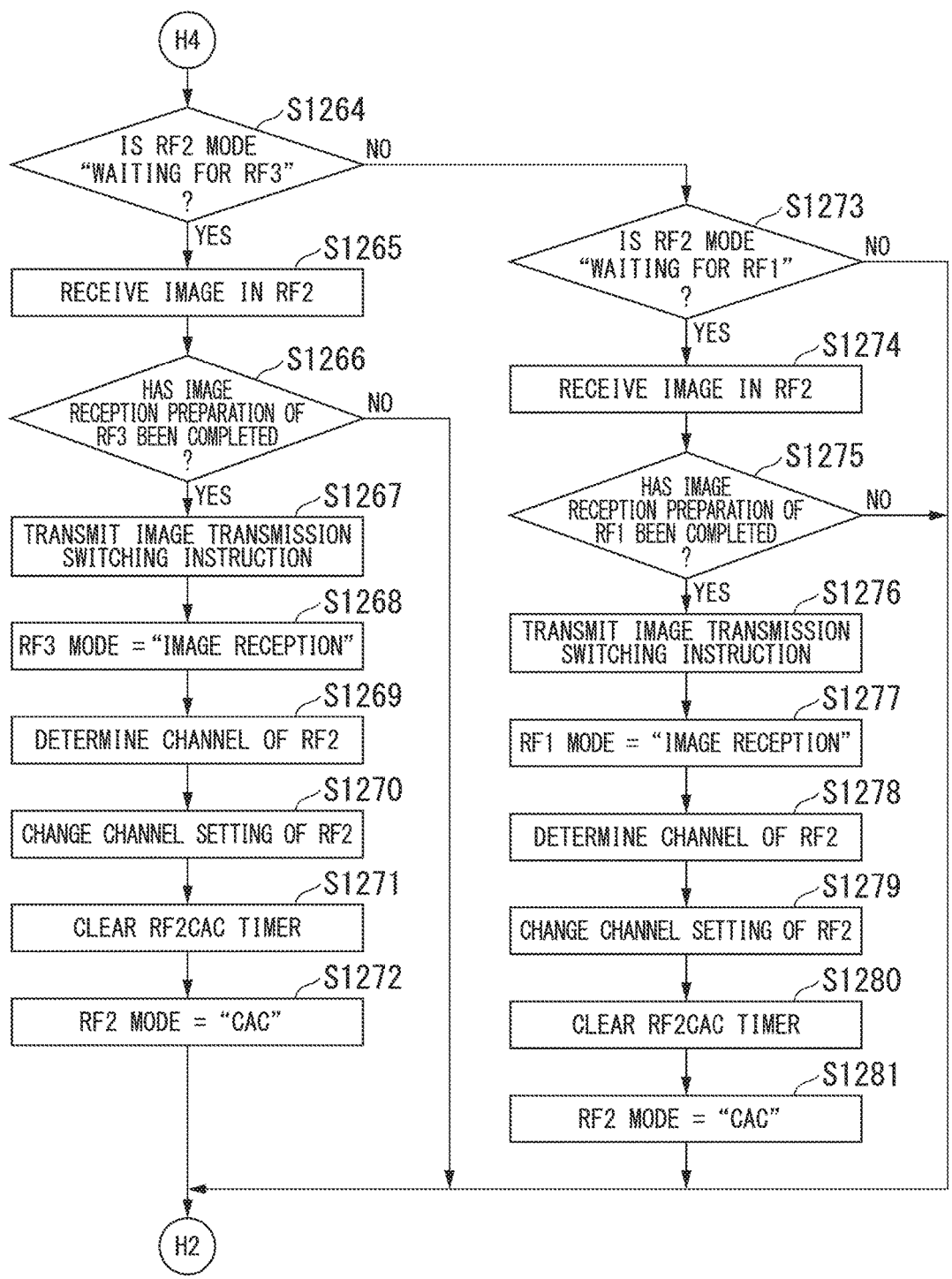
FIG. 41 is a flowchart showing a procedure of an operation of the image reception apparatus according to the second embodiment of the present invention.
Figure 42:
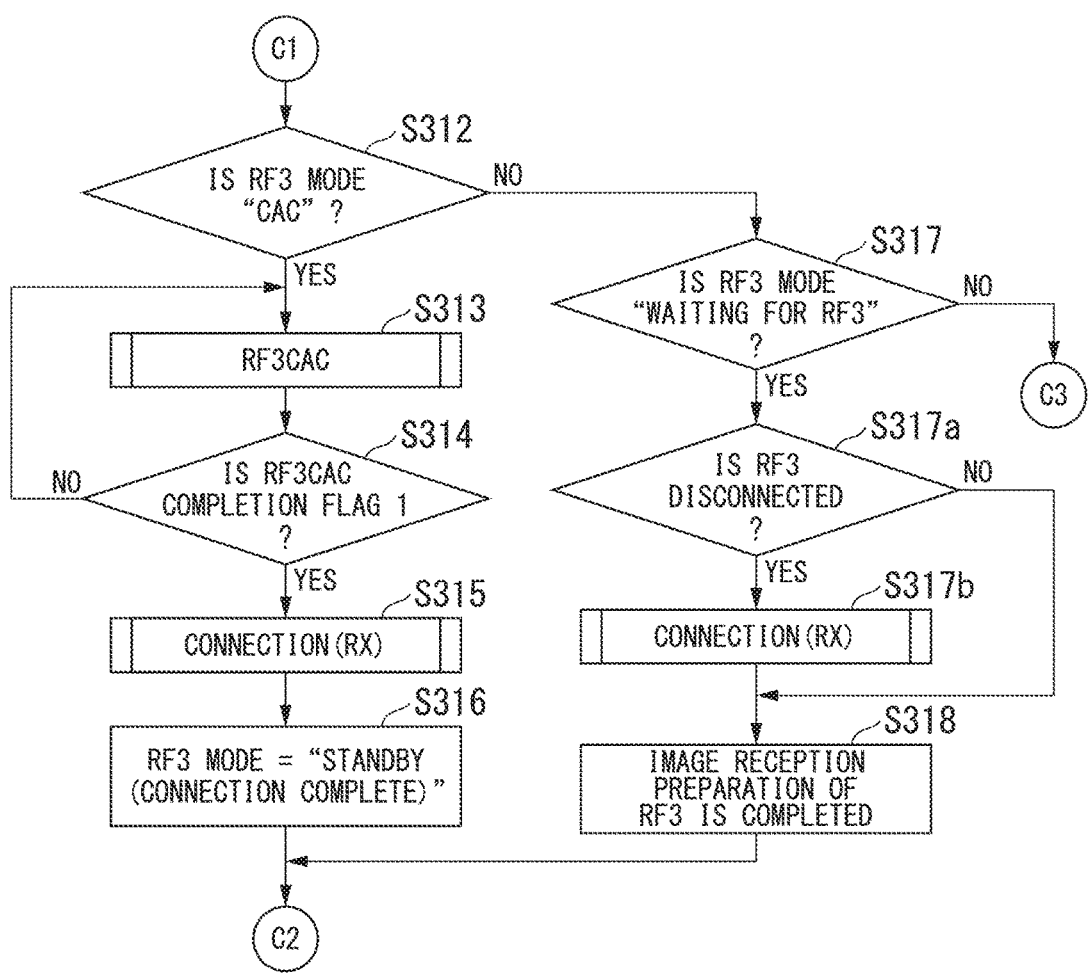
FIG. 42 is a flowchart showing a procedure of an operation of the image reception apparatus according to the second embodiment of the present invention.

In the second embodiment of the present invention, the image reception apparatus 200 shown in FIG. 3 is changed to an image reception apparatus 200*b* shown in FIG. 29.

FIG. 29 shows a configuration of the image reception apparatus 200*b*. As shown in FIG. 29, the image reception apparatus 200*b* includes an image processing unit 201, a wireless communication unit 210*b* (a reception-side wireless communication unit), a ROM 221, a RAM 222, and a control unit 230.

With respect to the configuration shown in FIG. 29, differences from the configuration shown in FIG. 3 will be described.

In the image reception apparatus 200*b* shown in FIG. 29, the wireless communication unit 210 in the image reception apparatus 200 shown in FIG. 3 is changed to the wireless communication unit 210*b*.

The wireless communication unit 210*b* includes a plurality of wireless circuits. That is, the wireless communication unit 210*b* includes a first wireless circuit 211 (RF1), a second wireless circuit 212*b* (RF2), and a third wireless circuit 213 (RF3). Also, the wireless communication unit 210*b* includes a plurality of antennas. That is, the wireless communication unit 210*b* includes a first antenna 214, a second antenna 215, and a third antenna 216.

In the wireless communication unit 210b shown in FIG. 29, the second wireless circuit 212 in the wireless communication unit 210 shown in FIG. 3 is changed to the second wireless circuit 212b.

The second wireless circuit 212b performs wireless communication with the image transmission apparatus 100 via the second antenna 215. The second wireless circuit 112 and the second wireless circuit 212b perform wireless communication using one communication channel (for example, any one of the communication channels shown in FIG. 4).

The second wireless circuit 212b has a second radar detection unit 2120. The second radar detection unit 2120 executes a detection process on radio waves of the radar in a communication channel usable for image transmission. The second radar detection unit 2120 executes the detection process on the radio waves of the radar in the communication channel set in the second wireless circuit 212b. The first radar detection unit 2110, the second radar detection unit 2120, and the third radar detection unit 2130 can execute the detection process on the radio waves of the radar at the same time.

With respect to points other than the above, the configuration shown in FIG. 29 is similar to the configuration shown in FIG. 3.

An outline of an operation in the second embodiment will be described.

When image data communication using the first communication channel is being performed, the channel use confirmation unit 2300 executes channel use confirmation (CAC) using the fourth communication channel. The fourth communication channel is a communication channel that has a possibility of being used by the radar. The fourth communication channel is different from any of the first communication channel and the third communication channel.

If CAC is not completed in any of the third communication channel and the fourth communication channel at a point in time at which the radio waves of the radar are detected by the first radar detection unit 2110, the channel use confirmation unit 2300 suspends either CAC of the third communication channel or CAC of the fourth communication channel which has a longer remaining time until completion of CAC. The wireless communication unit 110 and the wireless communication unit 210b change the communication channel set in the wireless communication unit 110 and the wireless communication unit 210b from the communication channel on which CAC is suspended to the second communication channel, and start image data communication using the second communication channel.

After the communication channel is switched from the first communication channel to the second communication channel, the communication channel is switched from the second communication channel to the third communication channel or the fourth communication channel at a point in time at which CAC using the third communication channel or the fourth communication channel has been completed. Thus, a use time of a channel belonging to W52 with much interference is shortened. As a result, the quality of wireless image transmission is improved.

The channel use confirmation unit 2300 continues either CAC of the third communication channel or CAC of the fourth communication channel which has a shorter remaining time until completion of CAC. After the continued CAC is completed, the wireless communication unit 110 and the wireless communication unit 210b start image data communication using the third communication channel or the fourth communication channel on which CAC has been completed. The wireless communication unit 110 and the wireless communication unit 210b stop the image data communication using the second communication channel after the continued CAC is completed and image data communication using the third communication channel or the fourth communication channel is started.

The above-described control is control when image data communication using the first communication channel set in the first wireless circuit 211 is performed. When image data communication using a communication channel belonging to a band other than W52 set in the second wireless circuit 212b or the third wireless circuit 213 is performed, control similar to the above-described control is performed. Control similar to the above-described control related to the second wireless circuit 212b or the third wireless circuit 213 is an additional matter of the second embodiment.

Figure 6:
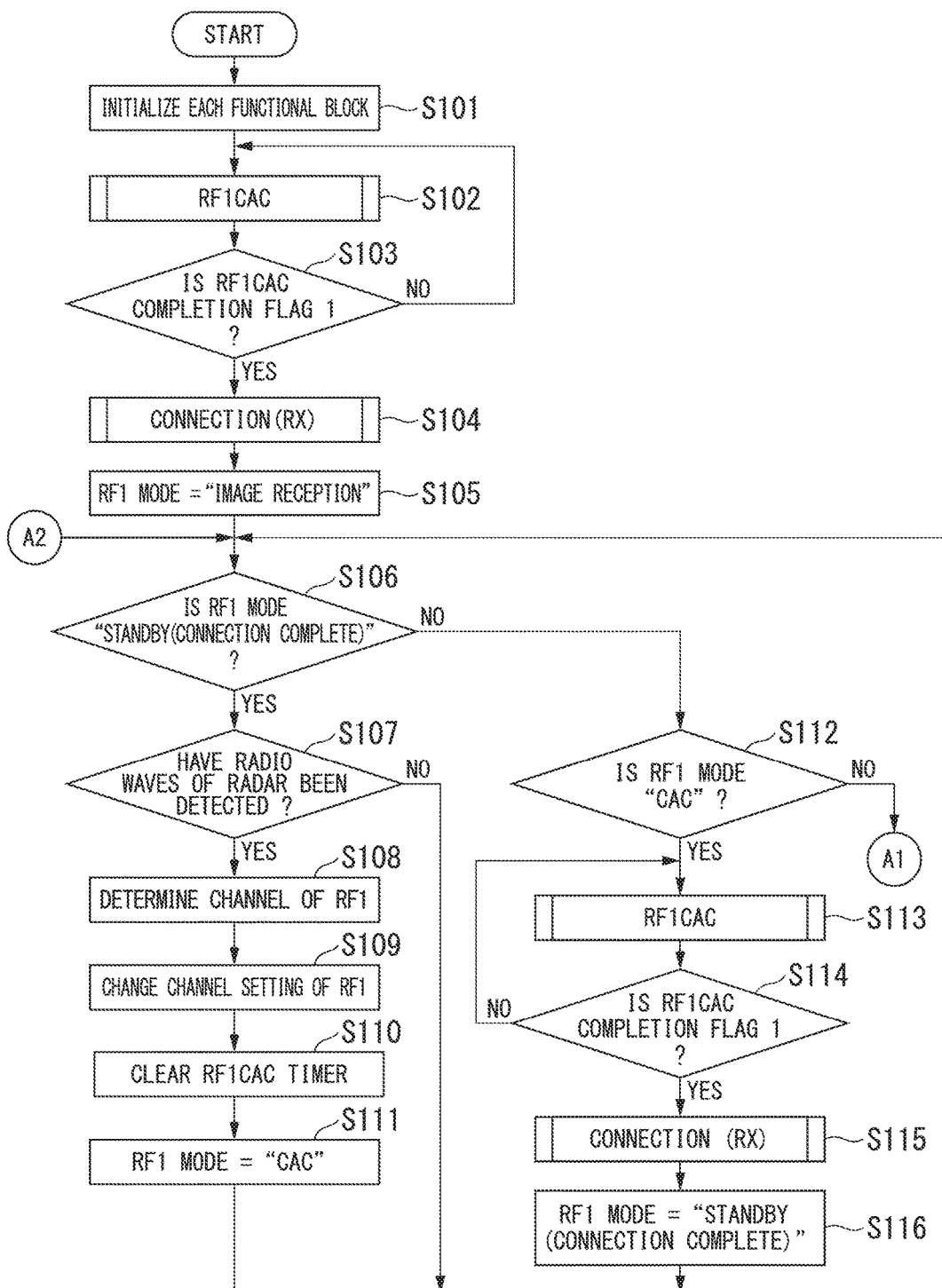
FIG. 6 is a flowchart showing a procedure of an operation of the image reception apparatus according to the first embodiment of the present invention.
Figure 7:
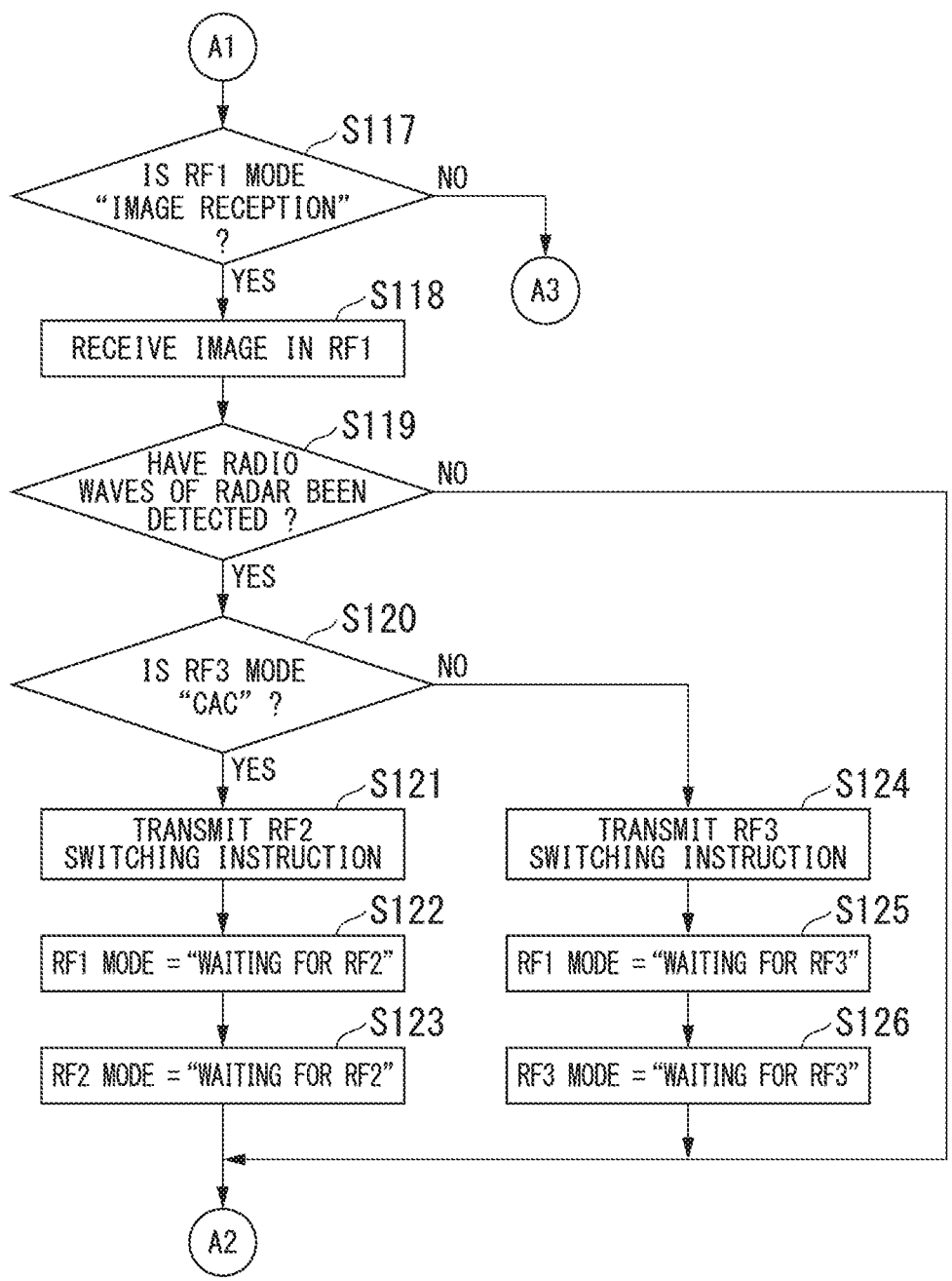
FIG. 7 is a flowchart showing a procedure of an operation of the image reception apparatus according to the first embodiment of the present invention.
Figure 8:
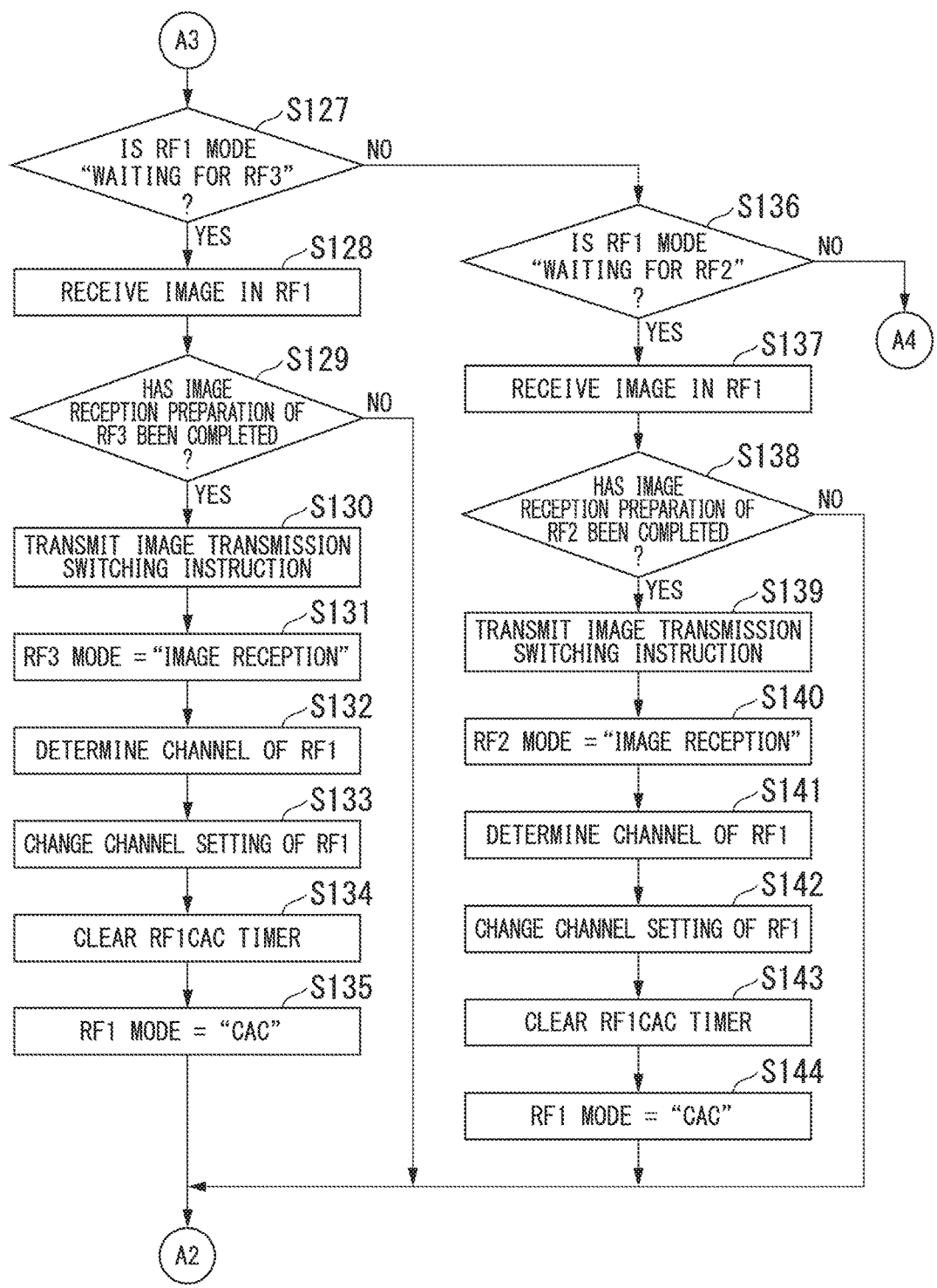
FIG. 8 is a flowchart showing a procedure of an operation of the image reception apparatus according to the first embodiment of the present invention.
Figure 9:
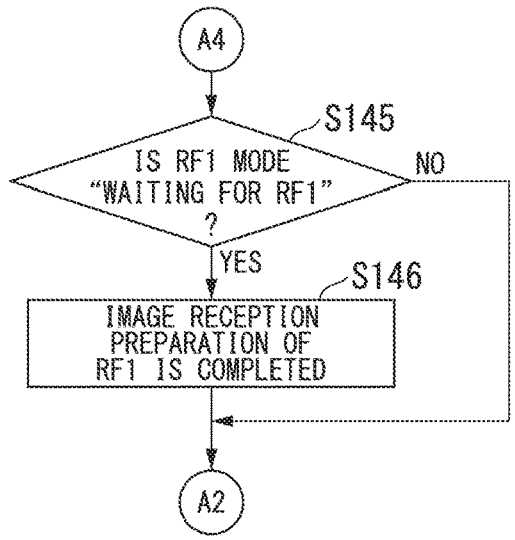
FIG. 9 is a flowchart showing a procedure of an operation of the image reception apparatus according to the first embodiment of the present invention.

Details of an operation in the second embodiment will be described. The operation of the image reception apparatus 200b will be described. FIGS. 30 to 46 show a procedure of the operation of the image reception apparatus 200b. FIGS. 30, 31, 32, 33, and 34 show the procedure of the operation of the image reception apparatus 200b related to the control of the first wireless circuit 211. The operations shown in FIGS. 6 and 8 are common to the first embodiment and the second embodiment. The operation shown in FIG. 7 is changed to the operations shown in FIGS. 30, 31, 32, and 33. The operation shown in FIG. 9 is changed to the operation shown in FIG. 34.

After the image data is received in step S118, the control unit 230 determines whether or not the first wireless circuit 211 is receiving image data on the communication channel belonging to W52 (step S1101).

If the first wireless circuit 211 is receiving image data on the communication channel belonging to W52 in step S1101, the control unit 230 determines whether or not the RF2 mode is "standby (connection complete)" (step S1102).

If the RF2 mode is "standby (connection complete)" in step S1102, the control unit 230 determines whether or not image reception preparation of the second wireless circuit 212b has been completed (step S1103). In step S1103, processing is executed on the basis of the information stored in the RAM 222.

If the image reception preparation of the second wireless circuit 212b is completed in step S1103, the processing in steps S1104, S1105, S1105a, S1106, S1107, and S1108 is executed. The processing in steps S1104, S1105, S1105a, S1106, S1107, and S1108 is similar to the processing in steps S139, S140, S141, S142, S143, and S144, respectively. After the processing in step S1108 is executed, the processing in step S106 is executed.

If the image reception preparation by the second wireless circuit 212b has not been completed in step S1103, the processing in steps S1109, S1110, and S1111 is executed. The processing in steps S1109, S1110, and S1111 is similar to the processing in steps S121, S122, and S123. After the processing in step S1111 is executed, the processing in step S106 is executed.

If the RF2 mode is not "standby (connection complete)" in step S1102, the control unit 230 determines whether or not the RF3 mode is "standby (connection complete)" (step S1112).

If the RF3 mode is "standby (connection complete)" in step S1112, the control unit 230 determines whether or not image reception preparation of the third wireless circuit 213 has been completed (step S1113). In step S1113, processing is executed on the basis of the information stored in the RAM 222.

If the image reception preparation of the third wireless circuit 213 has been completed in step S1113, the processing in steps S1114, S1115, S1115a, S1116, S1117, and S1118 is executed. The processing in steps S1114, S1115, S1115a, S1116, S1117, and S1118 is similar to the processing in steps S130, S131, S132, S133, S134, and S135, respectively. After the processing in step S1118 is executed, the processing in step S106 is executed.

If the image reception preparation of the third wireless circuit 213 has not been completed in step S1113, the processing in steps S1119, S1120, and S1121 are executed. The processing in steps S1119, S1120, and S1121 is similar to the processing in steps S124, S125, and S126, respectively. After the processing in step S1121 is executed, the processing in step S106 is executed.

If the first wireless circuit 211 is not receiving image data on the communication channel belonging to W52 in step S1101, the first wireless circuit 211 is receiving image data on a communication channel of a band other than W52. The channel use confirmation unit 2300 receives information from the first radar detection unit 2110. The channel use confirmation unit 2300 determines whether or not radio waves of the radar have been detected in the communication channel set in the first wireless circuit 211 by confirming the received information (step S1122).

If the radio waves of the radar have been detected in step S1122, the control unit 230 determines whether or not the RF2 mode is "CAC" (step S1123).

If the RF2 mode is "CAC" in step S1123, the control unit 230 determines whether or not the RF3 mode is "CAC" (step S1124).

If the RF3 mode is "CAC" in step S1124, the control unit 230 compares a time measured by the RF3CAC timer with a time measured by the RF2CAC timer. The RF2CAC timer is a timer for measuring the execution time of CAC using the communication channel set in the second wireless circuit 212b. When image data communication using the first communication channel is being performed, CAC using the third communication channel set in the third wireless circuit 213 and CAC using the fourth communication channel set in the second wireless circuit 212b are executed. The control unit 230 determines whether or not the remaining time until completion of CAC using the third communication channel is shorter than the remaining time until completion of CAC using the fourth communication channel (step S1125).

If the remaining time until the completion of CAC using the third communication channel is shorter than the remaining time until the completion of CAC using the fourth communication channel in step S1125, the control unit 230 determines the communication channel to be set in the second wireless circuit 212b (step S1126). In step S1126, any communication channel belonging to W52 may be selected. That is, the second communication channel may be selected. For example, the communication channel corresponding to a channel number 1 is set in the second wireless circuit 212b. As shown in FIG. 4, the communication channel corresponding to the channel number 1 is channel 36 belonging to W52.

After the communication channel is determined, the control unit 230 performs control for transmitting the RF2 switching instruction by radio waves using the wireless communication unit 210b (the first wireless circuit 211) (step S1127). Thereby, the wireless communication unit 210b (the first wireless circuit 211) transmits the RF2 switching instruction to the image transmission apparatus 100 by radio waves. The RF2 switching instruction transmitted in step S1127 includes information on the communication channel determined in step S1126.

After the RF2 switching instruction is transmitted, the control unit 230 changes the communication channel set in the second wireless circuit 212b (step S1128). In step S1128, the control unit 230 sets the communication channel determined in step S1126 in the second wireless circuit 212b.

After the communication channel is changed, the control unit 230 sets the RF1 mode and the RF2 mode to "waiting for RF2" (steps S1130 and S1131). After the RF1 mode and the RF2 mode are set to "waiting for RF2," the processing in step S106 is executed.

If the remaining time until the completion of CAC using the third communication channel is not shorter than the remaining time until the completion of CAC using the fourth communication channel in step S1125, the control unit 230 determines a communication channel to be set in the third wireless circuit 213 (step S1132). The processing in step S1132 is similar to the processing in step S1126.

After the communication channel is determined, the control unit 230 performs control for transmitting an RF3 switching instruction by radio waves using the wireless communication unit 210b (the first wireless circuit 211) (step S1133). Thereby, the wireless communication unit 210b (the first wireless circuit 211) transmits the RF3 switching instruction to the image transmission apparatus 100 by radio waves. The RF3 switching instruction transmitted in step S1133 includes information on the communication channel determined in step S1132.

After the RF3 switching instruction is transmitted, the control unit 230 changes the communication channel set in the third wireless circuit 213 (step S1134). In step S1134, the control unit 230 sets the communication channel determined in step S1132 in the third wireless circuit 213.

After the communication channel is changed, the control unit 230 sets the RF1 mode and the RF3 mode to "waiting for RF3" (steps S1136 and S1137). After the RF1 mode and the RF3 mode are set to "waiting for RF3," the processing in step S106 is executed.

If the RF3 mode is not "CAC" in step S1124, the processing in steps S1138, S1139, and S1140 are executed. The processing in steps S1138, S1139, and S1140 is similar to the processing in steps S124, S125, and S126. After the processing in step S1140 is executed, the processing in step S106 is executed.

If the RF2 mode is not "CAC" in step S1123, the processing in steps S1141, S1142, and S1143 are executed. The processing in steps S1141, S1142, and S1143 is similar to the processing in steps S121, S122, and S123. After the processing in step S1143 is executed, the processing in step S106 is executed.

If the RF1 mode is "waiting for RF1" in step S145, the control unit 230 determines whether or not the first wireless circuit 211 is disconnected (step S1144).

Figure 45:
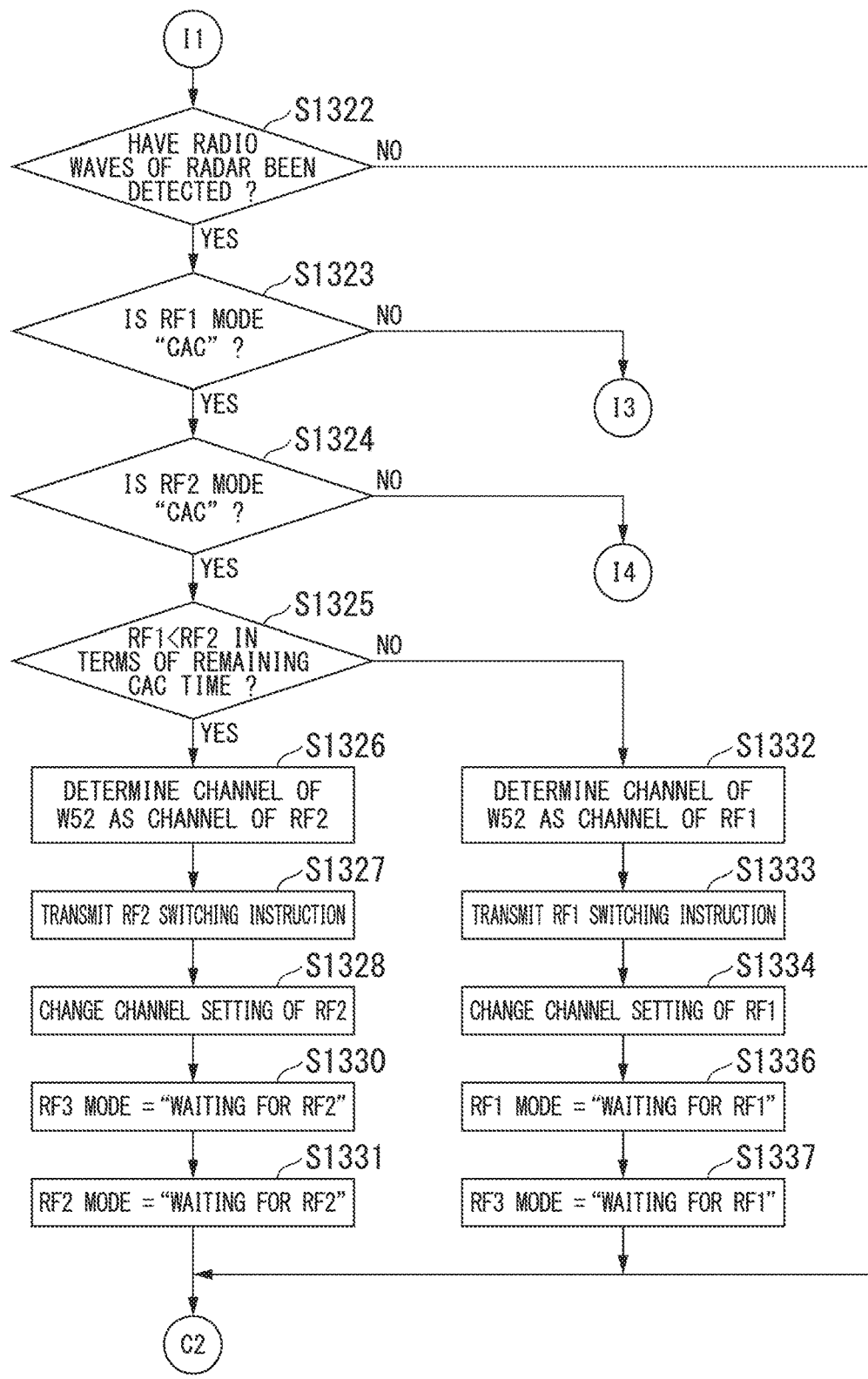
FIG. 45 is a flowchart showing a procedure of an operation of the image reception apparatus according to the second embodiment of the present invention.
Figure 46:
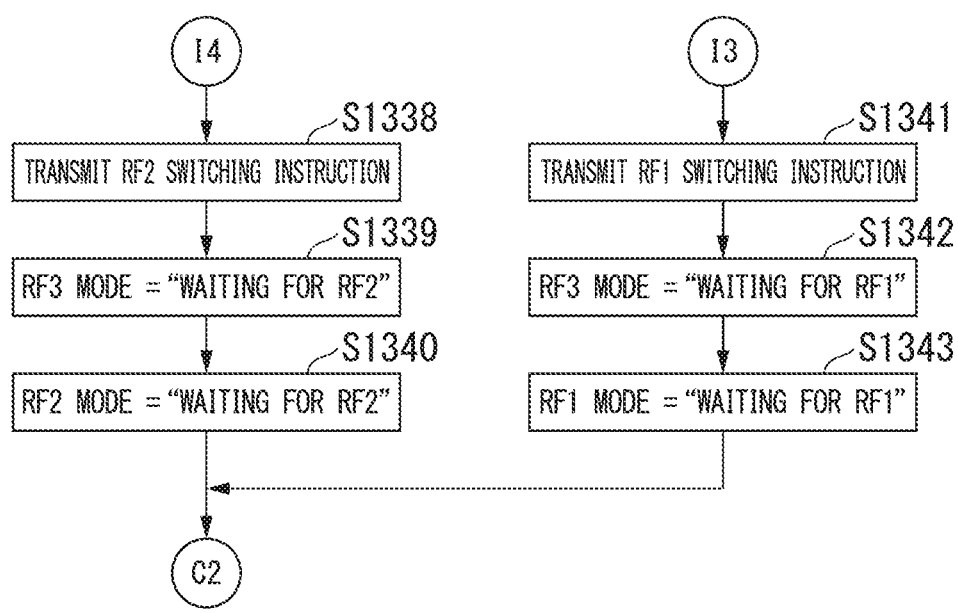
FIG. 46 is a flowchart showing a procedure of an operation of the image reception apparatus according to the second embodiment of the present invention.

If the first wireless circuit 211 is not disconnected in step S1144, the processing in step S146 is executed. If the first wireless circuit 211 is disconnected in step S1144, the control unit 230 performs control for performing a connection to the wireless communication unit 110 (the first wireless circuit 111) using the wireless communication unit 210b (the first wireless circuit 211) (step S1145). Thereby, the wireless communication unit 210b (the first wireless circuit 211) is connected to the wireless communication unit 110 (the first wireless circuit 111). In step S1145, the communication channel set in step S1248 in FIG. 39 or step S1334 in FIG. 45 is used. In step S1145, the process shown in FIG.

18 is executed. After the connection is completed, the processing in step S146 is executed.

FIGS. 35, 36, 37, 38, 39, 40, and 41 show a procedure of an operation of the image reception apparatus 200b related to the control of the second wireless circuit 212b.

When the image reception apparatus 200b is powered on, the control unit 230 initializes each functional block related to the second wireless circuit 212b (step S1201). In step S1201, the control unit 230 initializes the setting of the communication channel, the RF2CAC timer, the RF2CAC completion flag, and the operation mode of the second wireless circuit 212b.

In step S1201, any communication channel belonging to a band other than W52 may be set in the second wireless circuit 212b. For example, a communication channel corresponding to a channel number 14 is set in the second wireless circuit 212b. As shown in FIG. 4, the communication channel corresponding to the channel number 14 is channel 120 belonging to W56.

For example, the initial value of the RF2CAC timer is 0. After the RF2CAC timer is initialized, the value of the RF2CAC timer increases with the passage of time.

For example, an initial value of the RF2CAC completion flag is 0.

Information on the communication channel set in the second wireless circuit 212b is stored in the RAM 222. The value of the RF2CAC timer and the value of the RF2CAC completion flag are stored in the RAM 222. The RF2 mode is set to be "initialized." Information indicating the set operation mode is stored in the RAM 222.

In step S1201, the second radar detection unit 2120 starts a process of detecting radio waves of the radar.

After each functional block is initialized, the channel use confirmation unit 2300 executes CAC using the communication channel set in the second wireless circuit 212b (step S1202). In step S1202, the process shown in FIG. 17 is executed.

After the processing is executed in step S1202, the control unit 230 determines whether or not the RF2CAC completion flag is 1 (step S1203). If the RF2CAC completion flag is not 1 in step S1203, CAC using the communication channel set in the second wireless circuit 212b is not completed. Thus, the processing in step S1202 is executed again.

If the RF2CAC completion flag is 1 in step S1203, the control unit 230 performs control for performing a connection to the wireless communication unit 110 (the second wireless circuit 112) using the wireless communication unit 210b (the second wireless circuit 212b) (step S1204). Thereby, the wireless communication unit 210b (the second wireless circuit 212b) is connected to the wireless communication unit 110 (the second wireless circuit 112). In step S1204, the communication channel set when CAC is completed is used. In step S1204, the process shown in FIG. 18 is executed.

After the connection is completed, the control unit 230 sets the RF2 mode to "standby (connection complete)" (step S1205). After the RF2 mode is set to "standby (connection complete)," the control unit 230 determines whether or not the RF2 mode is "standby (connection complete)" (step S1206).

If the RF2 mode is "standby (connection complete)" in step S1206, the channel use confirmation unit 2300 receives information from the second radar detection unit 2120. The channel use confirmation unit 2300 determines whether or not the radio waves of the radar have been detected in the communication channel set in the second wireless circuit 212b by confirming the received information from the second radar detection unit 2120 (step S1207).

If the radio waves of the radar have been detected in step S1207, the channel use confirmation unit 2300 determines a communication channel to be set in the second wireless circuit 212b (step S1208). In step S1208, any communication channel belonging to a band other than W52 may be selected. For example, a communication channel whose channel number is different by one number from the channel number of the set communication channel is selected. In the channel state table, a communication channel for which 1 is recorded in the radar detection history may not be selected.

After the communication channel is determined, the channel use confirmation unit 2300 changes the communication channel set in the second wireless circuit 212b (step S1209). In step S1209, the channel use confirmation unit 2300 sets the communication channel determined in step S1208 in the second wireless circuit 212b.

After the communication channel is changed, the channel use confirmation unit 2300 clears the RF2CAC timer (step S1210). That is, the RF2CAC timer is initialized. After the RF2CAC timer is cleared, the channel use confirmation unit 2300 sets the RF2 mode to "CAC" (step S1211). After the RF2 mode is set to "CAC," the processing in step S1206 is executed.

If the RF2 mode is not "standby (connection complete)" in step S1206, the control unit 230 determines whether or not the RF2 mode is "CAC" (step S1212).

If the RF2 mode is "CAC" in step S1212, the channel use confirmation unit 2300 executes CAC using the communication channel set in the second wireless circuit 212b (step S1213). In step S1213, the process shown in FIG. 17 is executed.

After the processing is executed in step S1213, the control unit 230 determines whether or not the RF2CAC completion flag is 1 (step S1214). If the RF2CAC completion flag is not 1 in step S1214, CAC using the communication channel set in the second wireless circuit 212b is not completed. Thus, the processing in step S1213 is executed again.

If the RF2CAC completion flag is 1 in step S1214, the control unit 230 performs control for performing a connection to the wireless communication unit 110 (the second wireless circuit 112) using the wireless communication unit 210b (the second wireless circuit 212b) (step S1215). Thereby, the wireless communication unit 210b (the second wireless circuit 212b) is connected to the wireless communication unit 110 (the second wireless circuit 112). In step S1215, the communication channel set when CAC is completed is used. In step S1215, the process shown in FIG. 18 is executed.

After the connection is completed, the control unit 230 sets the RF2 mode to "standby (connection complete)" (step S1216). After the RF2 mode is set to "standby (connection complete)," the processing in step S1206 is executed.

If the RF2 mode is not "CAC" in step S1212, the control unit 230 determines whether or not the RF2 mode is "waiting for RF2" (step S1217).

If the RF2 mode is "waiting for RF2" in step S1217, the control unit 230 determines whether or not the second wireless circuit 212b is disconnected (step S1217a).

If the second wireless circuit 212b is not disconnected in step S1217a, the processing in step S1218 is executed. If the second wireless circuit 212b is disconnected in step S1217a, the control unit 230 performs control for performing a connection to the wireless communication unit 110 (the second wireless circuit 112) using the wireless communication unit 210b (the second wireless circuit 212b) (step S1217b). Thereby, the wireless communication unit 210b (the second wireless circuit 212b) is connected to the wireless communication unit 110 (the second wireless circuit 112). In step S1217b, the communication channel set in step S1128 or step S1328 in FIG. 45 is used. In step S1217b, the process shown in FIG. 18 is executed.

After the connection is completed, image reception preparation of the second wireless circuit 212b is completed (step S1218). In step S1218, information indicating that the image reception preparation of the second wireless circuit 212b is completed is stored in the RAM 222. After the image reception preparation of the second wireless circuit 212b is completed, the processing in step S1206 is executed.

If the RF2 mode is not "waiting for RF2" in step S1217, the control unit 230 determines whether or not the RF2 mode is "image reception" (step S1219).

If the RF2 mode is "image reception" in step S1219, the control unit 230 performs control for receiving image data by radio waves using the wireless communication unit 210b (the second wireless circuit 212b) (step S1220). Thereby, the wireless communication unit 210b (the second wireless circuit 212b) receives the image data from the image transmission apparatus 100 by radio waves. For example, in step S1220, image data of one frame is received. The image processing unit 201 performs image processing on the received image data to generate display data. The display apparatus 300 displays an image on the basis of the display data.

After the image data is received in step S1220, the control unit 230 determines whether or not the second wireless circuit 212b is receiving image data on the communication channel belonging to W52 (step S1221).

If the second wireless circuit 212b is receiving image data on the communication channel belonging to W52 in step S1221, the control unit 230 determines whether or not the RF1 mode is "standby (connection complete)" (step S1222).

If the RF1 mode is "standby (connection complete)" in step S1222, the control unit 230 determines whether or not the image reception preparation of the first wireless circuit 211 has been completed (step S1223). In step S1223, processing is executed on the basis of the information stored in the RAM 222.

If the image reception preparation of the first wireless circuit 211 has been completed in step S1223, the control unit 230 performs control for transmitting an image transmission switching instruction by radio waves using the wireless communication unit 210b (the second wireless circuit 212b) (step S1224). Thereby, the wireless communication unit 210b (the second wireless circuit 212b) transmits the image transmission switching instruction to the image transmission apparatus 100 by radio waves. Because the image reception preparation of the first wireless circuit 211 is completed, the communication channel to be used for image transmission is switched from the second communication channel to the communication channel set in the first wireless circuit 211.

After the image transmission switching instruction is transmitted, the control unit 230 sets the RF1 mode to "image reception" (step S1225). After the RF1 mode is set to "image reception," the control unit 230 determines a communication channel to be set in the second wireless circuit 212b (step S1225a). In step S1225a, any communication channel belonging to a band other than W52 may be selected. In the channel state table, the communication channel for which 1 is recorded in the radar detection history may not be selected.

After the communication channel is determined, the control unit 230 changes the communication channel set in the second wireless circuit 212b (step S1226). In step S1226, the control unit 230 sets the communication channel determined in step S1225a in the second wireless circuit 212b.

After the communication channel is changed, the control unit 230 clears the RF2CAC timer (step S1227). That is, the RF2CAC timer is initialized. After the RF2CAC timer is cleared, the control unit 230 sets the RF2 mode to "CAC" (step S1228). After the RF2 mode is set to "CAC," the processing in step S1206 is executed.

If the image reception preparation of the first wireless circuit 211 has not been completed in step S1223, the control unit 230 transmits an RF1 switching instruction by radio waves using the wireless communication unit 210b (the second wireless circuit 212 b) (step S1229). Thereby, the wireless communication unit 210b (the second wireless circuit 212b) transmits the RF1 switching instruction to the image transmission apparatus 100 by radio waves.

After the RF1 switching instruction is transmitted, the control unit 230 sets the RF2 mode and the RF1 mode to "waiting for RF1" (step S1230, step S1231). After the RF2 mode and the RF1 mode are set to "waiting for RF1," the processing in step S1206 is executed.

If the RF1 mode is not "standby (connection complete)" in step S1222, the control unit 230 determines whether or not the RF3 mode is "standby (connection complete)" (step S1232).

If the RF3 mode is "standby (connection complete)" in step S1232, the control unit 230 determines whether or not image reception preparation of the third wireless circuit 213 has been completed (step S1233). In step S1233, processing is executed on the basis of the information stored in the RAM 222.

If the image reception preparation of the third wireless circuit 213 has been completed in step S1233, the control unit 230 performs control for transmitting an image transmission switching instruction by radio waves using the wireless communication unit 210b (the second wireless circuit 212b) (step S1234). Thereby, the wireless communication unit 210b (the second wireless circuit 212b) transmits the image transmission switching instruction to the image transmission apparatus 100 by radio waves. Because the image reception preparation by the third wireless circuit 213 is completed, the communication channel to be used for image transmission is switched from the second communication channel to the communication channel set in the third wireless circuit 213.

After the image transmission switching instruction is transmitted, the control unit 230 sets the RF3 mode to "image reception" (step S1235). After the RF3 mode is set to "image reception," the processing in steps S1235a, S1236, S1237, and S1238 is executed. The processing in steps S1235a, S1236, S1237, and S1238 is similar to the processing in steps S1225a, S1226, S1227, and S1228, respectively. After the processing in step S1238 is executed, the processing in step S1206 is executed.

If the image reception preparation of the third wireless circuit 213 has not been completed in step S1233, the control unit 230 transmits an RF3 switching instruction by radio waves using the wireless communication unit 210b (the second wireless circuit 212b) (step S1239). Thereby, the wireless communication unit 210b (the second wireless circuit 212b) transmits the RF3 switching instruction to the image transmission apparatus 100 by radio waves.

After the RF3 switching instruction is transmitted, the control unit 230 sets the RF2 mode and the RF3 mode to "waiting for RF3" (steps S1240 and S1241). After the RF2 mode and the RF3 mode are set to "waiting for RF3," the processing in step S1206 is executed.

If the second wireless circuit 212*b* is not receiving image data on the communication channel belonging to W52 in step S1221, the second wireless circuit 212*b* receives image data on a communication channel of a band other than W52. The channel use confirmation unit 2300 receives information from the second radar detection unit 2120. By confirming the received information, the channel use confirmation unit 2300 determines whether or not the radio waves of the radar have been detected in the communication channel set in the second wireless circuit 212*b* (step S1242).

If the radio waves of the radar have been detected in step S1242, the control unit 230 determines whether or not the RF1 mode is "CAC" (step S1243).

If the RF1 mode is "CAC" in step S1243, the control unit 230 determines whether or not the RF3 mode is "CAC" (step S1244).

If the RF3 mode is "CAC" in step S1244, the control unit 230 compares a time measured by the RF3 CAC timer with a time measured by the RF1CAC timer. When image data communication using the second communication channel is being performed, CAC using the communication channel set in the third wireless circuit 213 and CAC using the communication channel set in the first wireless circuit 211 are executed. The control unit 230 determines whether or not the remaining time until completion of CAC using the communication channel set in the third wireless circuit 213 is shorter than the remaining time until completion of CAC using the communication channel set in the first wireless circuit 211 (step S1245).

If the remaining time until the completion of CAC using the communication channel set in the third wireless circuit 213 is shorter than the remaining time until the completion of CAC using the communication channel set in the first wireless circuit 211 in step S1245, the control unit 230 determines a communication channel to be set in the first wireless circuit 211 (step S1246). In step S1246, any communication channel belonging to W52 may be selected.

After the communication channel is determined, the control unit 230 performs control for transmitting an RF1 switching instruction by radio waves using the wireless communication unit 210*b* (the second wireless circuit 212*b*) (step S1247). Thereby, the wireless communication unit 210*b* (the second wireless circuit 212*b*) transmits the RF1 switching instruction to the image transmission apparatus 100 by radio waves. The RF1 switching instruction transmitted in step S1247 includes information on the communication channel determined in step S1246.

After the RF1 switching instruction is transmitted, the control unit 230 changes the communication channel set in the second wireless circuit 212*b* (step S1248). In step S1248, the control unit 230 sets the communication channel determined in step S1246 in the second wireless circuit 212*b*.

After the communication channel is changed, the control unit 230 sets the RF2 mode and the RF1 mode to "waiting for RF1" (steps S1250 and S1251). After the RF2 mode and the RF1 mode are set to "waiting for RF1," the processing in step S1206 is executed.

If the remaining time until the completion of CAC using the communication channel set in the third wireless circuit 213 is not shorter than the remaining time until the completion of CAC using the communication channel set in the first wireless circuit 211 in step S1245, the control unit 230 determines a communication channel to be set in the third wireless circuit 213 (step S1252). The processing in step S1252 is similar to the processing in step S1246.

After the communication channel is determined, the control unit 230 performs control for transmitting an RF3 switching instruction by radio waves using the wireless communication unit 210*b* (the second wireless circuit 212*b*) (step S1253). Thereby, the wireless communication unit 210*b* (the second wireless circuit 212*b*) transmits the RF3 switching instruction to the image transmission apparatus 100 by radio waves. The RF3 switching instruction transmitted in step S1253 includes information on the communication channel determined in step S1252.

After the RF3 switching instruction is transmitted, the control unit 230 changes the communication channel set in the third wireless circuit 213 (step S1254). In step S1254, the control unit 230 sets the communication channel determined in step S1252 in the third wireless circuit 213.

After the communication channel is changed, the control unit 230 sets the RF2 mode and the RF3 mode to "waiting for RF3" (steps S1256 and S1257). After the RF2 mode and the RF3 mode are set to "waiting for RF3," the processing in step S1206 is executed.

If the RF3 mode is not "CAC" in step S1244, the control unit 230 performs control for transmitting an RF3 switching instruction by radio waves using the wireless communication unit 210*b* (the second wireless circuit 212*b*) (step S1258). Thereby, the wireless communication unit 210*b* (the second wireless circuit 212*b*) transmits the RF3 switching instruction to the image transmission apparatus 100 by radio waves.

After the RF3 switching instruction is transmitted, the control unit 230 sets the RF2 mode and the RF3 mode to "waiting for RF3" (steps S1259 and S1260). After the RF2 mode and the RF3 mode are set to "waiting for RF3," the processing in step S1206 is executed.

If the RF1 mode is not "CAC" in step S1243, the control unit 230 performs control for transmitting an RF1 switching instruction by radio waves using the wireless communication unit 210*b* (the second wireless circuit 212*b*) (step S1261). Thereby, the wireless communication unit 210*b* (the second wireless circuit 212*b*) transmits the RF1 switching instruction to the image transmission apparatus 100 by radio waves.

After the RF1 switching instruction is transmitted, the control unit 230 sets the RF2 mode and the RF1 mode to "waiting for RF1" (steps S1262 and S1263). After the RF2 mode and the RF1 mode are set to "waiting for RF1," the processing in step S1206 is executed.

If the RF2 mode is not "image reception" in step S1219, the control unit 230 determines whether or not the RF2 mode is "waiting for RF3" (step S1264).

If the RF2 mode is "waiting for RF3" in step S1264, the control unit 230 performs control for receiving image data by radio waves using the wireless communication unit 210*b* (the second wireless circuit 212*b*) (step S1265). Thereby, the wireless communication unit 210*b* (the second wireless circuit 212*b*) receives the image data from the image transmission apparatus 100 by radio waves. The processing in step S1265 is similar to the processing in step S1220.

After the image data is received, the control unit 230 determines whether or not image reception preparation of the third wireless circuit 213 has been completed (step S1266). In step S1266, processing is executed on the basis of the information stored in the RAM 222.

If the image reception preparation by the third wireless circuit 213 has not been completed in step S1266, the processing in step S1206 is executed. If the image reception preparation of the third wireless circuit 213 has been completed in step S1266, the control unit 230 performs control for transmitting an image transmission switching instruction by radio waves using the wireless communication unit 210*b* (the second wireless circuit 212*b*) (step S1267). Thereby, the wireless communication unit 210*b* (the second wireless circuit 212*b*) transmits the image transmission switching instruction to the image transmission apparatus 100 by radio waves. Because the image reception preparation by the third wireless circuit 213 is completed, the communication channel to be used for image transmission is switched from the second communication channel to the communication channel set in the third wireless circuit 213.

After the image transmission switching instruction is transmitted, the control unit 230 sets the RF3 mode to "image reception" (step S1268). After the RF3 mode is set to "image reception," the processing in steps S1269, S1270, S1271, and S1272 is executed. The processing in steps S1269, S1270, S1271, and S1272 is similar to the processing in steps S1235*a*, S1236, S1237, and S1238, respectively. After the processing in step S1272 is executed, the processing in step S1206 is executed.

If the RF2 mode is not "waiting for RF3" in step S1264, the control unit 230 determines whether or not the RF2 mode is "waiting for RF1" (step S1273).

If the RF2 mode is not "waiting for RF1" in step S1273, the processing in step S1206 is executed. If the RF2 mode is "waiting for RF1" in step S1273, the control unit 230 performs control for receiving image data by radio waves using the wireless communication unit 210*b* (the second wireless circuit 212*b*) (step S1274). Thereby, the wireless communication unit 210*b* (the second wireless circuit 212*b*) receives the image data from image transmission apparatus 100 by radio waves. The processing in step S1274 is similar to the processing in step S1220.

After the image data is received, the control unit 230 determines whether or not the image reception preparation of the first wireless circuit 211 has been completed (step S1275). In step S1275, processing is executed on the basis of the information stored in the RAM 222.

If the image reception preparation of the first wireless circuit 211 has not been completed in step S1275, the processing in step S1206 is executed. If the image reception preparation of the first wireless circuit 211 has been completed in step S1275, the control unit 230 performs control for transmitting an image transmission switching instruction by radio waves using the wireless communication unit 210*b* (the second wireless circuit 212*b*) (step S1276). Thereby, the wireless communication unit 210*b* (the second wireless circuit 212*b*) transmits the image transmission switching instruction to the image transmission apparatus 100 by radio waves. Because the image reception preparation of the first wireless circuit 211 is completed, the communication channel to be used for image transmission is switched from the second communication channel to the communication channel set in the first wireless circuit 211.

After the image transmission switching instruction is transmitted, the control unit 230 sets the RF1 mode to "image reception" (step S1277). After the RF1 mode is set to "image reception," the processing in steps S1278, S1279, S1280, and S1281 is executed. The processing in steps S1278, S1279, S1280, and S1281 is similar to the processing in steps S1235*a*, S1236, S1237, and S1238, respectively. After the processing in step S1281 is executed, the processing in step S1206 is executed.

Figure 13:
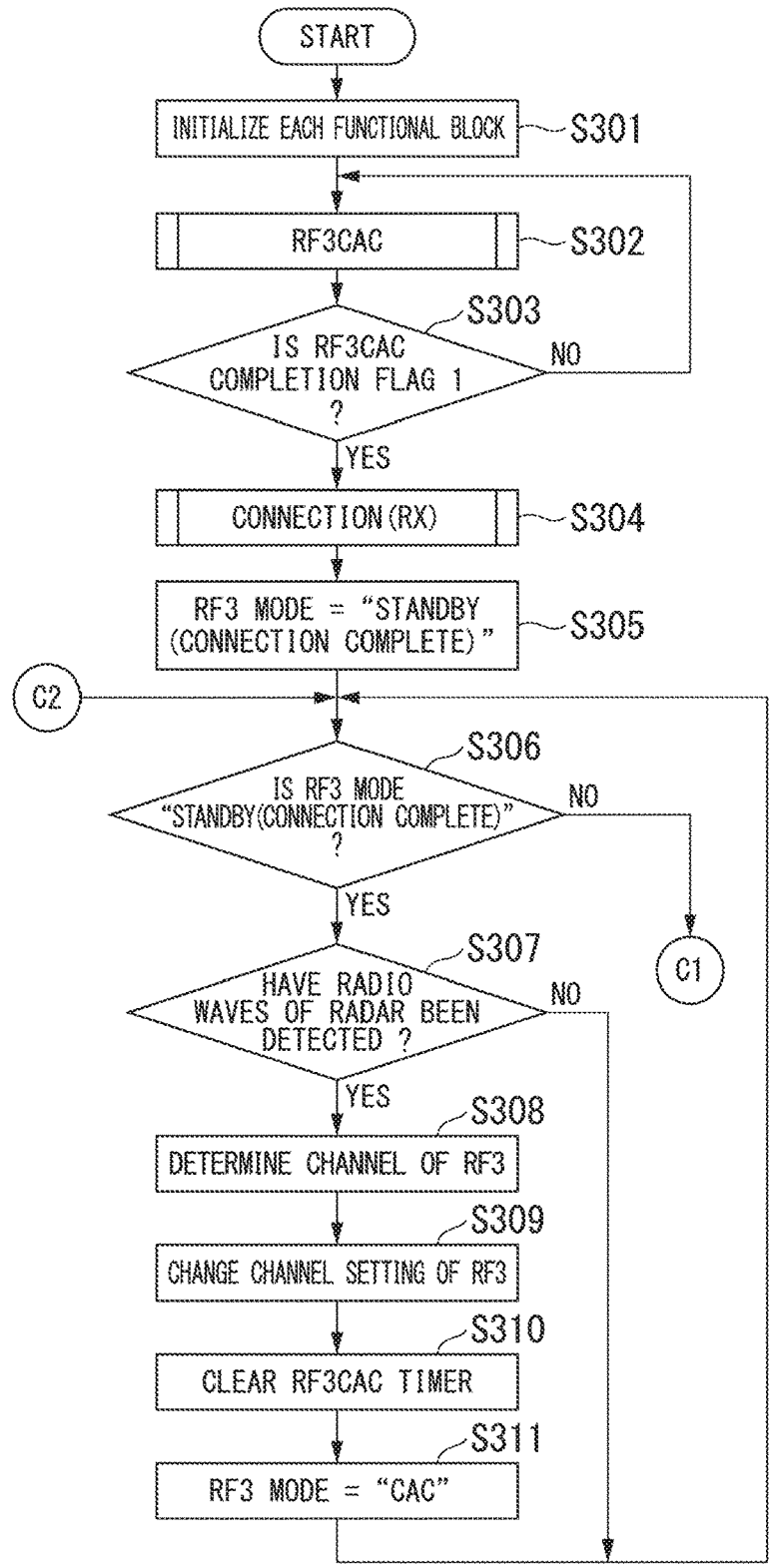
FIG. 13 is a flowchart showing a procedure of an operation of the image reception apparatus according to the first embodiment of the present invention.
Figure 14:
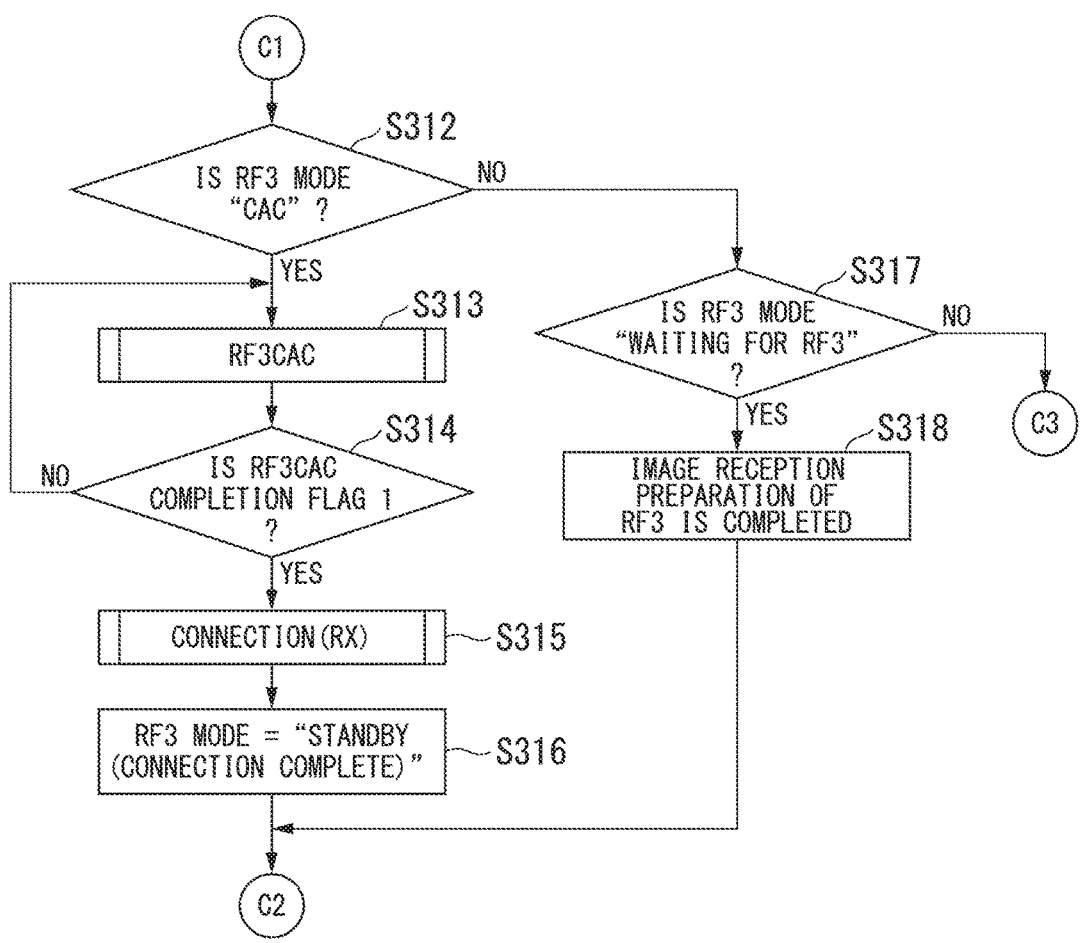
FIG. 14 is a flowchart showing a procedure of an operation of the image reception apparatus according to the first embodiment of the present invention.
Figure 15:
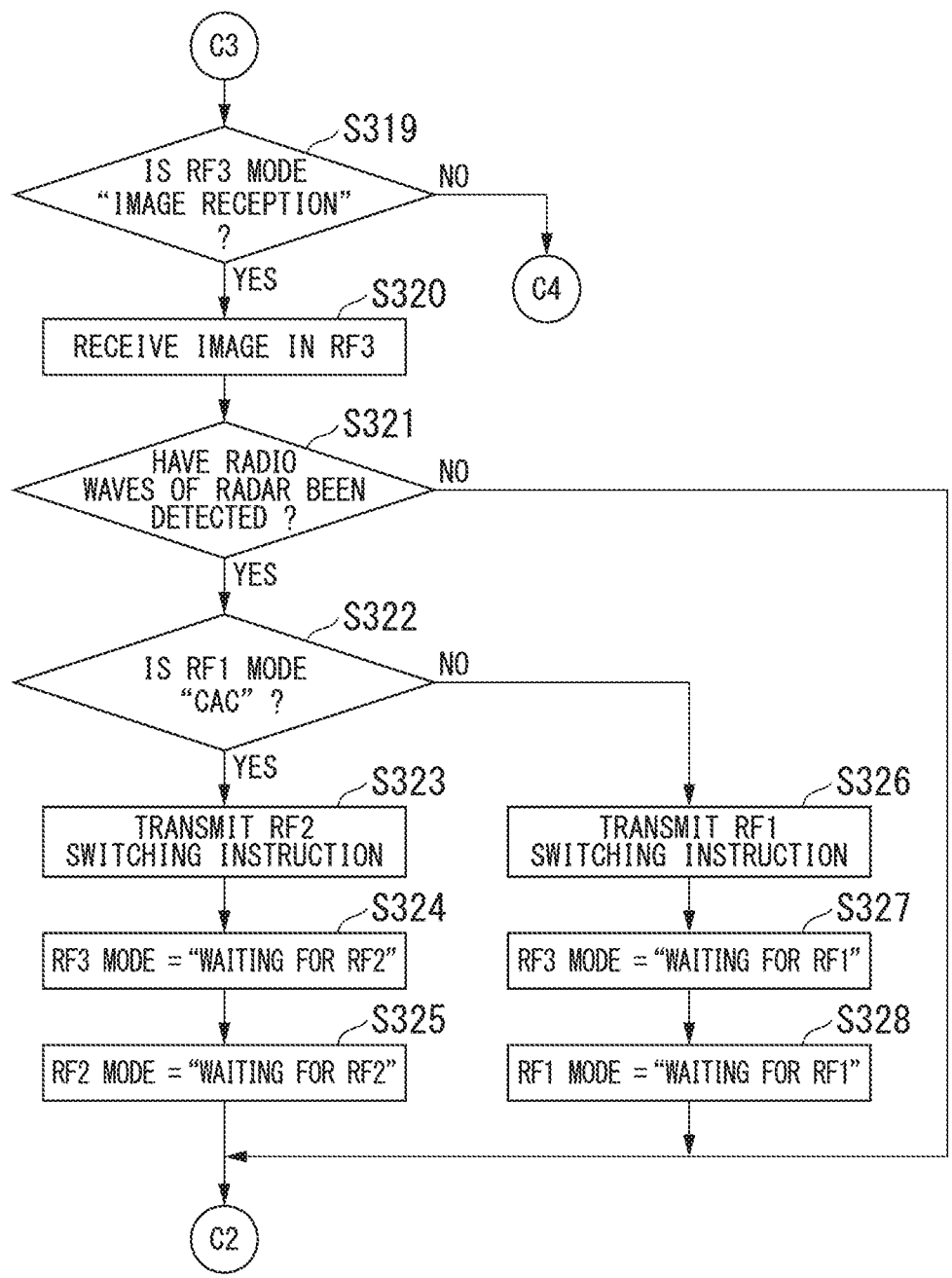
FIG. 15 is a flowchart showing a procedure of an operation of the image reception apparatus according to the first embodiment of the present invention.

FIGS. 42, 43, 44, 45, and 46 show a procedure of the operation of the image reception apparatus 200*b* related to the control of the third wireless circuit 213. The operation shown in FIG. 13 is common to the first embodiment and the second embodiment. The operation shown in FIG. 14 is changed to the operation shown in FIG. 42. The operation shown in FIG. 15 is changed to the operation shown in FIGS. 43, 44, 45, and 46.

If the RF3 mode is "waiting for RF3" in step S317, the control unit 230 determines whether or not the third wireless circuit 213 is disconnected (step S317*a*).

If the third wireless circuit 213 is not disconnected in step S317*a*, the processing in step S318 is executed. If the third wireless circuit 213 is disconnected in step S317*a*, the control unit 230 performs control for performing a connection to the wireless communication unit 110 (the third wireless circuit 113) using the wireless communication unit 210*b* (the third wireless circuit 213) (step S317*b*). Thereby, the wireless communication unit 210*b* (the third wireless circuit 213) is connected to the wireless communication unit 110 (the third wireless circuit 113). In step S317*b*, the communication channel set in step S1134 or S1254 is used. In step S317*b*, the process shown in FIG. 18 is executed. After the connection is completed, the processing in step S318 is executed.

After the image data is received in step S320, the control unit 230 determines whether or not the third wireless circuit 213 is receiving image data on the communication channel belonging to W52 (step S1301).

If the third wireless circuit 213 is receiving image data on the communication channel belonging to W52 in step S1301, the control unit 230 determines whether or not the RF1 mode is "standby (connection complete)" (step S1302).

If the RF1 mode is "standby (connection complete)" in step S1302, the control unit 230 determines whether or not image reception preparation of the first wireless circuit 211 has been completed (step S1303). In step S1303, processing is executed on the basis of the information stored in the RAM 222.

If the image reception preparation of the first wireless circuit 211 has been completed in step S1303, the processing in steps S1304, S1305, S1305*a*, S1306, S1307, and S1308 is executed. The processing in steps S1304, S1305, S1305*a*, S1306, S1307, and S1308 is similar to the processing in steps S332, S333, S334, S335, S336, and S337, respectively. After the processing in step S1308 is executed, the processing in step S306 is executed.

If the image reception preparation of the first wireless circuit 211 has not been completed in step S1303, the processing in steps S1309, S1310, and S1311 is executed. The processing in steps S1309, S1310, and S1311 is similar to the processing in steps S326, S327, and S328. After the processing in step S1311 is executed, the processing in step S306 is executed.

If the RF1 mode is not "standby (connection complete)" in step S1302, the control unit 230 determines whether or not the RF2 mode is "standby (connection complete)" (step S1312).

If the RF2 mode is "standby (connection complete)" in step S1312, the control unit 230 determines whether or not image reception preparation of the second wireless circuit 212*b* has been completed (step S1313). In step S1313, processing is executed on the basis of the information stored in the RAM 222.

If the image reception preparation of the second wireless circuit 212*b* has been completed in step S1313, the processing in steps S1314, S1315, S1315*a*, S1316, S1317, and S1318 is executed. The processing in steps S1314, S1315, S1315*a*, S1316, S1317, and S1318 is similar to the processing in steps S341, S342, S343, S344, S345, and S346, respectively. After the processing in step S1318 is executed, the processing in step S306 is executed.

If the image reception preparation by the second wireless circuit 212b has not been completed in step S1313, the processing in steps S1319, S1320, and S1321 is executed. The processing in steps S1319, S1320, and S1321 is similar to the processing in steps S323, S324, and S325, respectively. After the processing in step S1321 is executed, the processing in step S306 is executed.

If the third wireless circuit 213 is not receiving image data on the communication channel belonging to W52 in step S1301, the third wireless circuit 213 receives the image data on the communication channel of a band other than W52. The channel use confirmation unit 2300 receives information from the third radar detection unit 2130. The channel use confirmation unit 2300 determines whether or not the radio waves of the radar have been detected in the communication channel set in the third wireless circuit 213 by confirming the received information (step S1322).

If the radio waves of the radar have been detected in step S1322, the control unit 230 determines whether or not the RF1 mode is "CAC" (step S1323).

If the RF1 mode is "CAC" in step S1323, the control unit 230 determines whether or not the RF2 mode is "CAC" (step S1324).

If the RF2 mode is "CAC" in step S1324, the control unit 230 compares a time measured by the RF1CAC timer with a time measured by the RF2CAC timer. When image data communication using the third communication channel is being performed, CAC using the communication channel set in the first wireless circuit 211 and CAC using the communication channel set in the second wireless circuit 212b are executed. The control unit 230 determines whether or not the remaining time until completion of CAC using the communication channel set in the first wireless circuit 211 is shorter than the remaining time until completion of CAC using the communication channel set in the second wireless circuit 212b (step S1325).

If the remaining time until the completion of CAC using the communication channel set in the first wireless circuit 211 is shorter than the remaining time until the completion of CAC using the communication channel set in the second wireless circuit 212b in step S1325, the control unit 230 determines a communication channel to be set in the second wireless circuit 212b (step S1326). In step S1326, any communication channel belonging to W52 may be selected.

After the communication channel is determined, the control unit 230 performs control for transmitting an RF2 switching instruction by radio waves using the wireless communication unit 210b (the third wireless circuit 213) (step S1327). Thereby, the wireless communication unit 210b (the third wireless circuit 213) transmits the RF2 switching instruction to the image transmission apparatus 100 by radio waves. The RF2 switching instruction transmitted in step S1327 includes information on the communication channel determined in step S1326.

After the RF2 switching instruction is transmitted, the control unit 230 changes the communication channel set in the second wireless circuit 212b (step S1328). In step S1328, the control unit 230 sets the communication channel determined in step S1326 in the second wireless circuit 212b.

After the communication channel is changed, the control unit 230 sets the RF3 mode and the RF2 mode to "waiting for RF2" (steps S1330 and S1331). After the RF3 mode and the RF2 mode are set to "waiting for RF2," the processing in step S306 is executed.

If the remaining time until the completion of CAC using the communication channel set in the first wireless circuit 211 is not shorter than the remaining time until the completion of CAC using the communication channel set in the second wireless circuit 212b in step S1325, the control unit 230 determines a communication channel to be set in the first wireless circuit 211 (step S1332). The processing in step S1332 is similar to the processing in step S1326.

After the communication channel is determined, the control unit 230 performs control for transmitting an RF1 switching instruction by radio waves using the wireless communication unit 210b (the third wireless circuit 213) (step S1333). Thereby, the wireless communication unit 210b (the third wireless circuit 213) transmits the RF1 switching instruction to the image transmission apparatus 100 by radio waves. The RF1 switching instruction transmitted in step S1333 includes information on the communication channel determined in step S1332.

After the RF1 switching instruction is transmitted, the control unit 230 changes the communication channel set in the first wireless circuit 211 (step S1334). In step S1334, the control unit 230 sets the communication channel determined in step S1332 in the first wireless circuit 211.

After the communication channel is changed, the control unit 230 sets the RF1 mode and the RF3 mode to "waiting for RF1" (steps S1336 and S1337). After the RF1 mode and the RF3 mode are set to "waiting for RF1," the processing in step S306 is executed.

If the RF2 mode is not "CAC" in step S1324, the processing in steps S1338, S1339, and S1340 is executed. The processing in steps S1338, S1339, and S1340 is similar to the processing in steps S323, S324, and S325. After the processing in step S1340 is executed, the processing in step S306 is executed.

If the RF1 mode is not "CAC" in step S1323, the processing in steps S1341, S1342, and S1343 is executed. The processing in steps S1341, S1342, and S1343 is similar to the processing in steps S326, S327, and S328. After the processing in step S1343 is executed, the processing in step S306 is executed.

As described above, the channel use confirmation unit 2300 executes CAC using the fourth communication channel when the image data communication using the first communication channel is being performed (corresponding to steps S302, S313, S1202, and S1213).

If CAC is not completed in any of the third communication channel and the fourth communication channel at a point in time at which the radio waves of the radar are detected, the channel use confirmation unit 2300 suspends either CAC of the third communication channel or CAC of the fourth communication channel which has a longer remaining time until completion of CAC (corresponding to steps S1126 and S1132). The wireless communication unit 210b changes the communication channel set in the wireless communication unit 210b from the communication channel on which CAC is suspended to the second communication channel (corresponding to steps S1128 and S1134). The wireless communication unit 210b starts image data communication using the second communication channel (corresponding to steps S1220 and S320).

The channel use confirmation unit 2300 continues either CAC of the third communication channel or CAC of the fourth communication channel which has a shorter remaining time until completion (corresponding to steps S302, S313, S1202, and S1213). After the continued CAC is completed, the wireless communication unit 210b starts image data communication using the third communication channel or the fourth communication channel for which the CAC has been completed (corresponding to steps S1220 and S320). After the continued CAC is completed, the wireless communication unit 210b stops the image data communication using the second communication channel (corresponding to steps S1226, S1236, S1306, and S1316).

The operation of the image transmission apparatus 100 is similar to that of the image transmission apparatus 100 according to the first embodiment. If any one of the RF1 switching instruction, the RF2 switching instruction, and the RF3 switching instruction including the information of the communication channel is received, the wireless communication unit 110 performs a connection using the communication channel indicated by the information of the communication channel.

Figure 47:
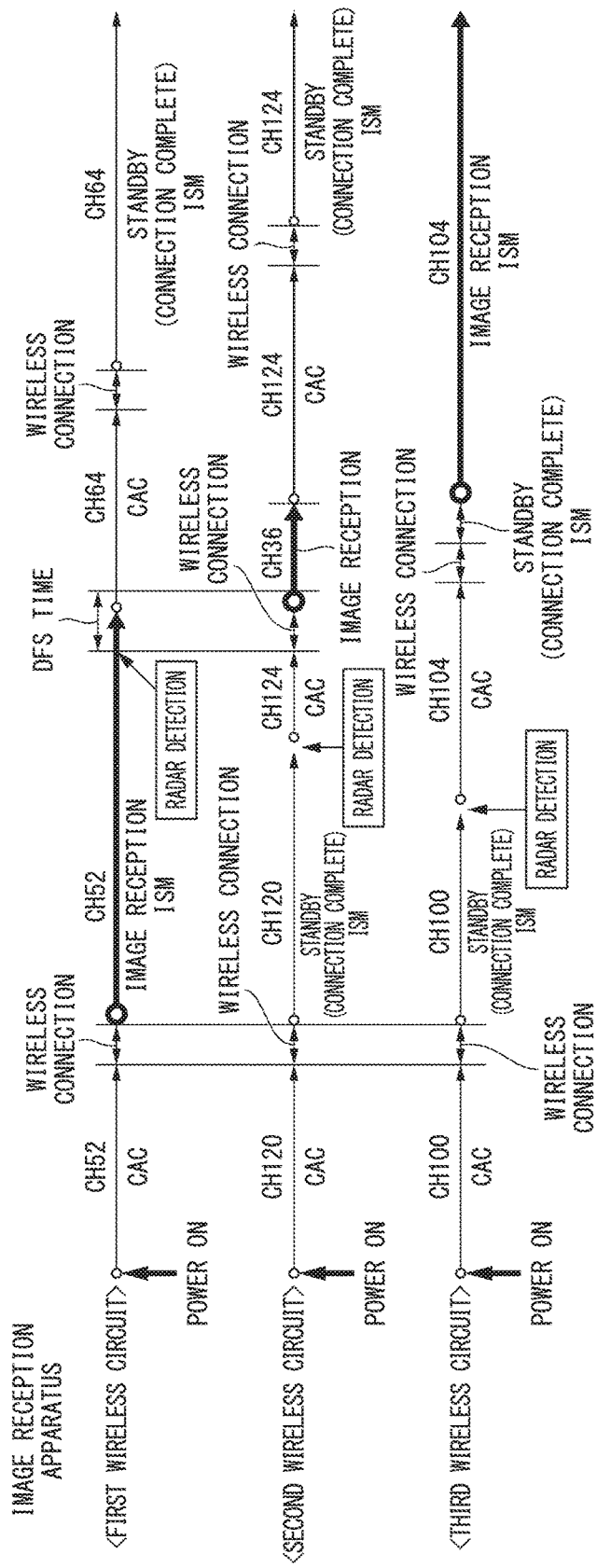
FIG. 47 is a sequence diagram showing an operation of each wireless circuit included in the image reception apparatus according to the second embodiment of the present invention.

FIG. 47 shows an operation of each wireless circuit included in the image reception apparatus 200b. After the image reception apparatus 200b is powered on, CAC using channel 52 belonging to a band other than W52 is executed in the first wireless circuit 211 (corresponding to step S102). After CAC is completed, the first wireless circuit 211 is connected to the first wireless circuit 111 using channel 52 (corresponding to step S104). After the connection is completed, the first wireless circuit 211 receives the image data using channel 52 (the first communication channel) (corresponding to step S118). When image data is being received, ISM is executed in the first wireless circuit 211 (corresponding to step S119).

After the image reception apparatus 200b is powered on, CAC using channel 120 belonging to a band other than W52 is executed in the second wireless circuit 212b (corresponding to step S1202). After CAC is completed, the second wireless circuit 212b is connected to the second wireless circuit 112 using channel 120 (corresponding to step S1204). After the connection is completed, the second wireless circuit 212b is on standby (corresponding to step S1205). During standby, ISM is executed in the second wireless circuit 212b (corresponding to step S1207). If radio waves of the radar are detected (corresponding to step S1207), the communication channel is changed to channel 124 (the fourth communication channel) in the second wireless circuit 212b and CAC is executed (corresponding to steps S1208 to S1211 and step S1213).

After the image reception apparatus 200b is powered on, CAC using channel 100 belonging to a band other than W52 is executed in the third wireless circuit 213 (corresponding to step S302). After CAC is completed, the third wireless circuit 213 is connected to the third wireless circuit 113 using channel 100 (corresponding to step S304). After the connection is completed, the third wireless circuit 213 is on standby (corresponding to step S305). During standby, ISM is executed in the third wireless circuit 213 (corresponding to step S307). If radio waves of the radar are detected (corresponding to step S307), the communication channel is changed to channel 104 (the third communication channel) in the third wireless circuit 213 and CAC is executed (corresponding to steps S308 to S311 and S313). After CAC is completed, the third wireless circuit 213 is connected to the third wireless circuit 113 using channel 104 (corresponding to step S315). After the connection is completed, the third wireless circuit 213 is on standby (corresponding to step S316). During standby, ISM is executed in the third wireless circuit 213 (corresponding to step S307).

When the first wireless circuit 211 is receiving image data, radio waves of the radar are detected (corresponding to step S119). At this point in time, CAC is not completed in any of the third communication channel and the fourth communication channel Thus, CAC of the fourth communication channel having a long remaining time until completion of CAC is suspended (corresponding to steps S1126 to S1131). The second wireless circuit 212b is connected to the second wireless circuit 112 using channel 36 belonging to W52 (corresponding to step S1217b). After the connection is completed, the second wireless circuit 212b receives the image data using channel 36 (the second communication channel) (corresponding to step S1220). That is, the communication channel to be used for image transmission is switched from the first communication channel to the second communication channel Thereby, the first wireless circuit 211 stops receiving the image data. Switching of the communication channel is performed within a DFS time from a point in time at which the radio waves of the radar are detected.

After receiving of the image data is stopped, CAC using channel 64 different from channel 52 used for receiving the image data is executed in the first wireless circuit 211 (corresponding to step S113). After CAC is completed, the first wireless circuit 211 is connected to the first wireless circuit 111 using channel 64 (corresponding to step S115). After the connection is completed, the first wireless circuit 211 is on standby (corresponding to step S116).

If CAC is completed in the third wireless circuit 213 after the second wireless circuit 212b starts receiving the image data, the communication channel to be used for image transmission is switched from the second communication channel to the third communication channel (corresponding to steps S1234 to S1241 and step S318). Thereby, the third wireless circuit 213 receives the image data using channel 104 (corresponding to step S320). When image data is being received, ISM is executed in the third wireless circuit 213 (corresponding to step S1322). Also, the second wireless circuit 212b stops receiving the image data.

Figure 48:
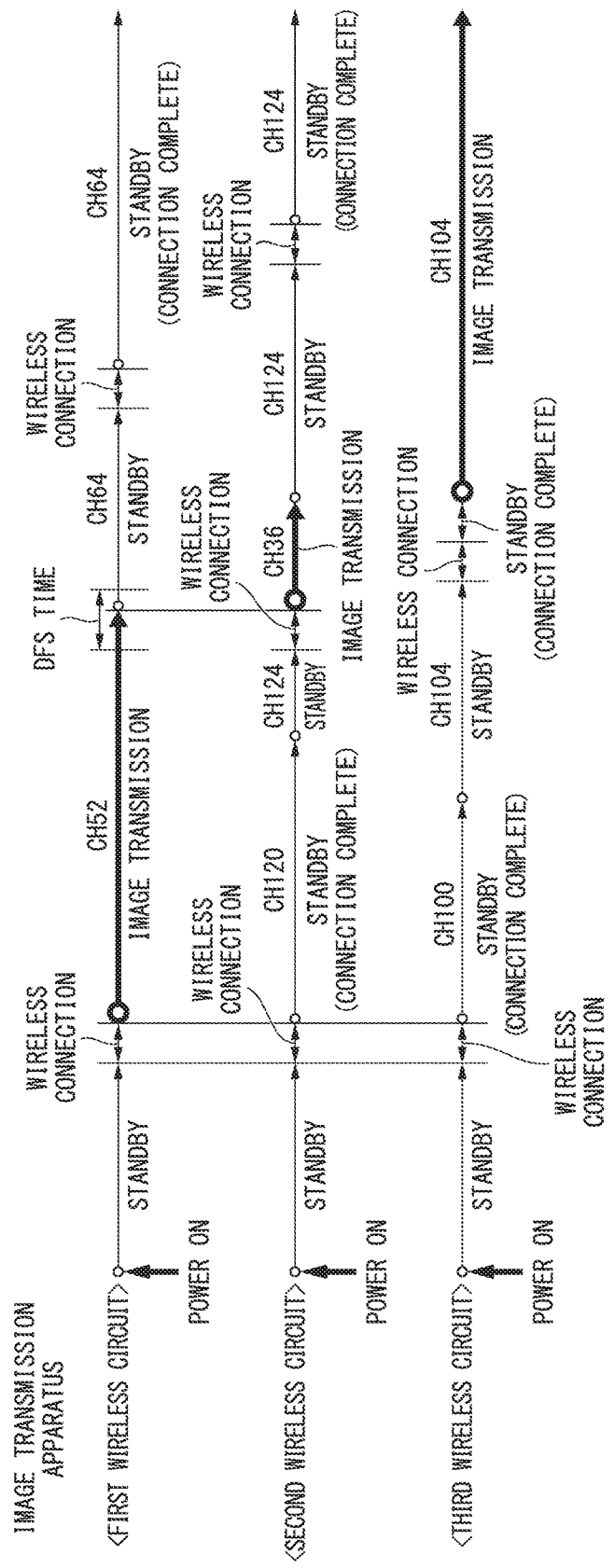
FIG. 48 is a sequence diagram showing an operation of each wireless circuit included in the image transmission apparatus according to the second embodiment of the present invention.

FIG. 48 shows the operation of each wireless circuit included in the image transmission apparatus 100. After the image transmission apparatus 100 is powered on, the first wireless circuit 111 is connected to the first wireless circuit 211 using channel 52 belonging to a band other than W52 (corresponding to step S602). After the connection is completed, the first wireless circuit 111 transmits the image data using channel 52 (corresponding to step S606).

After the image transmission apparatus 100 is powered on, the second wireless circuit 112 is connected to the second wireless circuit 212b using channel 120 belonging to a band other than W52 (corresponding to step S702). After the connection is completed, the second wireless circuit 112 is on standby (corresponding to step S703).

After the image transmission apparatus 100 is powered on, the third wireless circuit 113 is connected to the third wireless circuit 213 using channel 100 belonging to a band other than W52 (corresponding to step S802). After the connection is completed, the third wireless circuit 113 is on standby (corresponding to step S803).

When the first wireless circuit 111 is transmitting image data, the radio waves of the radar are detected by the image reception apparatus 200b. At this point in time, CAC is not completed in any of the third communication channel and the fourth communication channel Thus, the communication channel to be used for image transmission is switched from the first communication channel to the second communication channel (corresponding to steps S609 and S610, and steps S618 to S620). Thereby, the second wireless circuit 112 transmits image data using channel 36 (corresponding to step S706). Switching of the communication channel is performed within a DFS time from a point in time at which the radio waves of the radar are detected. Also, the first wireless circuit 111 stops transmitting image data.

After transmitting the image data is stopped, the first wireless circuit 111 is on standby until CAC using the communication channel set in the first wireless circuit 211 is completed. After CAC is completed, the first wireless circuit 111 is connected to the first wireless circuit 211 using channel 64 (corresponding to step S619). After the connection is completed, the first wireless circuit 111 is on standby (corresponding to step S620).

After the second wireless circuit 112 starts transmitting the image data, if CAC using the communication channel set in the third wireless circuit 213 is completed, the communication channel to be used for image transmission is switched from the second communication channel to the third communication channel (corresponding to steps S710, S719, and S720). Thereby, the third wireless circuit 113 transmits the image data using channel 108 (corresponding to step S806). Also, the second wireless circuit 112 stops transmitting the image data.

It is only necessary for the image transmission apparatus 100 to include a radar detection unit and a channel use confirmation unit 1300. The image transmission apparatus 100 may perform the above-described control related to switching of communication channels.

It is only necessary for at least one of the image transmission apparatus 100 and the image reception apparatus 200b to include the radar detection unit. Therefore, only one of the image transmission apparatus 100 and the image reception apparatus 200b may include the radar detection unit. Alternatively, the image transmission apparatus 100 and the image reception apparatus 200b may include the radar detection unit.

It is only necessary for at least one of the image transmission apparatus 100 and the image reception apparatus 200b to include a channel use confirmation unit. Therefore, only one of the image transmission apparatus 100 and the image reception apparatus 200b may include the channel use confirmation unit. Alternatively, the image transmission apparatus 100 and the image reception apparatus 200b may include the channel use confirmation unit.

In the second embodiment, as in the first embodiment, image transmission can be continued when radio waves of radar are detected in a communication channel being used for image transmission.

In the second embodiment, after the communication channel is switched from the first communication channel to the second communication channel, the communication channel is switched from the second communication channel to the third communication channel at a point in time at which CAC using the third communication channel has been completed. Thus, a use time of the channel belonging to W52 with much interference is shortened. As a result, the quality of wireless image transmission is improved.

Third Embodiment

Figure 49:
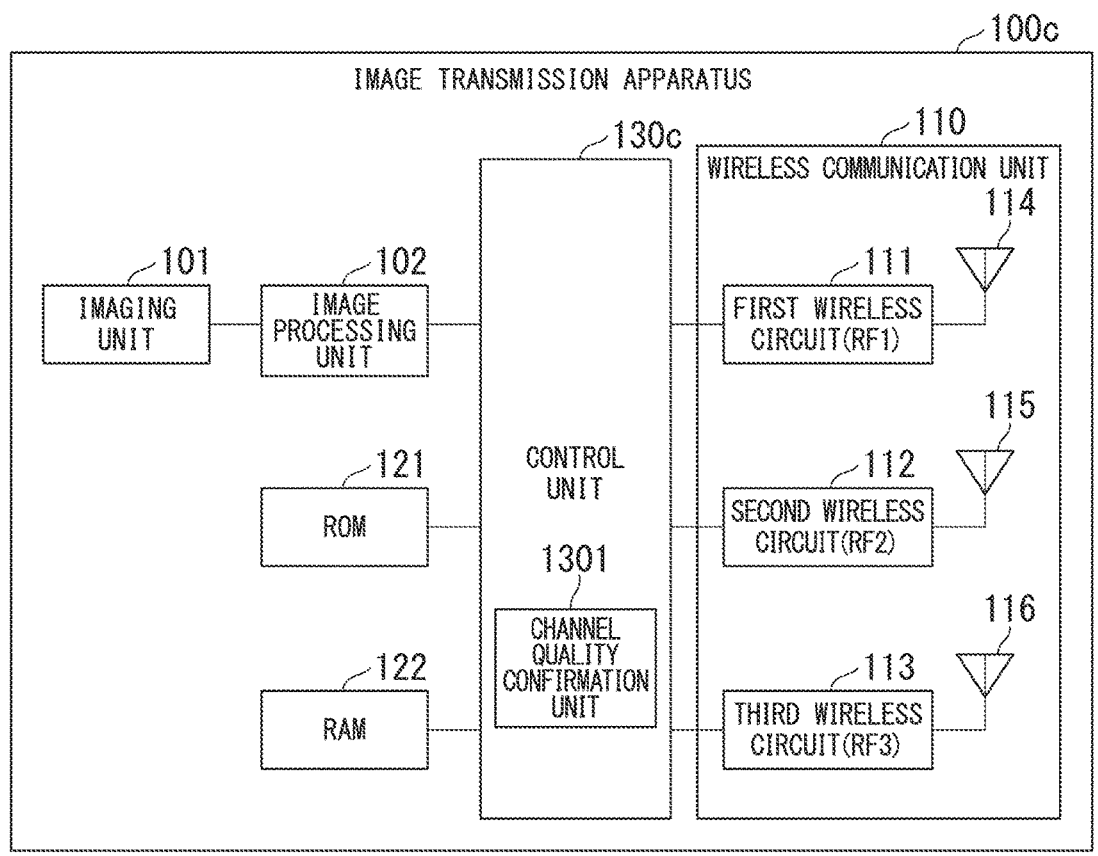
FIG. 49 is a block diagram showing a configuration of an image transmission apparatus according to a third embodiment of the present invention.

In the third embodiment of the present invention, the image transmission apparatus 100 shown in FIG. 2 is changed to an image transmission apparatus 100c shown in FIG. 49. In the third embodiment of the present invention, the image reception apparatus 200 shown in FIG. 3 is changed to an image reception apparatus 200c shown in FIG. 50.

FIG. 49 shows a configuration of the image transmission apparatus 100c. As shown in FIG. 49, the image transmission apparatus 100c includes an imaging unit 101, an image processing unit 102, a wireless communication unit 110 (a transmission-side wireless communication unit), a ROM 121, a RAM 122, and a control unit 130c.

With respect to the configuration shown in FIG. 49, differences from the configuration shown in FIG. 2 will be described.

In the image transmission apparatus 100c shown in FIG. 49, the control unit 130 in the image transmission apparatus 100 shown in FIG. 2 is changed to the control unit 130c.

The control unit 130c includes a channel quality confirmation unit 1301. The channel quality confirmation unit 1301 executes channel quality confirmation for confirming the quality of the communication channel.

For example, the channel quality confirmation unit 1301 confirms the quality of the communication channel by passive scanning Passive scanning by the image transmission apparatus 100c is an operation in which the control unit 130c causes the wireless communication unit 110 to be in a reception state and confirms a wireless signal received in the set communication channel. The image transmission apparatus 100c may be connected to the image reception apparatus 200c and the image transmission apparatus 100c may perform active scanning for monitoring the connected communication channel. In the active scanning, the image transmission apparatus 100c transmits a probe request signal for inquiry and the image transmission apparatus 100c confirms the received signal (probe response signal) strength of a response from the image reception apparatus 200c in response to the probe request signal. This enables a more detailed search of a peripheral device using a communication channel. If active scanning using a communication channel belonging to W53 or W56 is performed, CAC is executed after the communication channel is changed. Thereafter, the channel quality confirmation unit 1301 transmits a probe request signal for inquiry using the wireless communication unit 110.

With respect to points other than the above, the configuration shown in FIG. 49 is similar to the configuration shown in FIG. 2.

Figure 50:
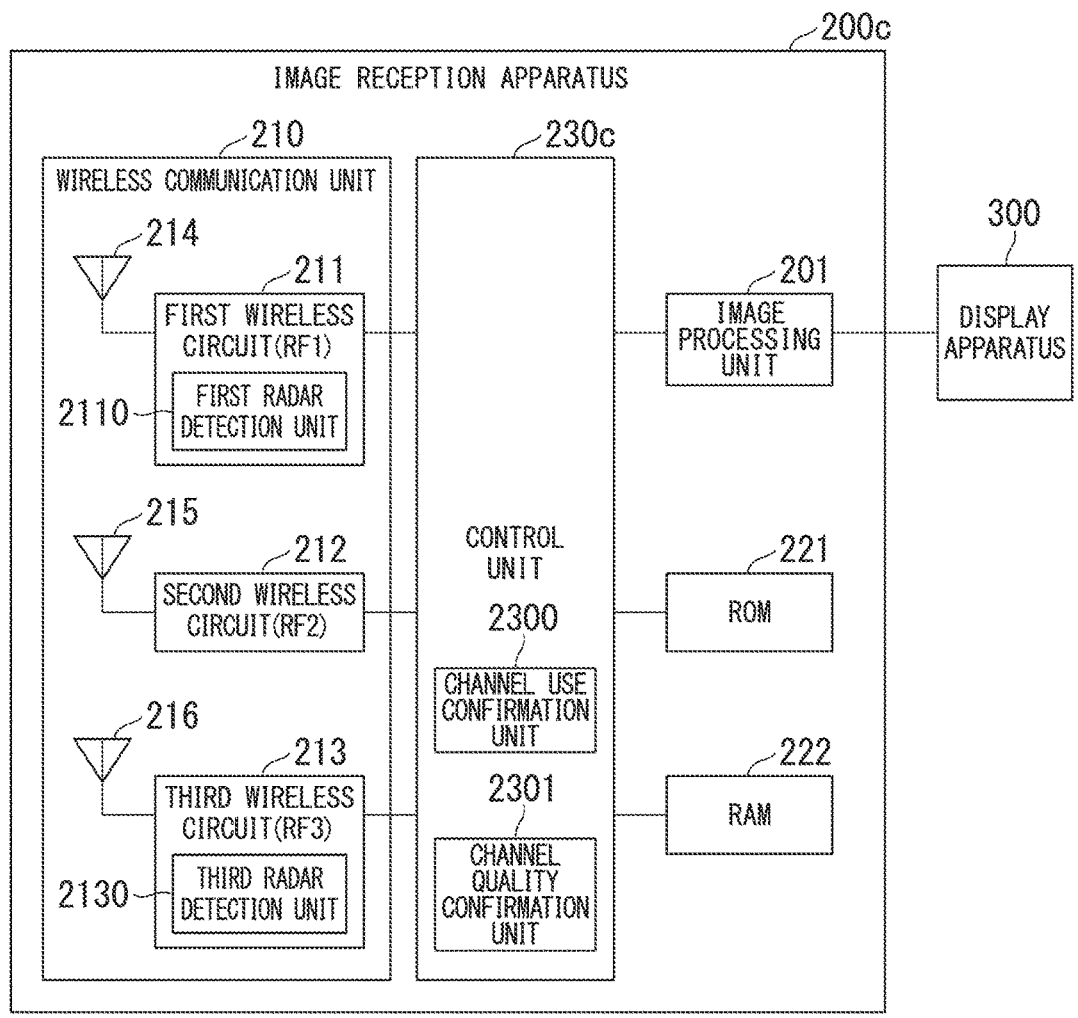
FIG. 50 is a block diagram showing a configuration of an image reception apparatus according to the third embodiment of the present invention.

FIG. 50 shows a configuration of the image reception apparatus 200c. As shown in FIG. 50, the image reception apparatus 200c includes an image processing unit 201, a wireless communication unit 210 (a reception-side wireless communication unit), a ROM 221, a RAM 222, and a control unit 230c.

With respect to the configuration shown in FIG. 50, differences from the configuration shown in FIG. 3 will be described.

In the image reception apparatus 200c shown in FIG. 50, the control unit 230 in the image reception apparatus 200 shown in FIG. 3 is changed to the control unit 230c.

The control unit 230c includes a channel use confirmation unit 2300 and a channel quality confirmation unit 2301. The channel quality confirmation unit 2301 executes channel quality confirmation for confirming the quality of the communication channel. The channel quality confirmation unit 2301 may perform either passive scanning or active scanning. The active scanning by the image reception apparatus 200c may be performed by transmitting (broadcasting) a beacon signal using the communication channel set by the control unit 230c and confirming a response signal from peripheral equipment that responds to the beacon signal.

With respect to points other than the above, the configuration shown in FIG. 50 is similar to the configuration shown in FIG. 3.

The state of each communication channel is managed by a channel state table. The channel state table is stored in the RAM 122 and the RAM 222. FIG. 51 shows the channel state table. The channel state table has a channel number B1, a communication channel B2, a radar detection history B3, and a channel usage rate B4. Because the channel number B1, the communication channel B2, and the radar detection history B3 have already been described, their description will be omitted. The channel usage rate B4 indicates the quality of the communication channel. The channel quality confirmation unit 1301 and the channel quality confirmation unit 2301 update the channel usage rate B4 on the basis of a result of channel quality confirmation. The quality of the communication channel with a relatively high channel usage rate B4 is relatively low. The quality of the communication channel with a relatively low channel usage rate B4 is relatively high.

The outline of the operation in the third embodiment will be described. At least one of the channel quality confirmation unit 1301 and the channel quality confirmation unit 2301 confirms qualities of a plurality of communication channels different from the first communication channel before channel use confirmation using the third communication channel is started when image data communication using the first communication channel is being performed. The wireless communication unit 110 (the transmission-side wireless communication unit) and the wireless communication unit 210 (the reception-side wireless communication unit) executes at least one of a first process and a second process. In the first process, a communication channel with relatively high quality among the plurality of communication channels whose qualities have been confirmed by the channel quality confirmation unit 1301 or the channel quality confirmation unit 2301 is set as the third communication channel. In the second process, a communication channel with relatively high quality among the plurality of communication channels whose qualities have been confirmed by the channel quality confirmation unit 1301 or the channel quality confirmation unit 2301 is set as the second communication channel.

For example, a communication channel with highest quality among the plurality of communication channels whose qualities have been confirmed by the channel quality confirmation unit 1301 or the channel quality confirmation unit 2301 is set as the third communication channel. A communication channel with highest quality among the plurality of communication channels whose qualities have been confirmed by the channel quality confirmation unit 1301 or the channel quality confirmation unit 2301 is set as the second communication channel Because the communication channel with relatively high quality is set as the second communication channel or the third communication channel, the communication quality is secured.

The details of the operation in the third embodiment will be described. The operation of the image reception apparatus 200c will be described. FIGS. 52 to 60 show a procedure of the operation of the image reception apparatus 200c. FIGS. 52, 53, 54, and 55 show a procedure of the operation of the image reception apparatus 200c related to the control of the first wireless circuit 211. The operation shown in FIG. 6 is changed to the operation shown in FIG. 52. The operation shown in FIG. 7 is changed to the operation shown in FIGS. 53 and 54. The operation shown in FIGS. 8 and 9 is changed to the operation shown in FIG. 55.

If the radio waves of the radar have been detected in step S107, the channel use confirmation unit 2300 determines a communication channel to be set in the first wireless circuit 211 on the basis of a result of channel use confirmation using the second wireless circuit 212 (step S108a). In step S108a, a communication channel belonging to a band other than W52 and having higher quality than the other communication channels is selected. A communication channel is selected on the basis of the channel usage rate recorded in the channel state table. In the channel state table, the communication channel for which 1 is recorded in the radar detection history may not be selected. After the communication channel is determined, the processing in step S109 is executed.

After the image data is received in step S118, the control unit 230c determines whether or not the first wireless circuit 211 is receiving image data on the communication channel belonging to W52 (step S1701).

If the first wireless circuit 211 is receiving image data on the communication channel belonging to W52 in step S1701, the control unit 230c determines whether or not the RF3 mode is "standby (connection complete)" (step S1702).

If the RF3 mode is "standby (connection complete)" in step S1702, the control unit 230c determines whether or not image reception preparation of the third wireless circuit 213 has been completed (step S1703). In step S1703, processing is executed on the basis of the information stored in the RAM 222.

If the image reception preparation of the third wireless circuit 213 has been completed in step S1703, the processing in steps S1704 and S1705 is executed. The processing in steps S1704 and S1705 is similar to the processing in each of steps S130 and S131, respectively.

After the RF3 mode is set to "image reception" in step S1705, the channel use confirmation unit 2300 determines a communication channel to be set in the first wireless circuit 211 on the basis of a result of channel use confirmation using the second wireless circuit 212 (step S1705a). The processing in step S1705a is similar to the processing in step S108a.

After the communication channel is determined, the processing in steps S1706, S1707, and S1708 is executed. The processing in steps S1706, S1707, and S1708 is similar to the processing in steps S109, S110, and S111, respectively. After the processing in step S1708 is executed, the processing in step S106 is executed.

If the first wireless circuit 211 is not receiving image data on the communication channel belonging to W52 in step S1701, the processing in step S119 is executed.

If the RF3 mode is "CAC" in step S120, the control unit 230c outputs an instruction for switching the communication channel to the third wireless circuit 213 (step S1721). The instruction output in step S1721 includes information on a communication channel belonging to W52 and having relatively high quality. On the basis of the channel state table, the control unit 230c selects a communication channel with relatively high quality among communication channels belonging to W52. In step S317b of FIG. 42, the third wireless circuit 213 sets the communication channel belonging to W52 on the basis of the instruction output in step S1721. After the instruction for switching the communication channel is output to the third wireless circuit 213, the processing in step S124 is executed. If the processing in step S1721 is executed, the RF3 switching instruction to be transmitted in step S124 includes information on the communication channel to be set.

After the RF3 mode is set to "image reception" in step S131, the channel use confirmation unit 2300 determines a communication channel to be set in the first wireless circuit 211 on the basis of a result of channel use confirmation using the second wireless circuit 212 (step S1722). The processing in step S1722 is similar to the processing in step S108a.

If the RF1 mode is "waiting for RF1" in step S1723, the control unit 230c determines whether or not the first wireless circuit 211 is disconnected (step S1724).

If the first wireless circuit 211 is not disconnected in step S1724, the processing in step S1726 is executed. If the first wireless circuit 211 is disconnected in step S1724, the control unit 230c performs control for performing a connection to the wireless communication unit 110 (the first wireless circuit 111) using the wireless communication unit 210 (the first wireless circuit 211) (step S1725). Thereby, the wireless communication unit 210 (the first wireless circuit 211) is connected to the wireless communication unit 110 (the first wireless circuit 111). In step S1725, the first wireless circuit 211 sets a communication channel belonging to W52 on the basis of the instruction output in step S1906 of FIG. 59. In step S1725, the process shown in FIG. 18 is executed. After the connection is completed, the processing in step S1726 is executed.

Figure 56:
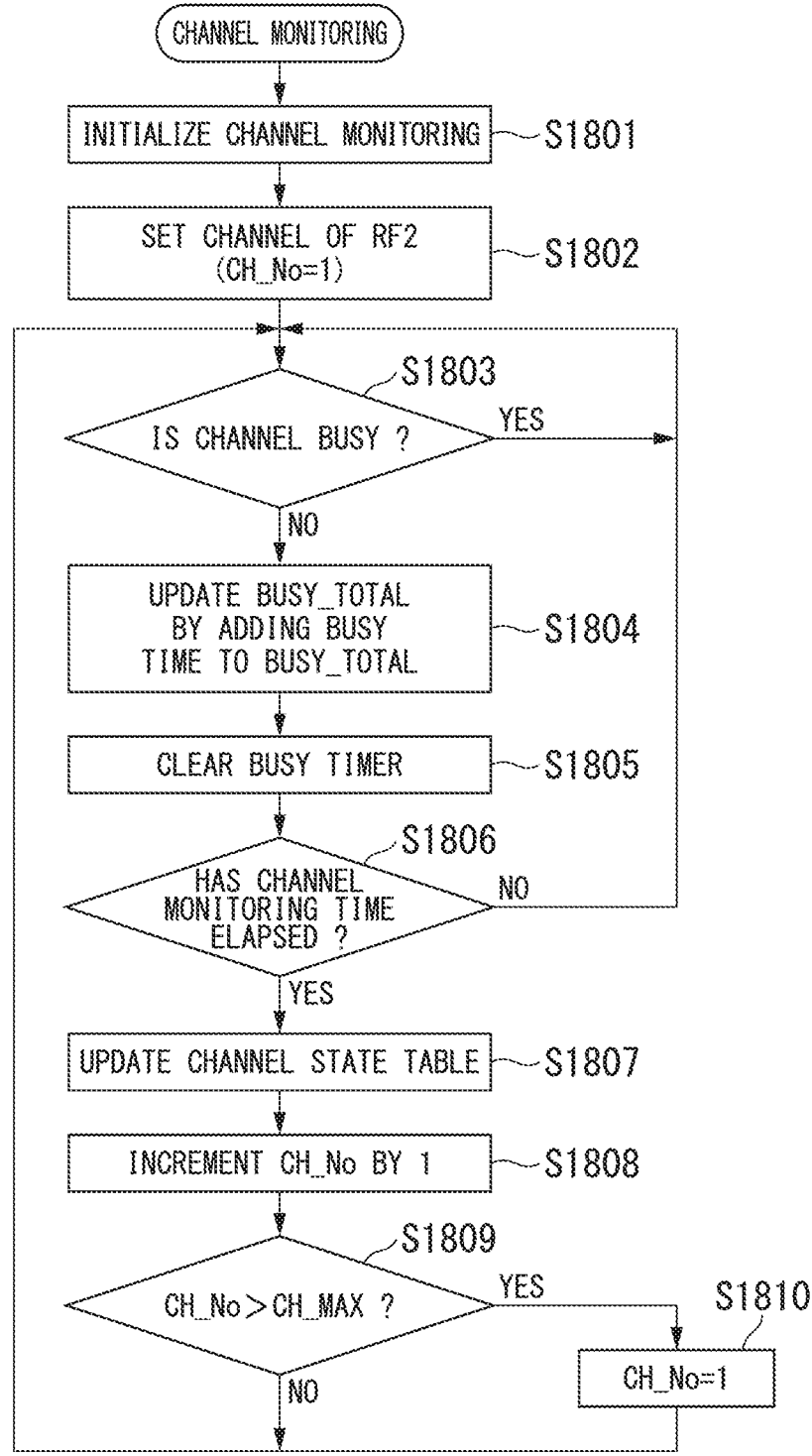
FIG. 56 is a flowchart showing a procedure of an operation of the image reception apparatus according to the third embodiment of the present invention.
Figure 57:
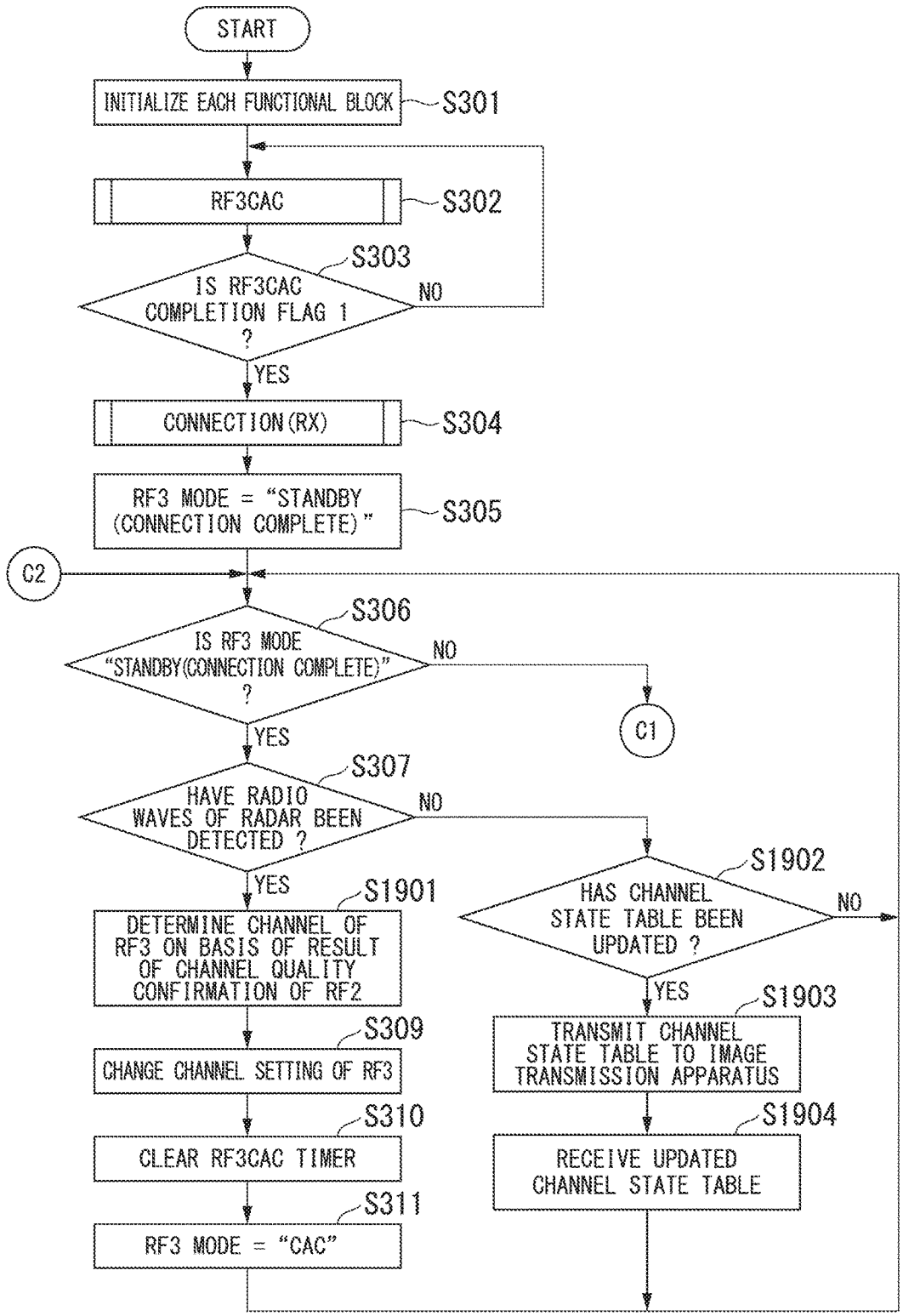
FIG. 57 is a flowchart showing a procedure of an operation of the image reception apparatus according to the third embodiment of the present invention.

FIG. 56 shows a procedure of the operation of the image reception apparatus 200c related to the control of the second wireless circuit 212. The channel quality confirmation unit 2301 confirms channel quality of a communication channel belonging to each of W52, W53, and W56 using the second wireless circuit 212. Hereinafter, the channel quality confirmation is referred to as channel monitoring. The channel monitoring is performed by measuring a BUSY time of a channel per predetermined time. The BUSY time is a time during which radio waves are output by another wireless device or the like and is a time during which data transmission cannot be performed from the wireless communication unit 210.

When the image reception apparatus 200c is powered on, the channel quality confirmation unit 2301 executes initialization related to the channel monitor (step S1801). In step S1801, the channel quality confirmation unit 2301 initializes a BUSY_TOTAL time, a channel monitoring timer, a BUSY timer, and a channel number CH_No.

The BUSY_TOTAL time is a time during which the communication channel is BUSY. For example, an initial value of the BUSY_TOTAL time is 0.

The channel monitoring timer is a timer for measuring an execution time of the channel monitoring. For example, an initial value of the channel monitoring timer is 0. After the channel monitoring timer is initialized, the value of the channel monitoring timer increases with the passage of time.

The BUSY timer is a timer for measuring the time during which the communication channel is BUSY. For example, the initial value of the BUSY timer is 0. After the BUSY timer is initialized, the value of the BUSY timer increases in accordance with a time during which the communication channel is BUSY.

A channel number CH_No is a variable indicating a channel number. For example, an initial value of the channel number CH_No is 1.

The BUSY_TOTAL time, the value of the channel monitoring timer, the value of the BUSY timer, and the channel number CH_No are stored in the RAM 222.

After initialization related to the channel monitoring is executed, the channel quality confirmation unit 2301 sets a communication channel in the second wireless circuit 212 (step S1802). For example, in step S1802, a communication channel corresponding to a channel number 1 is set in the second wireless circuit 212. As shown in FIG. 4, the communication channel corresponding to the channel number 1 is channel 36 belonging to W52.

After the communication channel is set, the channel quality confirmation unit 2301 determines whether or not the communication channel is BUSY (step S1803). In step S1803, the channel quality confirmation unit 2301 measures a received signal strength (RSSI) level and a time. The channel quality confirmation unit 2301 determines whether or not the communication channel is BUSY on the basis of the measured received signal strength level and time. If the communication channel is BUSY, data transmission is disallowed.

If the communication channel is BUSY, the determination in step S1803 is executed again. If the communication channel is not BUSY, the channel quality confirmation unit 2301 updates the BUSY_TOTAL time by adding the BUSY time to the BUSY_TOTAL time (step S1804). The BUSY time is a time indicated by the BUSY timer.

After the BUSY_TOTAL time is updated, the channel quality confirmation unit 2301 clears the BUSY timer (step S1805). That is, the BUSY timer is initialized. After the BUSY timer is cleared, the channel quality confirmation unit 2301 determines whether or not the time measured by the channel monitoring timer has exceeded a channel monitoring time (step S1806).

If the time measured by the channel monitoring timer has not exceeded the channel monitoring time in step S1806, the processing in step S1803 is executed. If the time measured by the channel monitoring timer has exceeded the channel monitoring time, the channel quality confirmation unit 2301 updates the channel state table (step S1807). In step S1807, the channel quality confirmation unit 2301 calculates a channel usage rate, which is the quality of the communication channel, by calculating a ratio of the time during which the communication channel is Busy, i.e., the ratio of the BUSY_TOTAL time, to the channel monitoring time. The channel quality confirmation unit 2301 updates the channel state table on the basis of the calculated channel usage rate. The BUSY_TOTAL time may be recorded in the channel state table.

After the channel state table is updated, the channel quality confirmation unit 2301 increments the channel number CH_No by 1 (step S1808). After the channel number CH_No is incremented by 1, the channel quality confirmation unit 2301 determines whether or not the channel number CH_No is larger than a maximum channel number CH_MAX (step S1809). As shown in FIG. 4, the maximum channel number CH_MAX is 19.

If the channel number CH_No is less than or equal to the maximum channel number CH_MAX in step S1809, the processing in step S1803 is executed. If the channel number CH_No is larger than the maximum channel number CH_MAX in step S1809, the channel quality confirmation unit 2301 sets the channel number CH_No to 1 (step S1810). After the channel number CH_No is set to 1, the processing in step S1803 is executed.

Figure 16:
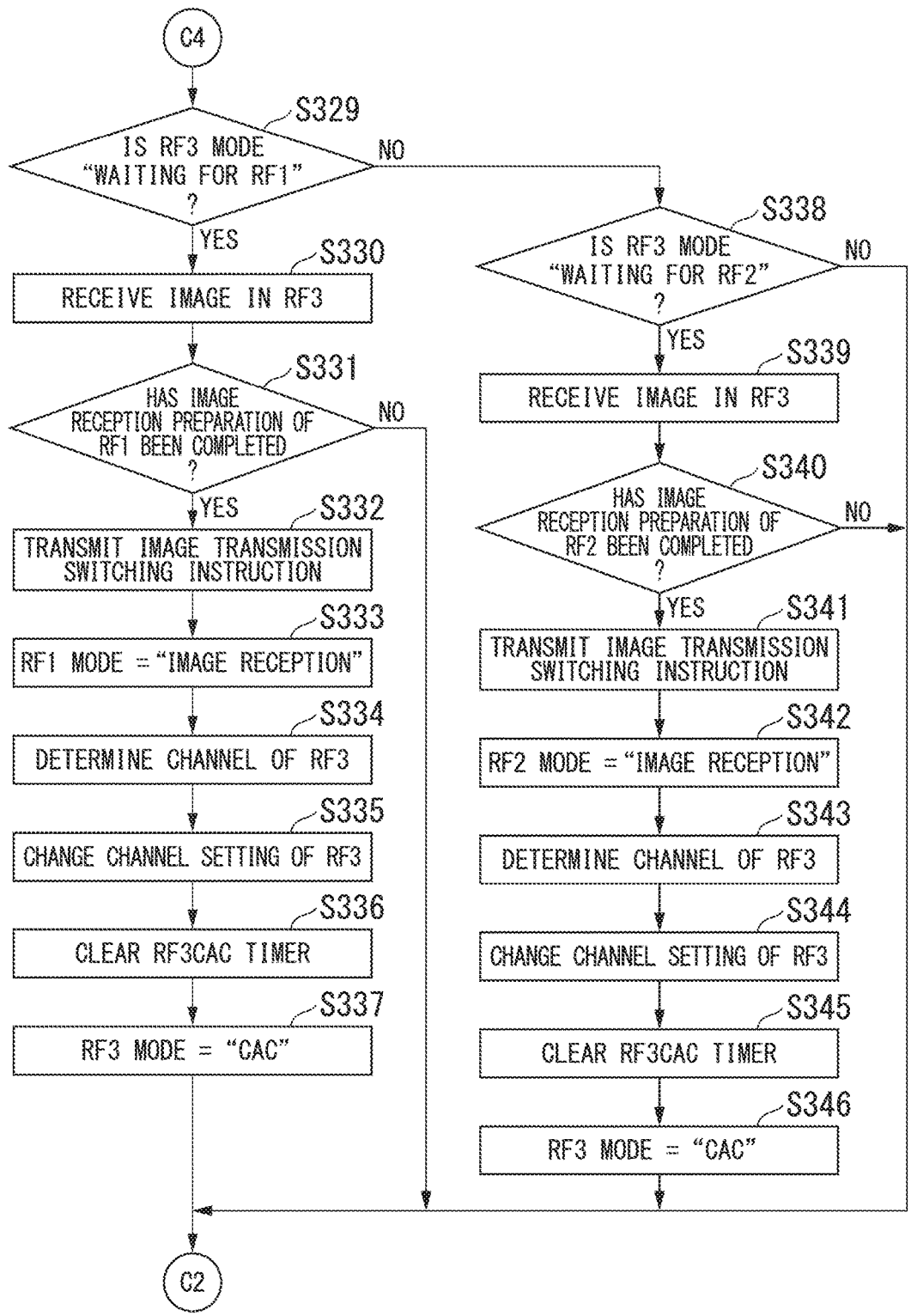
FIG. 16 is a flowchart showing a procedure of an operation of the image reception apparatus according to the first embodiment of the present invention.
Figure 52:
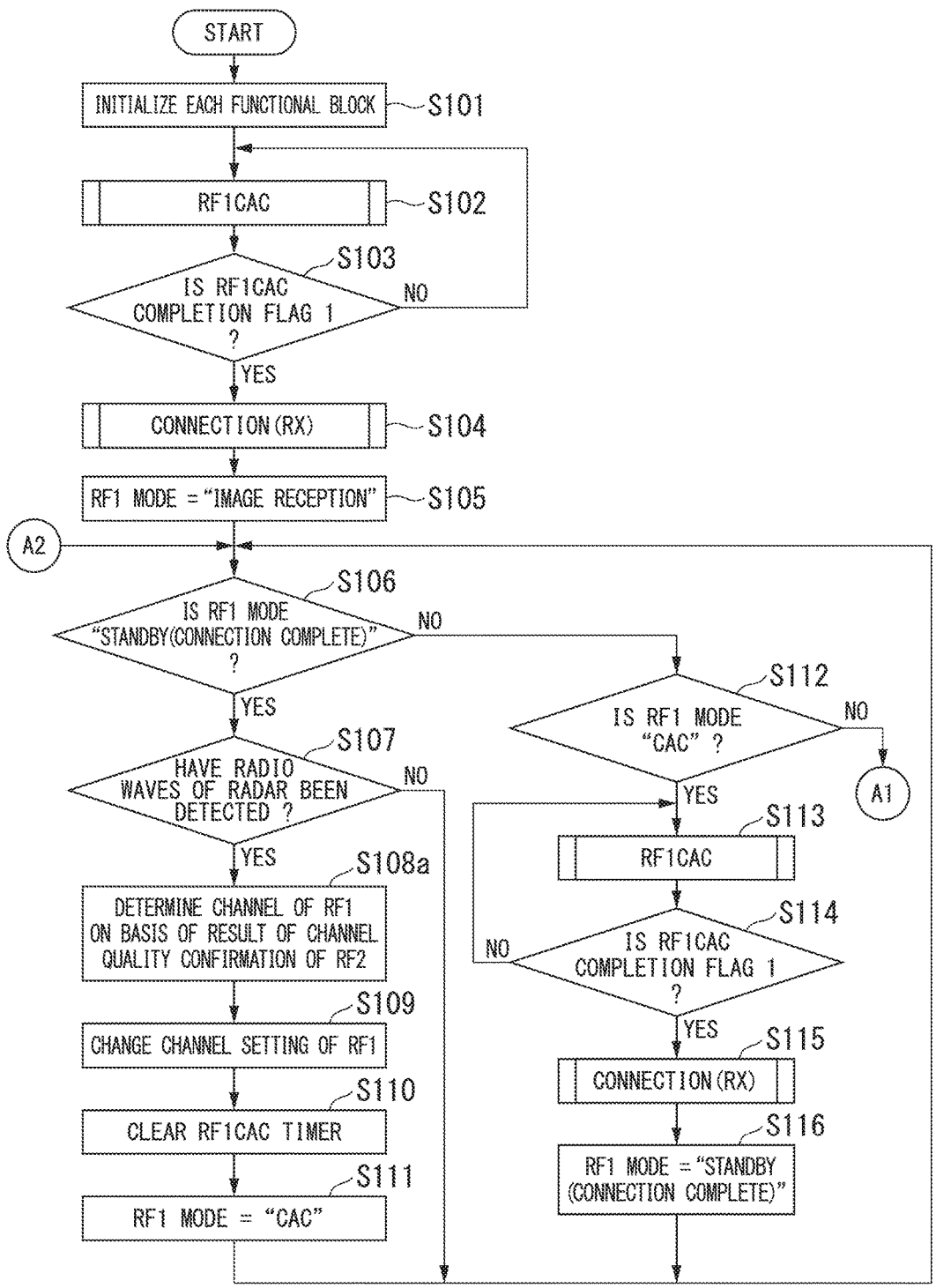
FIG. 52 is a flowchart showing a procedure of an operation of the image reception apparatus according to the third embodiment of the present invention.
Figure 53:
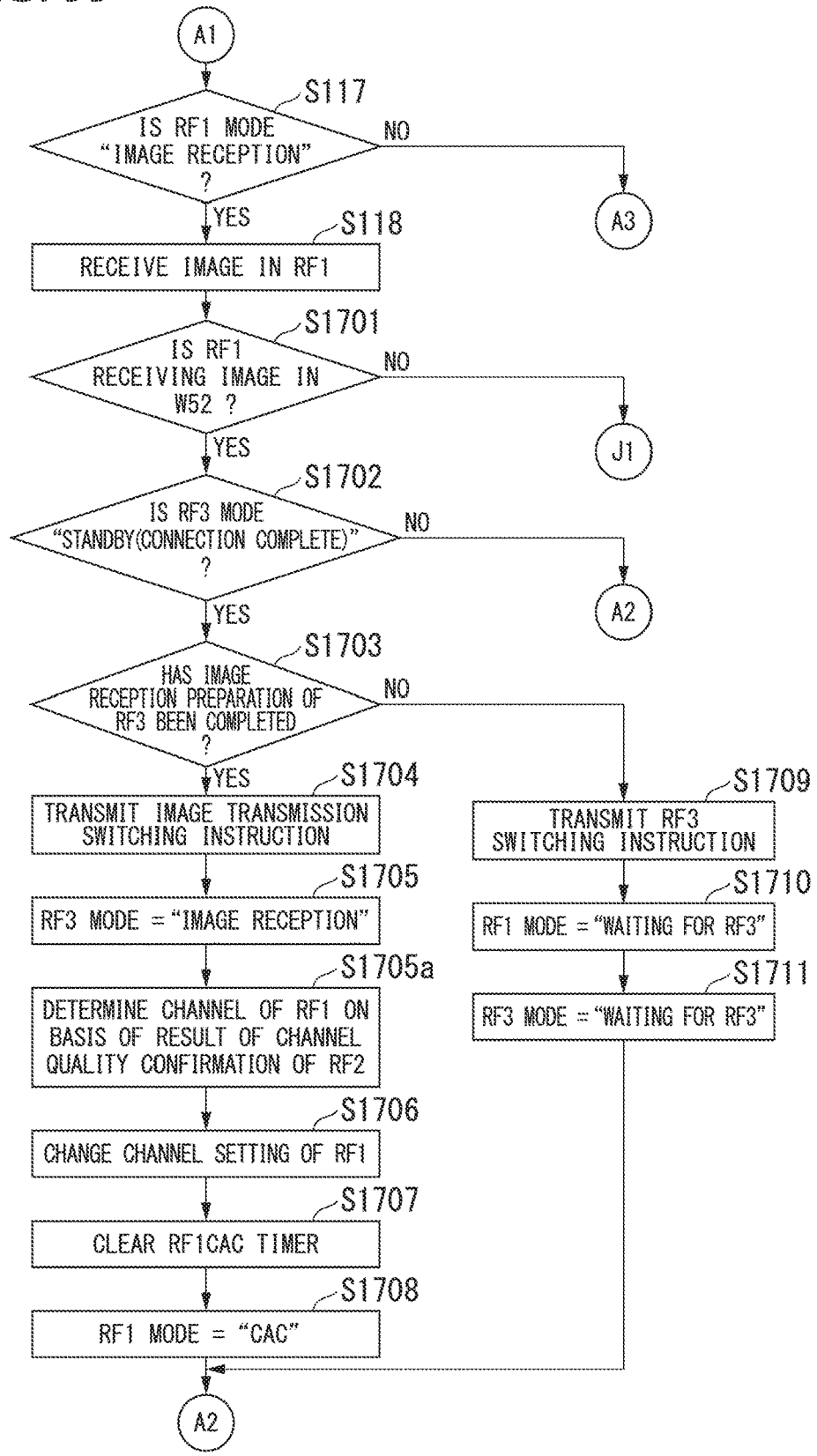
FIG. 53 is a flowchart showing a procedure of an operation of the image reception apparatus according to the third embodiment of the present invention.
Figure 54:
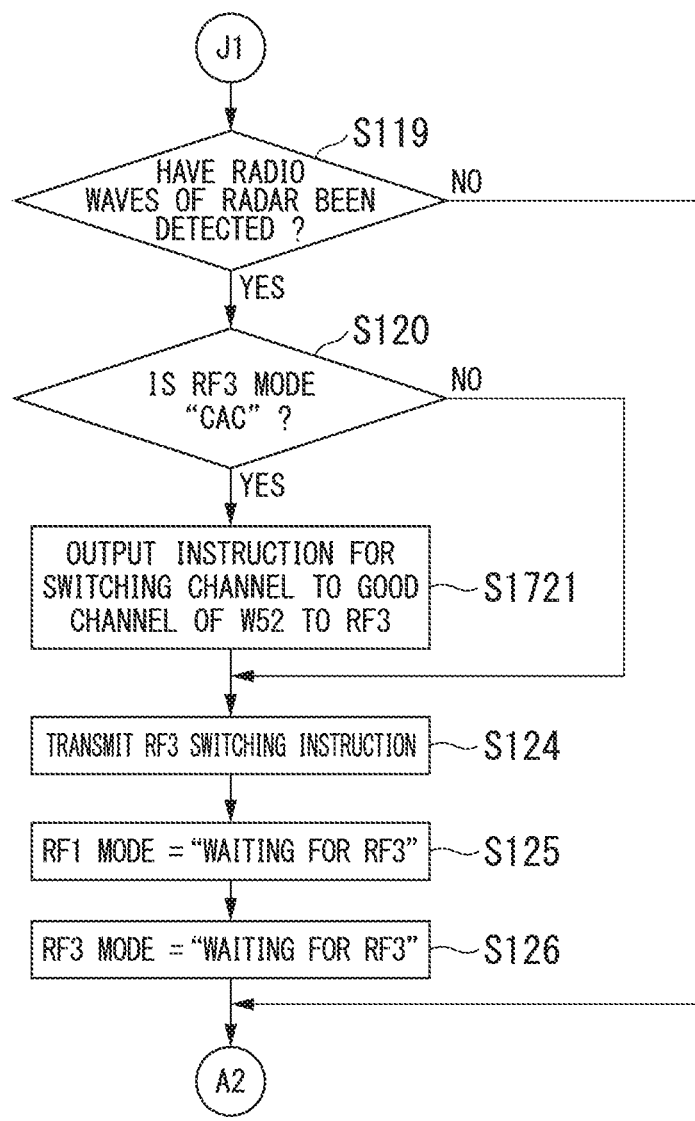
FIG. 54 is a flowchart showing a procedure of an operation of the image reception apparatus according to the third embodiment of the present invention.
Figure 55:
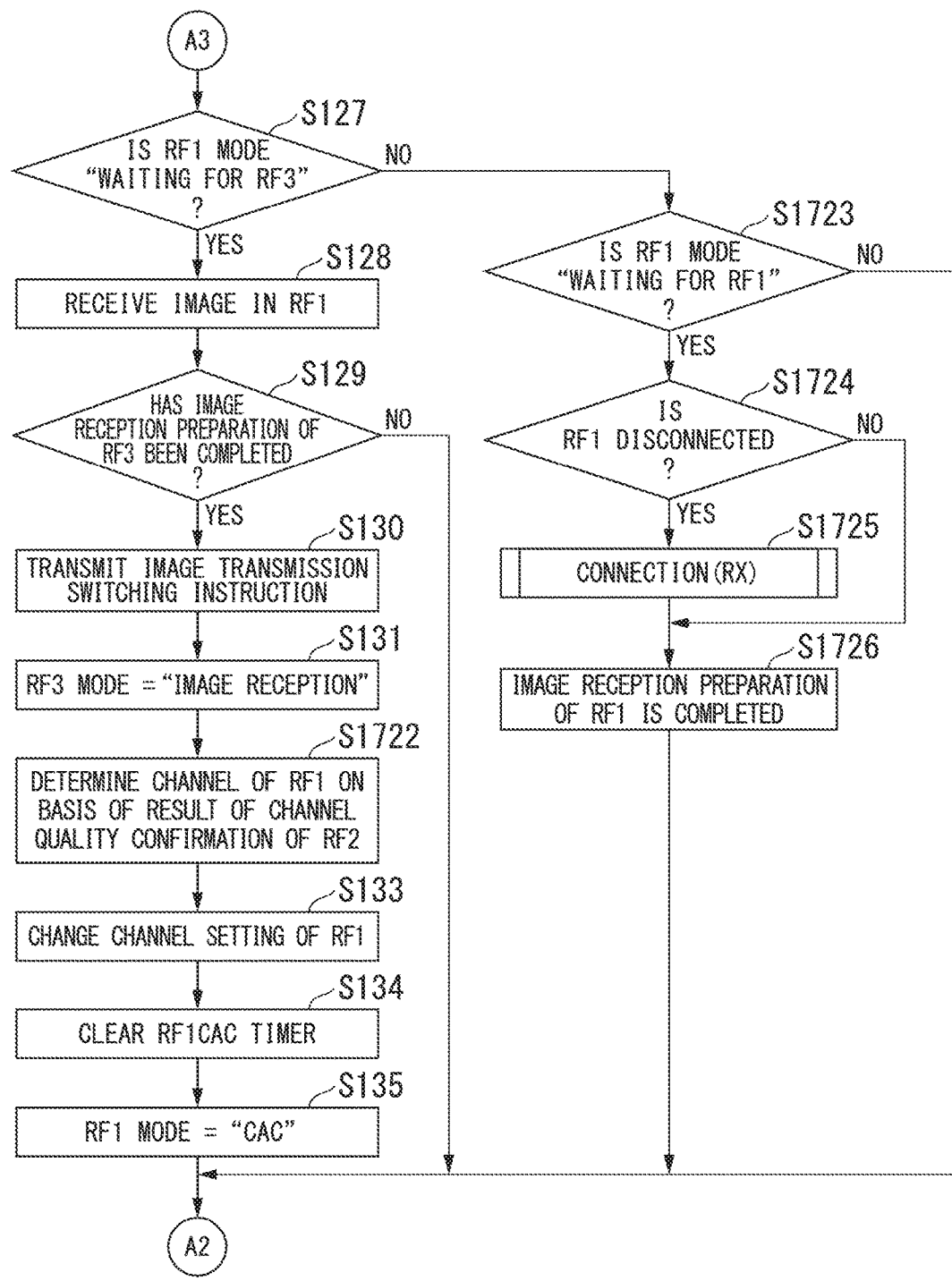
FIG. 55 is a flowchart showing a procedure of an operation of the image reception apparatus according to the third embodiment of the present invention.

FIGS. 57, 58, 59, and 60 show a procedure of the operation of the image reception apparatus 200c related to the control of the third wireless circuit 213. The operation shown in FIG. 52 is common to the second embodiment and the third embodiment. The operation shown in FIG. 13 is changed to the operation shown in FIG. 57. The operation shown in FIG. 15 is changed to the operation shown in FIGS. 58 and 59. The operation shown in FIG. 16 is changed to the operation shown in FIG. 60.

If the radio waves of the radar have been detected in step S307, the channel use confirmation unit 2300 determines a communication channel to be set in the third wireless circuit 213 on the basis of a result of channel use confirmation using the second wireless circuit 212 (step S1901). In step S1901, a communication channel belonging to a band other than W52 and having higher quality than the other communication channels is selected. A communication channel is selected on the basis of the channel usage rate recorded in the channel state table. In the channel state table, the communication channel for which 1 is recorded in the radar detection history may not be selected. After the communication channel is determined, the processing in step S309 is executed.

If the radio waves of the radar have not been detected in step S307, the control unit 230c determines whether or not the channel state table has been updated (step S1902).

If the channel state table is not updated, the processing in step S306 is executed. If the channel state table is updated, the control unit 230c performs control for transmitting the channel state table by radio waves using the wireless communication unit 210 (the third wireless circuit 213) (step S1903). Thereby, the wireless communication unit 210 (the third wireless circuit 213) transmits the channel state table to the image transmission apparatus 100c by radio waves. In step S1903, only an updated part of the channel state table may be transmitted.

After the channel state table is transmitted, the control unit 230c performs control for receiving the channel state table by radio waves using the wireless communication unit 210 (the third wireless circuit 213) (step S1904). Thereby, the wireless communication unit 210 (the third wireless circuit 213) receives the channel state table from the image transmission apparatus 100c by radio waves. In step S1904, only the updated part of the channel state table may be received. According to the received channel state table, the channel state table stored in the RAM 222 is updated. After the channel state table is received, the processing in step S306 is executed.

The channel quality confirmation unit 1301 and the channel quality confirmation unit 2301 execute the channel quality confirmation. By transmitting and receiving the channel state table between the wireless communication unit 110 and the wireless communication unit 210, the channel state table is shared between the image transmission apparatus 100c and the image reception apparatus 200c.

Figure 43:
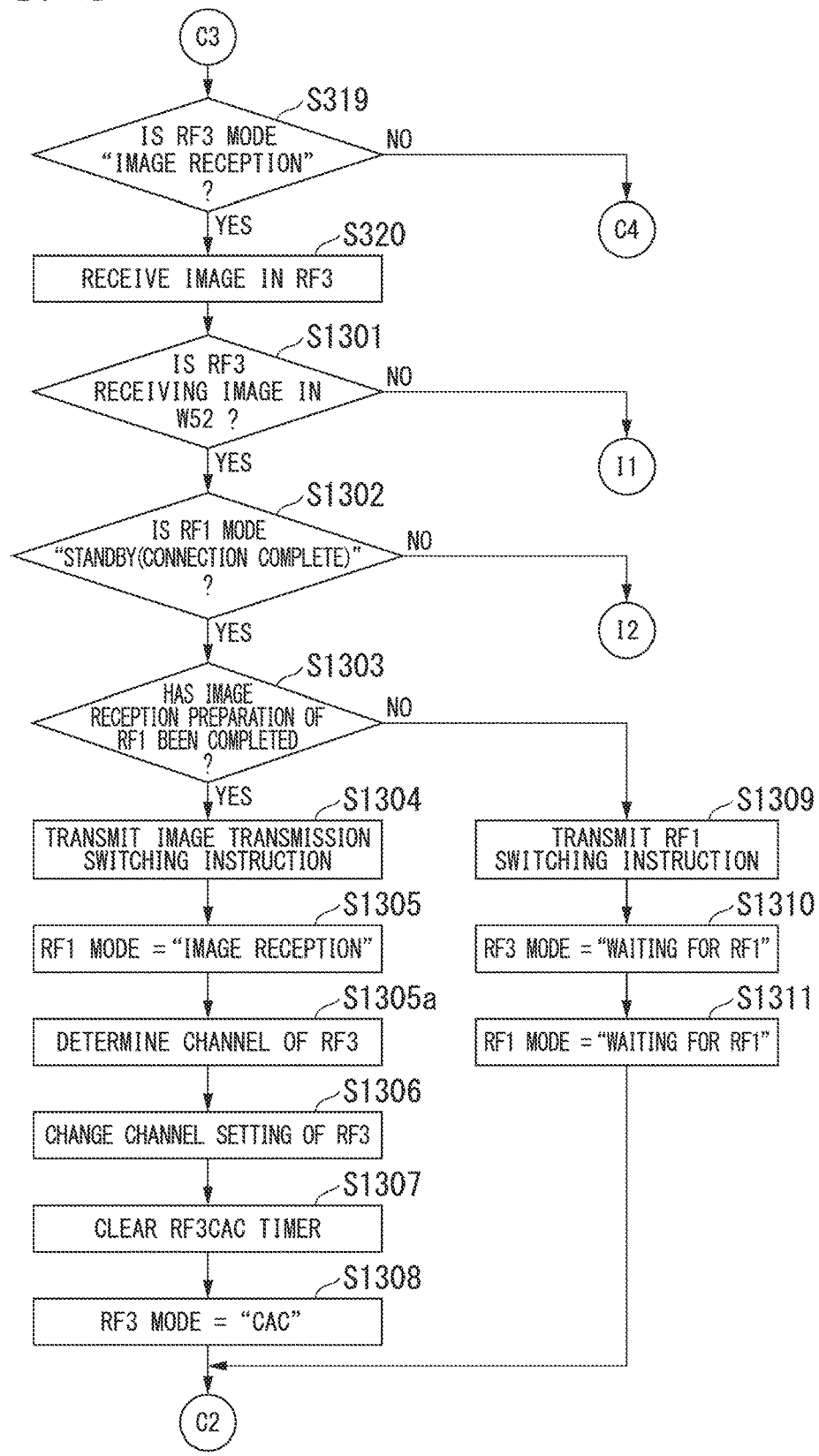
FIG. 43 is a flowchart showing a procedure of an operation of the image reception apparatus according to the second embodiment of the present invention.
Figure 44:
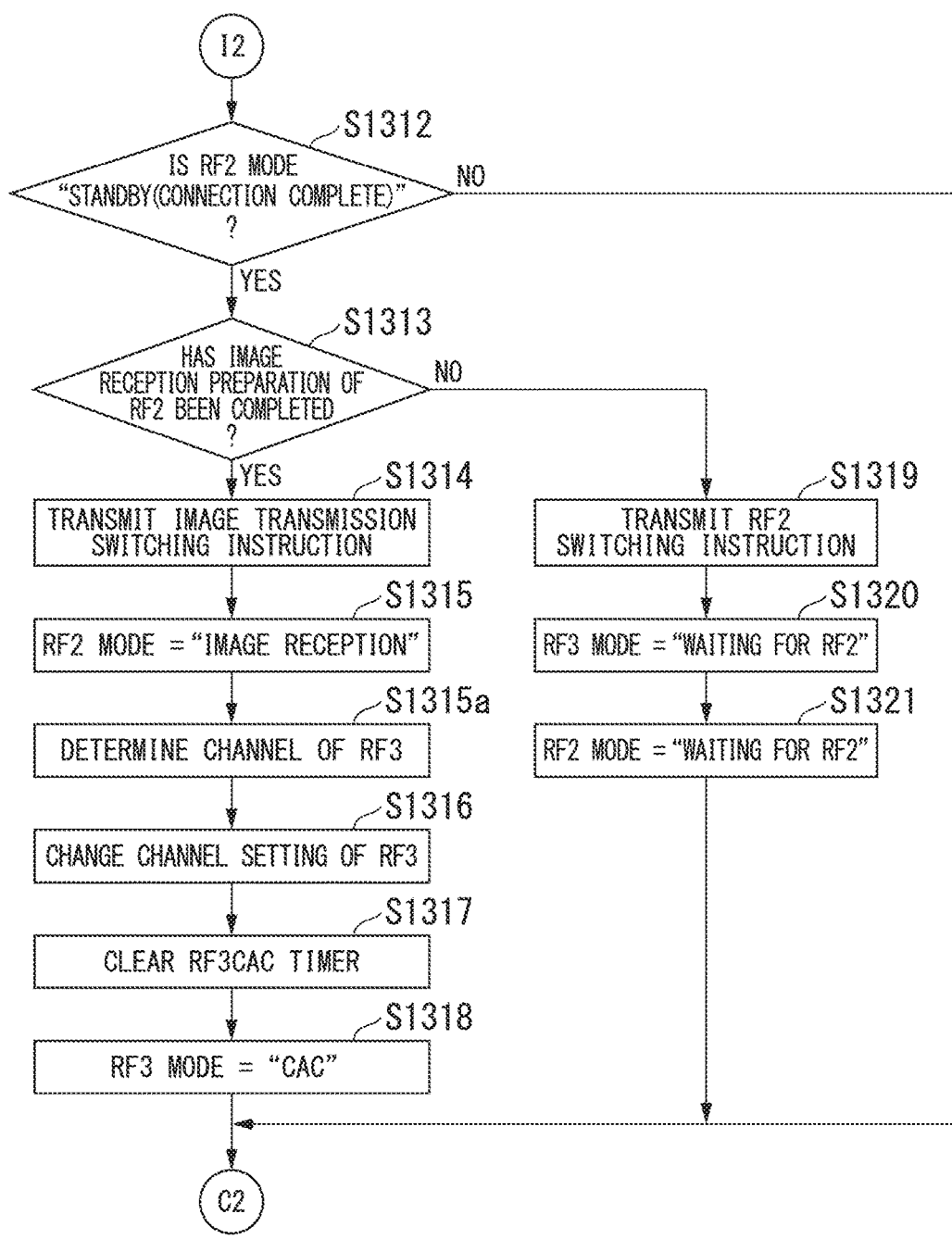
FIG. 44 is a flowchart showing a procedure of an operation of the image reception apparatus according to the second embodiment of the present invention.
Figure 58:
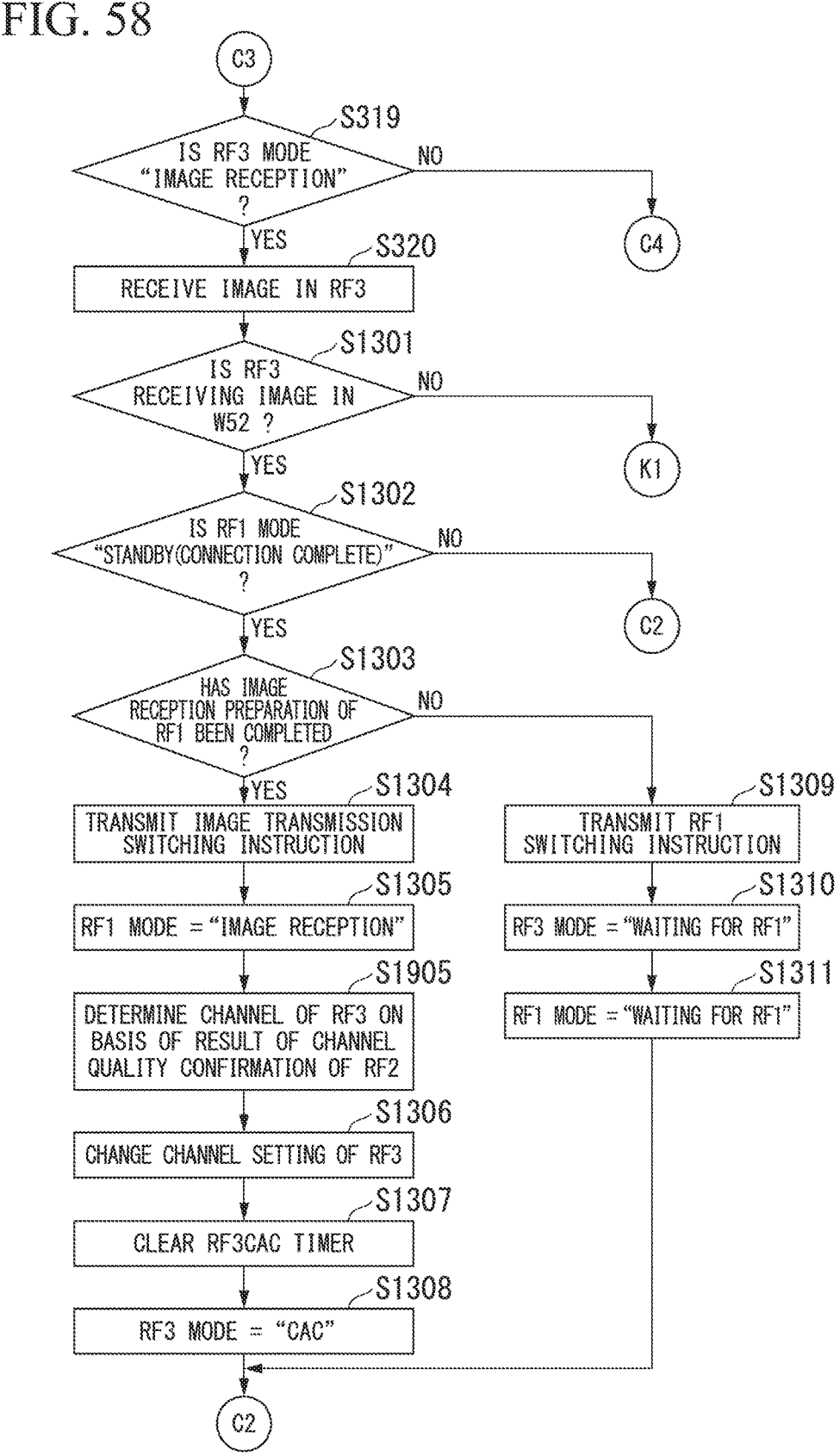
FIG. 58 is a flowchart showing a procedure of an operation of the image reception apparatus according to the third embodiment of the present invention.
Figure 59:
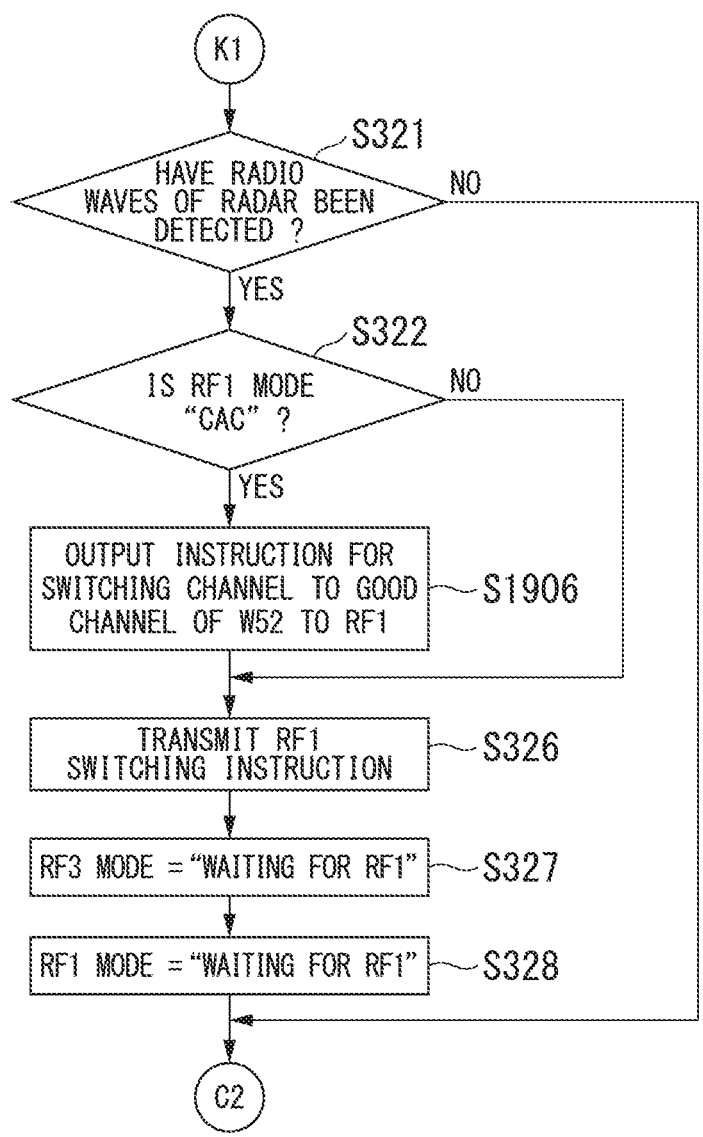
FIG. 59 is a flowchart showing a procedure of an operation of the image reception apparatus according to the third embodiment of the present invention.
Figure 60:
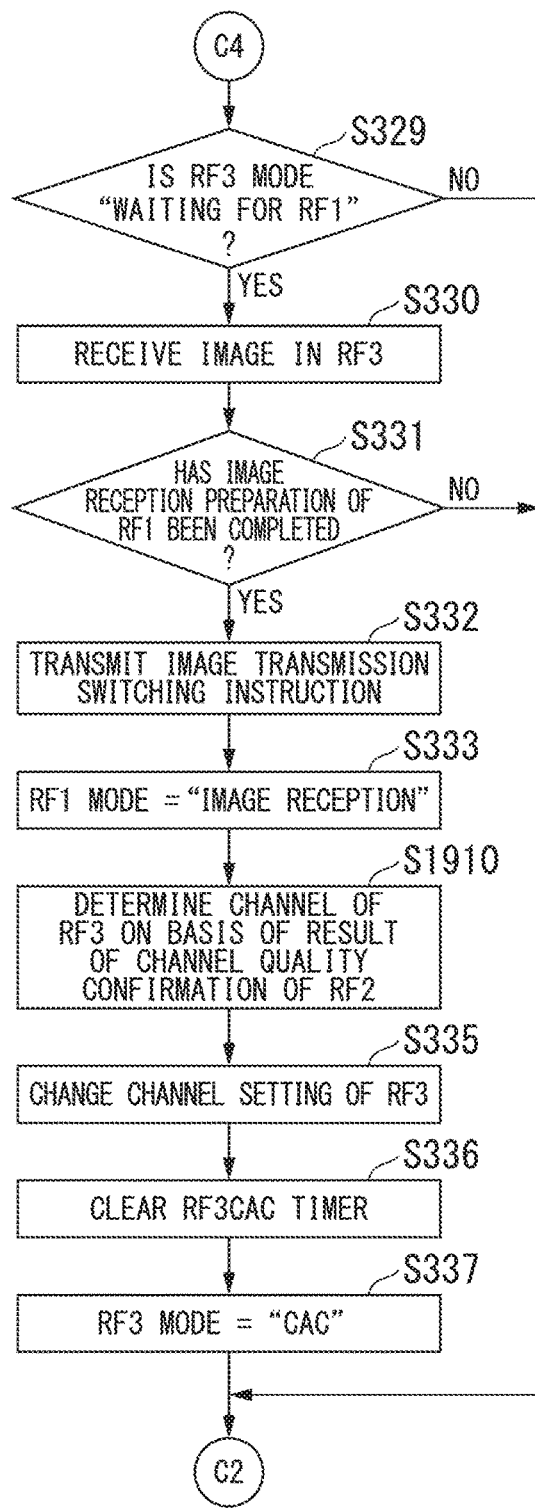
FIG. 60 is a flowchart showing a procedure of an operation of the image reception apparatus according to the third embodiment of the present invention.

The processing in steps S1301 to S1311 in FIG. 58 is similar to the processing in steps S1301 to S1311 in FIG. 43. After the RF1 mode is set to "image reception" in step S1305, the channel use confirmation unit 2300 determines a communication channel to be set in the third wireless circuit 213 on the basis of a result of channel use confirmation using the second wireless circuit 212 (step S1905). The processing in step S1905 is similar to the processing in step S1901. After the communication channel is determined, the processing in step S1306 is executed.

If the third wireless circuit 213 is not receiving the image data on the communication channel belonging to W52 in step S1301, the processing in step S321 is executed.

If the RF1 mode is "CAC" in step S322, the control unit 230c outputs an instruction for switching the communication channel to the first wireless circuit 211 (step S1906). The instruction output in step S1906 includes information on a communication channel belonging to W52 and having relatively high quality. On the basis of the channel state table, the control unit 230c selects a communication channel with relatively high quality among the communication channels belonging to W52.

After the instruction for switching the communication channel is output to the first wireless circuit 211, the processing in step S326 is executed. If the processing in step S1906 is executed, the RF1 switching instruction to be transmitted in step S1326 includes information on the communication channel to be set.

After the RF1 mode is set to "image reception" in step S333, the channel use confirmation unit 2300 determines the communication channel to be set in the third wireless circuit 213 on the basis of a result of channel use confirmation using the second wireless circuit 212 (step S1910). The processing in step S1910 is similar to the processing in step S1901. After the communication channel is determined, the processing in step S335 is executed.

As described above, before CAC using the third communication channel is started when image data communication using the first communication channel is being performed, the channel quality confirmation unit 2301 confirms qualities of a plurality of communication channels different from the first communication channel (corresponding to FIG. 56). In step S302, CAC using a predetermined communication channel is executed. The channel quality confirmation unit 2301 confirms the quality of the communication channel before CAC is executed in step S313.

A communication channel with relatively high quality among the plurality of communication channels whose qualities have been confirmed by the channel quality confirmation unit 2301 is set as the third communication channel (corresponding to step S1901). A communication channel with relatively high quality among the plurality of communication channels whose qualities have been confirmed by the channel quality confirmation unit 2301 is set as the second communication channel (corresponding to steps S1721 and S317b).

Figure 61:
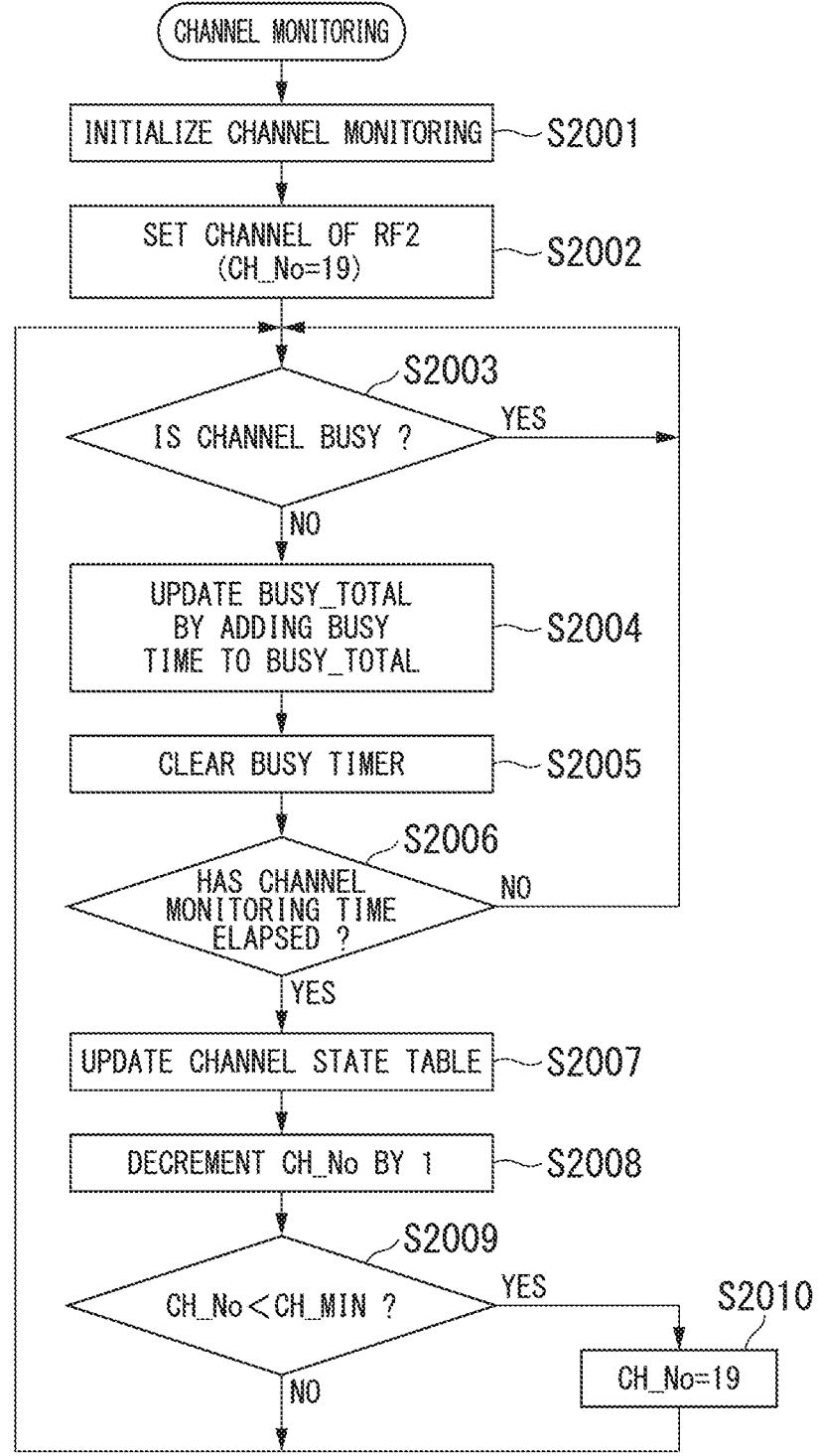
FIG. 61 is a flowchart showing a procedure of an operation of the image transmission apparatus according to the third embodiment of the present invention.
Figure 62:
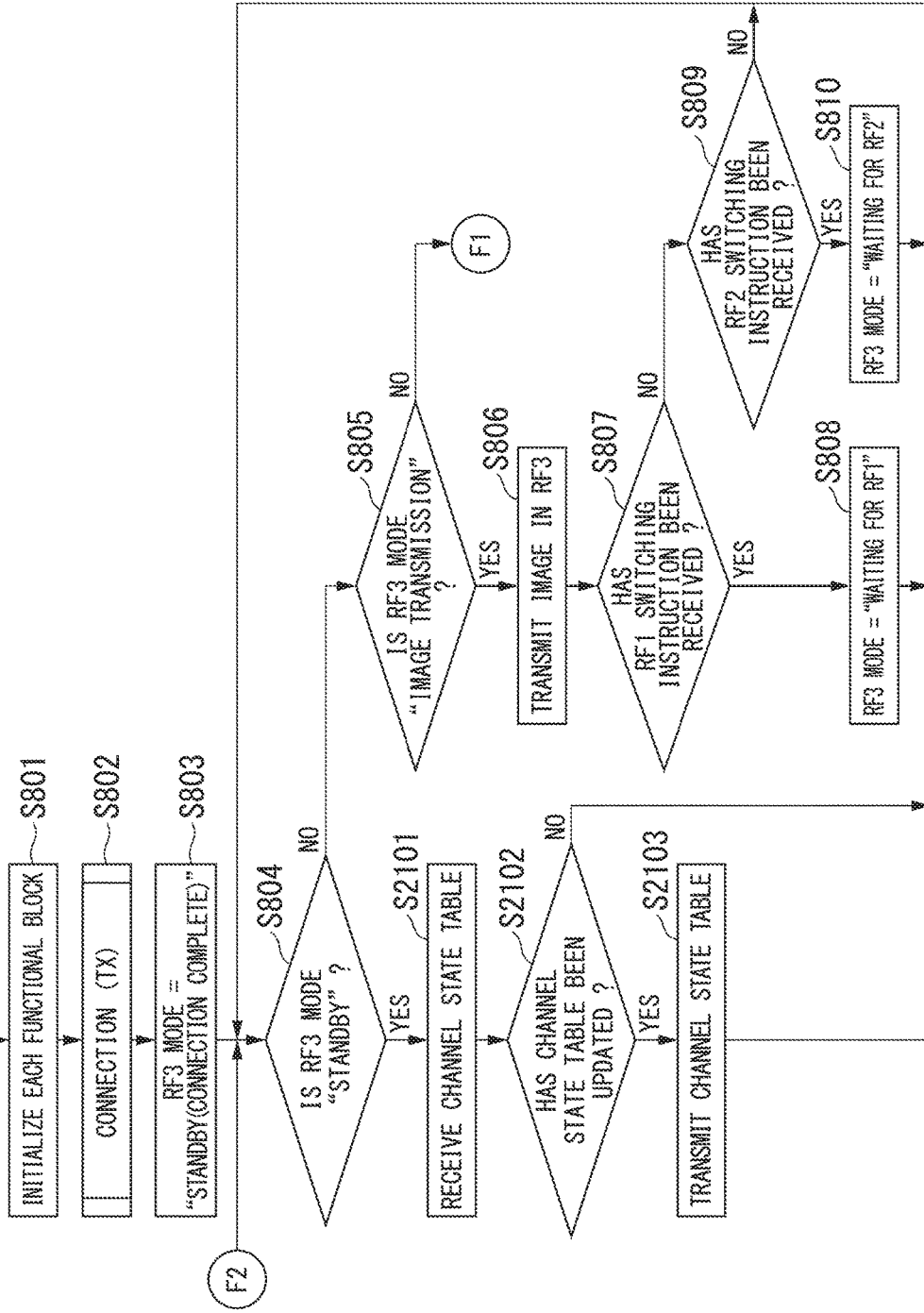
FIG. 62 is a flowchart showing a procedure of an operation of the image transmission apparatus according to the third embodiment of the present invention.

The operation of the image transmission apparatus 100c will be described. FIGS. 61 and 62 show a procedure of the operation of the image transmission apparatus 100c. If one of the RF1 switching instruction and the RF3 switching instruction including the information of the communication channel is received, the wireless communication unit 110 performs a connection using the communication channel indicated by the information of the communication channel.

The operation of the image transmission apparatus 100c related to the control of the first wireless circuit 211 is similar to the operation of the image transmission apparatus 100 related to the control of the first wireless circuit 211 in the first embodiment.

FIG. 61 shows a procedure of the operation of the image transmission apparatus 100c related to the control of the second wireless circuit 112. The channel quality confirmation unit 1301 executes channel monitoring of the communication channels belonging to each of W52, W53, and W56 using the second wireless circuit 112.

When the image transmission apparatus 100c is powered on, the channel quality confirmation unit 1301 executes initialization related to the channel monitoring (step S2001). In step S2001, the channel quality confirmation unit 1301 initializes a BUSY_TOTAL time, a channel monitoring timer, a BUSY timer, and a channel number CH_No. For example, an initial value of the channel number CH_No is 19.

The BUSY_TOTAL time, the value of the channel monitoring timer, the value of the BUSY timer, and the channel number CH_No are stored in the RAM 122.

After initialization related to the channel monitoring is executed, the channel quality confirmation unit 1301 sets a communication channel in the second wireless circuit 112 (step S2002). For example, in step S2002, a communication channel corresponding to a channel number 19 is set in the second wireless circuit 112. As shown in FIG. 4, the communication channel corresponding to the channel number 19 is channel 140 belonging to W56.

After the communication channel is set, the channel quality confirmation unit 1301 determines whether or not the communication channel is BUSY (step S2003). In step S2003, the channel quality confirmation unit 1301 measures a received signal strength (RSSI) level and a time. The channel quality confirmation unit 1301 determines whether or not the communication channel is BUSY on the basis of the measured received signal strength level and time.

If the communication channel is BUSY, the channel quality confirmation unit 1301 updates the BUSY_TOTAL time by adding the BUSY time to the BUSY_TOTAL time (step S2004).

After the BUSY_TOTAL time is updated, the channel quality confirmation unit 1301 clears the BUSY timer (step S2005). That is, the BUSY timer is initialized. After the BUSY timer is cleared, the channel quality confirmation unit 1301 determines whether or not the time measured by the channel monitoring timer has exceeded a channel monitoring time (step S2006).

If the time measured by the channel monitoring timer has not exceeded the channel monitoring time in step S2006, the processing in step S2003 is executed. If the time measured by the channel monitoring timer has exceeded the channel monitoring time, the channel quality confirmation unit 1301 updates the channel state table (step S2007). In step S2007, the channel quality confirmation unit 1301 calculates a channel usage rate, which is the quality of the communication channel, by calculating a ratio of the time during which the communication channel is Busy, i.e., the ratio of the BUSY_TOTAL time, to the channel monitoring time. The channel quality confirmation unit 1301 updates the channel state table on the basis of the calculated channel usage rate. The BUSY_TOTAL time may be recorded in the channel state table.

After the channel state table is updated, the channel quality confirmation unit 1301 decrements the channel number CH_No by 1 (step S2008). After the channel number CH_No is decremented by 1, the channel quality confirmation unit 1301 determines whether or not the channel number CH_No is smaller than a minimum channel number CH_MIN (step S2009). As shown in FIG. 4, the maximum channel number CH_MIN is 1.

If the channel number CH_No is larger than or equal to the minimum channel number CH_MIN in step S2009, the processing in step S2003 is executed. If the channel number CH_No is smaller than the minimum channel number CH_MIN in step S2009, the channel quality confirmation unit 1301 sets the channel number CH_No to 19 (step S2010). After the channel number CH_No is set to 19, the processing in step S2003 is executed.

By performing channel monitoring between the image transmission apparatus 100c and the image reception apparatus 200c, a time required for channel monitoring of all communication channels is shortened. A range of the communication channel on which the channel quality confirmation unit 1301 performs channel monitoring may be different from a range of the communication channel on which the channel quality confirmation unit 2301 performs channel monitoring. For example, the channel quality confirmation unit 2301 performs channel monitoring of a communication channel whose CH_No is in the range of 1 to 10. For example, the channel quality confirmation unit 1301 performs channel monitoring of a communication channel whose CH_No is in the range of 11 to 19. In this case, in the image reception apparatus 200c, the maximum channel number CH_MAX is set to 10. In the image transmission apparatus 100c, the minimum channel number CH_MIN is set to 11.

FIG. 62 shows a procedure of the operation of the image transmission apparatus 100c related to the control of the third wireless circuit 113. The operation shown in FIG. 23 is changed to the operation shown in FIG. 62. The operation shown in FIG. 24 is common to the first embodiment and the third embodiment.

If the RF3 mode is "standby" in step S804, the control unit 130c performs control for receiving the channel state table by radio waves using the wireless communication unit 110 (the third wireless circuit 113) (step S2101). Thereby, the wireless communication unit 110 (the third wireless circuit 113) receives the channel state table from the image transmission apparatus 100c by radio waves. In step S2101, only an updated part of the channel state table may be received. According to the received channel state table, the channel state table stored in the RAM 122 is updated.

After the channel state table is received, the control unit 130c determines whether or not the channel state table has been updated (step S2102).

If the channel state table has not been updated, the processing in step S804 is executed. If the channel state table has been updated, the control unit 130c performs control for transmitting the channel state table by radio waves using the wireless communication unit 110 (the third wireless circuit 113) (step S2103). Thereby, the wireless communication unit 110 (the third wireless circuit 113) transmits the channel state table to the image reception apparatus 200c by radio waves. In step S2103, only an updated part of the channel state table may be transmitted. After the channel state table is transmitted, the processing in step S804 is executed.

Figure 63:
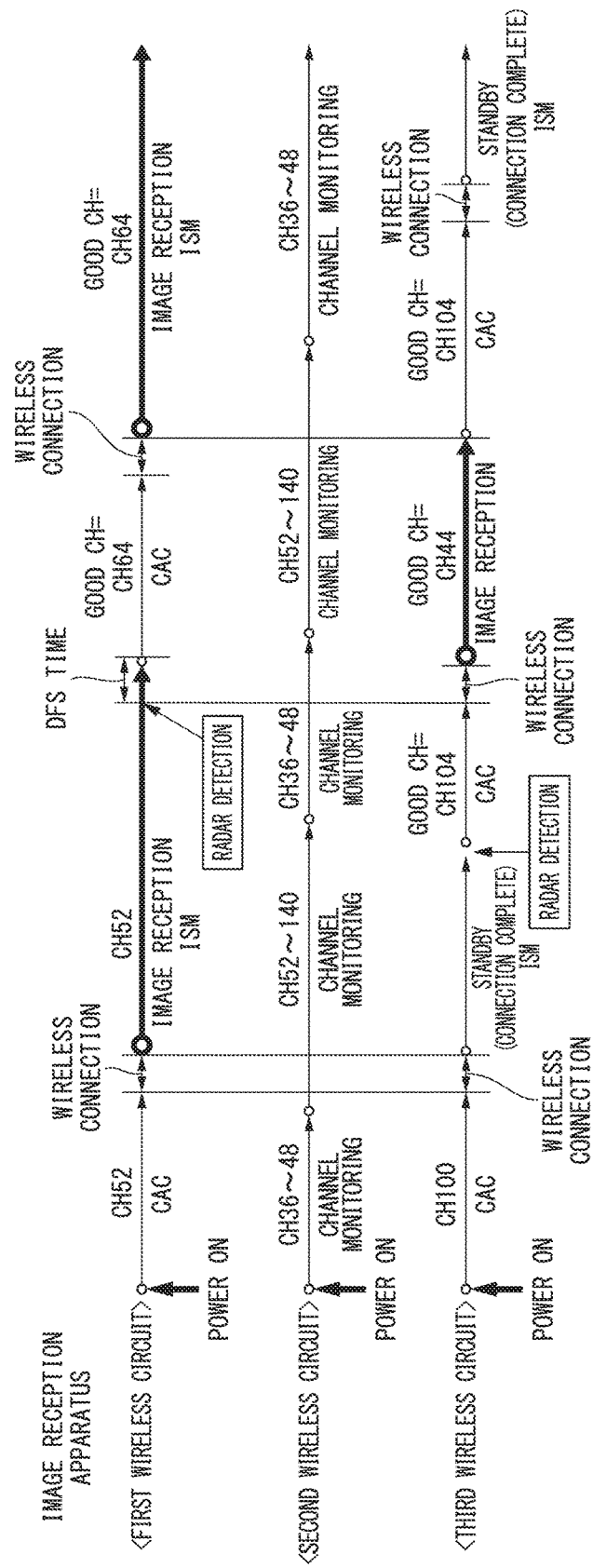
FIG. 63 is a sequence diagram showing an operation of each wireless circuit included in the image reception apparatus according to the third embodiment of the present invention.

FIG. 63 shows an operation of each wireless circuit included in the image reception apparatus 200c. After the image reception apparatus 200c is powered on, CAC using channel 52 belonging to a band other than W52 is executed in the first wireless circuit 211 (corresponding to step S102). After CAC is completed, the first wireless circuit 211 is connected to the first wireless circuit 111 using channel 52 (corresponding to step S104). After the connection is completed, the first wireless circuit 211 receives the image data using channel 52 (the first communication channel) (corresponding to step S118). When image data is being received, ISM is executed in the first wireless circuit 211 (corresponding to step S119).

After the image reception apparatus 200c is powered on, channel monitoring is executed in the second wireless circuit 212 (corresponding to FIG. 56).

After the image reception apparatus 200c is powered on, CAC using channel 100 belonging to a band other than W52 is executed in the third wireless circuit 213 (corresponding to step S302). After CAC is completed, the third wireless circuit 213 is connected to the third wireless circuit 113 using channel 100 (corresponding to step S304). After the connection is completed, the third wireless circuit 213 is on standby (corresponding to step S305). During standby, ISM is executed in the third wireless circuit 213 (corresponding to step S307). If radio waves of the radar are detected (corresponding to step S307), the communication channel is changed to channel 104 in the third wireless circuit 213 and CAC is executed (corresponding to step S1901, steps S309 to S311, and step S313). On the basis of a result of channel monitoring, a communication channel with relatively high quality is set in the third wireless circuit 213. After CAC is completed, the third wireless circuit 213 is connected to the third wireless circuit 113 using channel 104 (the third communication channel) (corresponding to step S315). After the connection is completed, the third wireless circuit 213 is on standby (corresponding to step S316). During standby, ISM is executed in the third wireless circuit 213 (corresponding to step S307).

When the first wireless circuit 211 is receiving image data, radio waves of the radar are detected (corresponding to step S119). Because CAC using the third communication channel is not completed at this time in point, the communication channel to be used for image transmission is switched from the first communication channel to the second communication channel (corresponding to step S1721, steps S124 to S126, and steps S317b and S318). Thereby, on the basis of a result of channel monitoring, channel 44 having relatively high quality is set in the third wireless circuit 213. The third wireless circuit 213 receives the image data using channel 44 (the second communication channel) belonging to W52 (corresponding to step S320). Switching of the communication channel is performed within a DFS time from a point in time at which the radio waves of the radar are detected. Also, the first wireless circuit 211 stops receiving the image data.

After receiving of the image data is stopped, CAC using channel 64 different from channel 52 used for receiving the image data is executed in the first wireless circuit 211 (corresponding to step S113). On the basis of a result of channel monitoring, a communication channel with relatively high quality is set in the first wireless circuit 211. After CAC is completed, the first wireless circuit 211 is connected to the first wireless circuit 111 using channel 64 (corresponding to step S115). After the connection is completed, the first wireless circuit 211 is on standby (corresponding to step S116).

After the third wireless circuit 213 starts receiving the image data, if CAC is completed in the first wireless circuit 211, the communication channel to be used for image transmission is changed from the second communication channel to a communication channel on which CAC is completed (corresponding to steps S1726, steps S1304 to S1308, and steps S1309 to S1311). Thereby, the first wireless circuit 211 receives image data using channel 64 (corresponding to step S118). When image data is being received, CAC using channel 104 belonging to a band other than W52 is executed in the third wireless circuit 213 (corresponding to step S313). On the basis of a result of channel monitoring, a communication channel with relatively high quality is set in the third wireless circuit 213. After CAC is completed, the third wireless circuit 213 is connected to the third wireless circuit 113 using channel 104 (corresponding to step S315). After the connection is completed, the third wireless circuit 213 is on standby (corresponding to step S316). During standby, ISM is executed in the third wireless circuit 213 (corresponding to step S307). Also, the third wireless circuit 213 stops receiving the image data.

Figure 64:
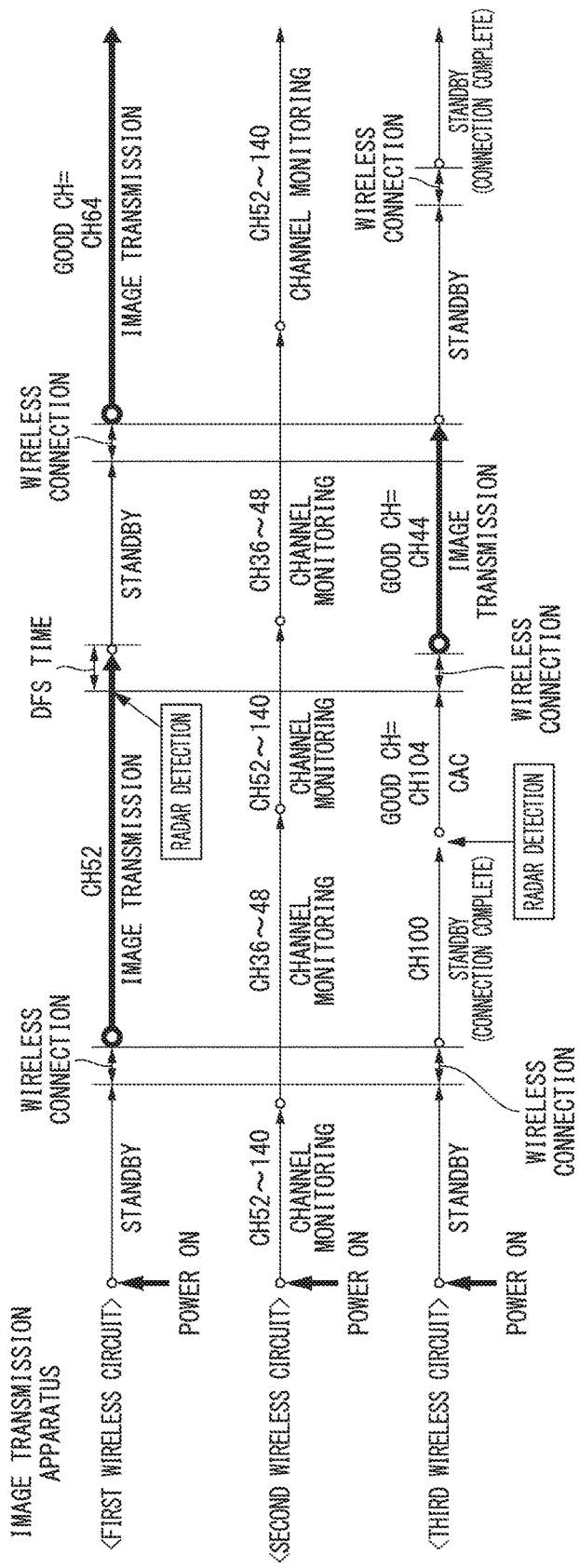
FIG. 64 is a sequence diagram showing an operation of each wireless circuit included in the image transmission apparatus according to the third embodiment of the present invention.

FIG. 64 shows an operation of each wireless circuit included in the image transmission apparatus 100c. After the image transmission apparatus 100c is powered on, the first wireless circuit 111 is connected to the first wireless circuit 211 using channel 52 belonging to a band other than W52 (corresponding to step S602). After the connection is completed, the first wireless circuit 111 transmits the image data using channel 52 (corresponding to step S606).

After the image transmission apparatus 100c is powered on, the channel monitoring is executed in the second wireless circuit 112 (corresponding to FIG. 61).

After the image transmission apparatus 100c is powered on, the third wireless circuit 113 is connected to the third wireless circuit 213 using channel 100 belonging to a band other than W52 (corresponding to step S802). After the connection is completed, the third wireless circuit 113 is on standby (corresponding to step S803).

When the first wireless circuit 111 is transmitting image data, the radio waves of the radar are detected by the image reception apparatus 200c. Because CAC using the third communication channel is not completed at this point in time, the communication channel to be used for image transmission is switched from the first communication channel to the second communication channel (corresponding to steps S613, S614, and S624). Thereby, the third wireless circuit 113 transmits the image data using channel 44 (corresponding to step S806). Switching of the communication channel is performed within a DFS time from a point in time at which the radio waves of the radar are detected. Also, the first wireless circuit 111 stops transmitting image data.

After transmitting the image data is stopped, the first wireless circuit 111 is on standby until CAC using the communication channel set in the first wireless circuit 211 is completed. After CAC is completed, the first wireless circuit 111 is connected to the first wireless circuit 211 using channel 64 (corresponding to step S625). After the connection is completed, the first wireless circuit 111 is on standby (corresponding to step S626).

After the third wireless circuit 113 starts transmitting the image data, if CAC using the communication channel set in the first wireless circuit 211 is completed, the communication channel to be used for image transmission is switched from the second communication channel to a communication channel on which CAC is completed (corresponding to step S808 and steps S814 to S816). Thereby, the first wireless circuit 111 transmits image data using channel 64 (corresponding to step S606). Also, the third wireless circuit 113 stops transmitting the image data.

The image transmission apparatus 100c may include a radar detection unit and a channel use confirmation unit 1300. The image transmission apparatus 100c may perform the above-described control related to switching of communication channels.

It is only necessary for at least one of the image transmission apparatus 100c and the image reception apparatus 200c to include a radar detection unit. Therefore, only one of the image transmission apparatus 100c and the image reception apparatus 200c may include the radar detection unit. Alternatively, the image transmission apparatus 100c and the image reception apparatus 200c may have the radar detection unit.

It is only necessary for at least one of the image transmission apparatus 100c and the image reception apparatus 200c to include a channel use confirmation unit. Therefore, only one of the image transmission apparatus 100c and the image reception apparatus 200c may include the channel use confirmation unit. Alternatively, the image transmission apparatus 100c and the image reception apparatus 200c may include the channel use confirmation unit.

Channel monitoring may be performed only for communication channels belonging to W52. Alternatively, channel monitoring may be performed only for communication channels belonging to bands other than W52.

Only one of the image transmission apparatus 100c and the image reception apparatus 200c may have a channel quality confirmation unit. If only the image reception apparatus 200c includes the channel quality confirmation unit

2301, the image transmission apparatus 100c may not include the second wireless circuit 112. If only the image transmission apparatus 100c includes the channel quality confirmation unit 1301, the image reception apparatus 200c may not include the second wireless circuit 212. If only the image transmission apparatus 100c includes the channel quality confirmation unit 1301 and the channel quality confirmation unit 1301 executes channel monitoring using a communication channel belonging to a band other than W52 by active scanning, the image transmission apparatus 100c includes the radar detection unit and a channel use confirmation unit 1300.

In each aspect of the present invention, a communication channel belonging to W52 is set as the second communication channel on the basis of a result of channel monitoring and any communication channel belonging to the band other than W52 may be set as the third communication channel regardless of a result of channel monitoring. Likewise, in each aspect of the present invention, any communication channel belonging to W52 is set as the second communication channel regardless of a result of channel monitoring and a communication channel belonging to a band other than W52 may be set as the third communication channel on the basis of a result of channel monitoring.

In the third embodiment, because the communication channel with relatively high quality is set as the second communication channel or the third communication channel, the communication quality is secured.

In the third embodiment, the image transmission apparatus 100c and the image reception apparatus 200c perform channel monitoring, so that a time required for channel monitoring of all communication channels is shortened.

First Modified Example of Third Embodiment

The first wireless circuit 211 receives image data using a communication channel belonging to a band other than W52. The channel quality confirmation unit 2301 uses the second wireless circuit 212 to execute channel monitoring using the communication channel belonging to W52. The channel quality confirmation unit 2301 uses the third wireless circuit 213 to execute channel monitoring using a communication channel belonging to a band other than W52.

The third wireless circuit 213 sets the communication channel on the basis of the result of channel monitoring. The channel use confirmation unit 2300 executes CAC using the communication channel set in the third wireless circuit 213. After CAC is completed, the third wireless circuit 213 is connected to the third wireless circuit 113. Thereafter, if the RF3 mode is not set to "waiting for RF3" for a predetermined period (e.g., 60 seconds), the channel quality confirmation unit 2301 executes channel monitoring using another communication channel belonging to a band other than W52. If the RF3 mode is set to "waiting for RF3" within a predetermined period, a process of enabling reception of image data is executed.

Radio waves of the radar are detected in the first communication channel while image data communication using the first communication channel is performed. At this time, image data communication is performed using the second communication channel set in the second wireless circuit 212. A communication channel belonging to W52 and having relatively high quality is used as the second communication channel. If the channel monitoring of the communication channel set in the second wireless circuit 212 is being executed, the communication channel is similarly switched when the radio waves of the radar are detected in the first communication channel.

After the image data communication using the second communication channel is started, the channel use confirmation unit 2300 executes CAC using the third communication channel set in the first wireless circuit 211. A communication channel belonging to a band other than W52 and having relatively high quality is used for the CAC. After CAC is completed, image data communication is performed using the third communication channel set in the first wireless circuit 211.

The channel quality confirmation unit 2301 executes channel monitoring using the communication channel set in the third wireless circuit 213. The communication channel on which this channel monitoring is executed includes a communication channel which was set in the first wireless circuit 211 and on which CAC was completed. The channel quality confirmation unit 2301 executes channel monitoring using the communication channel set in the second wireless circuit 212. The communication channel on which this channel monitoring is executed includes a communication channel that was set in the second wireless circuit 212.

In the first modified example of the third embodiment, because the communication channel with relatively high quality is set as the second communication channel or the third communication channel, the communication quality is secured.

Second Modified Example of Third Embodiment

The first wireless circuit 211 receives image data using a communication channel belonging to a band other than W52. The channel use confirmation unit 2300 uses the second wireless circuit 212 to execute CAC using a communication channel belonging to a band other than W52. A communication channel with relatively high quality is used for CAC. The channel quality confirmation unit 2301 uses the third wireless circuit 213 to execute channel monitoring using a communication channel belonging to a band other than W52.

Radio waves of the radar are detected in the first communication channel while image data communication using the first communication channel is performed. If CAC using the third communication channel set in the second wireless circuit 212 is completed at a point in time at which the radio waves of the radar are detected, image data communication using the third communication channel is performed. The channel use confirmation unit 2300 uses the first wireless circuit 211 to execute CAC using a communication channel belonging to a band other than W52. A communication channel with relatively high quality is used for CAC. The communication channel on which this CAC is executed does not include the third communication channel set in the second wireless circuit 212.

At a point in time at which the radio waves of the radar are detected, if CAC using the third communication channel set in the second wireless circuit 212 is not completed, the second communication channel is set in the second wireless circuit 212. Image data communication is performed using the second communication channel.

After the image data communication using the second communication channel is started, the channel use confirmation unit 2300 executes CAC using the communication channel set in the first wireless circuit 211. A communication channel belonging to a band other than W52 and having relatively high quality is used for CAC. After CAC is completed, image data communication is performed using the communication channel set in the first wireless circuit 211. After the image data communication using the communication channel set in the first wireless circuit 211 is started, the channel use confirmation unit 2300 uses the second wireless circuit 212 to execute CAC using a communication channel belonging to a band other than W52. A communication channel with relatively high quality is used for CAC.

In the second modified example of the third embodiment, because the communication channel with relatively high quality is set as the third communication channel, the communication quality is secured.

Third Modified Example of Third Embodiment

The first wireless circuit 211 receives image data using a communication channel belonging to a band other than W52. The channel use confirmation unit 2300 uses the second wireless circuit 212 to execute CAC using a communication channel belonging to a band other than W52. A communication channel with relatively high quality is used for CAC. The channel quality confirmation unit 2301 uses the third wireless circuit 213 to execute channel monitoring using communication channels belonging to all bands.

Radio waves of the radar are detected in the first communication channel while image data communication using the first communication channel is performed. If CAC using the third communication channel set in the second wireless circuit 212 is completed at a point in time at which the radio waves of the radar are detected, image data communication using the third communication channel is performed. The channel use confirmation unit 2300 uses the first wireless circuit 211 to execute CAC using a communication channel belonging to a band other than W52. A communication channel with relatively high quality is used for CAC. The communication channel on which this CAC is executed does not include the third communication channel set in the second wireless circuit 212.

At the point in time at which the radio waves of the radar are detected, if CAC using the third communication channel set in the second wireless circuit 212 is not completed, the second communication channel is set in the second wireless circuit 212. Image data communication is performed using the second communication channel. A communication channel belonging to W52 and having relatively high quality is used as the second communication channel.

After the image data communication using the second communication channel is started, the channel use confirmation unit 2300 executes CAC using the communication channel set in the first wireless circuit 211. A communication channel belonging to a band other than W52 and having relatively high quality is used for the CAC. After CAC is completed, image data communication is performed using the communication channel set in the first wireless circuit 211. After the image data communication using the communication channel set in the first wireless circuit 211 is started, the channel use confirmation unit 2300 uses the second wireless circuit 212 to perform CAC using a communication channel belonging to a band other than W52. A communication channel with relatively high quality is used for CAC.

In the third modified example of the third embodiment, because the communication channel with relatively high quality is set as the second communication channel or the third communication channel, the communication quality is secured.

Supplement of First to Third Embodiments

The process assigned to each wireless circuit is not limited to the above process. It is possible to flexibly assign various processes to each wireless circuit.

The number of wireless circuits does not have to be the same between the image transmission apparatus and the image reception apparatus. For example, the image transmission apparatus may have two wireless circuits, and the image reception apparatus may have three wireless circuits. In this case, one of the three wireless circuits included in the image reception apparatus may be exclusively used for the channel monitoring.

Although embodiments of the present invention have been described above with reference to the drawings, specific configurations are not limited to the embodiments, and a design change, etc. may also be included without departing from the scope of the present invention.

What is claimed is:

1. An image communication system, comprising:
   an image transmission apparatus; and
   an image reception apparatus,
   wherein the image transmission apparatus includes a transmission-side wireless communication unit configured to transmit image data by radio waves, the image data being generated in synchronization with an imaging clock and transmitted in the order in which the image data is generated,
   wherein the image reception apparatus includes a reception-side wireless communication unit configured to receive the image data transmitted by the transmission-side wireless communication unit by radio waves,
   wherein at least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit,
   wherein at least one of the image transmission apparatus and the image reception apparatus includes a channel use confirmation unit configured to execute channel use confirmation for confirming that the communication channel is usable by continuously monitoring the detection process by the radar detection unit for a predetermined time,
   wherein the channel use confirmation unit executes the channel use confirmation of a third communication channel when image data communication using a first communication channel is being performed, the first communication channel and the third communication channel being communication channels in which detection of the radar is necessary, the third communication channel being different from the first communication channel,
   wherein the transmission-side wireless communication unit and the reception-side wireless communication unit stop the image data communication using the first communication channel within a predetermined period from a point in time at which the radar detection unit detects the radio waves of the radar in the first communication channel while the image data communication using the first communication channel is performed,
   wherein the transmission-side wireless communication unit and the reception-side wireless communication unit start image data communication using the third communication channel within the predetermined period from the point in time at which the radio waves of the radar are detected if the channel use confirmation of the third communication channel is completed at the point in time at which the radio waves of the radar are detected, and wherein the transmission-side wireless communication unit and the reception-side wireless communication unit start image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

2. The image communication system according to claim 1, wherein the channel use confirmation unit executes the channel use confirmation of a fourth communication channel when the image data communication using the first communication channel is being performed, the fourth communication channel being a communication channel that has a possibility of being used by the radar and being different from any of the first communication channel and the third communication channel, wherein the channel use confirmation unit suspends either the channel use confirmation of the third communication channel or the channel use confirmation of the fourth communication channel which has a longer remaining time until completion if the channel use confirmation is not completed in any of the third communication channel and the fourth communication channel at the point in time at which the radio waves of the radar are detected, wherein the transmission-side wireless communication unit and the reception-side wireless communication unit change a communication channel set in the transmission-side wireless communication unit and the reception-side wireless communication unit from the communication channel on which the channel use confirmation is suspended to the second communication channel and start image data communication using the second communication channel, wherein the channel use confirmation unit continues either the channel use confirmation of the third communication channel or the channel use confirmation of the fourth communication channel which has a shorter remaining time until completion, wherein the transmission-side wireless communication unit and the reception-side wireless communication unit stop the image data communication using the second communication channel after the continued channel use confirmation is completed, and wherein the transmission-side wireless communication unit and the reception-side wireless communication unit start image data communication using the third communication channel or the fourth communication channel on which the channel use confirmation is completed.

3. The image communication system according to claim 1, wherein at least one of the image transmission apparatus and the image reception apparatus further includes a channel quality confirmation unit configured to confirm qualities of a plurality of communication channels different from the first communication channel before the channel use confirmation of the third communication channel is started when the image data communication using the first communication channel is being performed, wherein at least one of a first process and a second process is executed, wherein a communication channel with relatively high quality among the plurality of communication channels whose qualities have been confirmed by the channel quality confirmation unit is set as the third communication channel in the first process, and wherein a communication channel with relatively high quality among the plurality of communication channels whose qualities have been confirmed by the channel quality confirmation unit is set as the second communication channel in the second process.

4. An image reception apparatus, comprising:

a reception-side wireless communication unit configured to receive image data by radio waves, the image data being generated in synchronization with an imaging clock and transmitted in the order in which the image data is generated;

a radar detection unit configured to execute a detection process on radio waves of radar in a communication channel that has a possibility of being used for image data communication by the reception-side wireless communication unit; and a channel use confirmation unit configured to execute channel use confirmation for confirming that the communication channel is usable by continuously monitoring the detection process by the radar detection unit for a predetermined time, wherein the channel use confirmation unit executes the channel use confirmation of a third communication channel when image data communication using a first communication channel is being performed, the first communication channel and the third communication channel being communication channels in which detection of the radar is necessary, the third communication channel being different from the first communication channel, wherein the reception-side wireless communication unit stops the image data communication using the first communication channel within a predetermined period from a point in time at which the radar detection unit detects the radio waves of the radar in the first communication channel while the image data communication using the first communication channel is performed, wherein the reception-side wireless communication unit starts image data communication using the third communication channel within the predetermined period from the point in time at which the radio waves of the radar are detected if the channel use confirmation of the third communication channel is completed at the point in time at which the radio waves of the radar are detected, and wherein the reception-side wireless communication unit starts image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

5. An image transmission apparatus, comprising:
a transmission-side wireless communication unit configured to transmit image data by radio waves, the image data being generated in synchronization with an imaging clock and transmitted in the order in which the image data is generated;
a radar detection unit configured to execute a detection process on radio waves of radar in a communication channel that has a possibility of being used for image data communication by the transmission-side wireless communication unit; and
a channel use confirmation unit configured to execute channel use confirmation for confirming that the communication channel is usable by continuously monitoring the detection process by the radar detection unit for a predetermined time,
wherein the channel use confirmation unit executes the channel use confirmation of a third communication channel when image data communication using a first communication channel is being performed, the first communication channel and the third communication channel being communication channels in which detection of the radar is necessary, the third communication channel being different from the first communication channel,
wherein the transmission-side wireless communication unit stops the image data communication using the first communication channel within a predetermined period from a point in time at which the radar detection unit detects the radio waves of the radar in the first communication channel while the image data communication using the first communication channel is performed,
wherein the transmission-side wireless communication unit starts image data communication using the third communication channel within the predetermined period from the point in time at which the radio waves of the radar are detected if the channel use confirmation of the third communication channel is completed at the point in time at which the radio waves of the radar are detected, and
wherein the transmission-side wireless communication unit starts image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

6. An image reception method, comprising:
a first step of receiving image data by radio waves, the image data being generated in synchronization with an imaging clock and transmitted in the order in which the image data is generated;
a second step of executing a detection process on radio waves of radar in a communication channel that has a possibility of being used for image data communication in the first step;
a third step of executing channel use confirmation for confirming that the communication channel is usable by continuously executing the detection process for a predetermined time in the second step, the channel use confirmation of a third communication channel being executed when image data communication using a first communication channel is being performed, the first communication channel and the third communication channel being communication channels in which detection of the radar is necessary, the third communication channel being different from the first communication channel;
a fourth step of stopping the image data communication using the first communication channel within a predetermined period from a point in time at which the radio waves of the radar are detected in the first communication channel in the second step while the image data communication using the first communication channel is performed;
a fifth step of starting image data communication using the third communication channel within the predetermined period from the point in time at which the radio waves of the radar are detected if the channel use confirmation of the third communication channel is completed at the point in time at which the radio waves of the radar are detected; and
a sixth step of starting image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

7. An image transmission method, comprising:
a first step of transmitting image data by radio waves, the image data being generated in synchronization with an imaging clock and transmitted in the order in which the image data is generated;
a second step of executing a detection process on radio waves of radar in a communication channel that has a possibility of being used for image data communication in the first step;
a third step of executing channel use confirmation for confirming that the communication channel is usable by continuously executing the detection process for a predetermined time in the second step, the channel use confirmation of a third communication channel being executed when image data communication using a first communication channel is being performed, the first communication channel and the third communication channel being communication channels in which detection of the radar is necessary, the third communication channel being different from the first communication channel;
a fourth step of stopping the image data communication using the first communication channel within a predetermined period from a point in time at which the radio waves of the radar are detected in the first communication channel in the second step while the image data communication using the first communication channel is performed;
a fifth step of starting image data communication using the third communication channel within the predetermined period from the point in time at which the radio waves of the radar are detected if the channel use confirmation of the third communication channel is completed at the point in time at which the radio waves of the radar are detected; and a sixth step of starting image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

8. A non-transitory recording medium saving a program for causing a computer of an image reception apparatus to execute:

a first step of receiving image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of executing channel use confirmation for confirming that the communication channel is usable by continuously executing the detection process for a predetermined time in the second step, the channel use confirmation of a third communication channel being executed when image data communication using a first communication channel is being performed, the first communication channel and the third communication channel being communication channels in which detection of the radar is necessary, the third communication channel being different from the first communication channel;

a fourth step of stopping the image data communication using the first communication channel within a predetermined period from a point in time at which the radio waves of the radar are detected in the first communication channel in the second step while the image data communication using the first communication channel is performed;

a fifth step of starting image data communication using the third communication channel within the predetermined period from the point in time at which the radio waves of the radar are detected if the channel use confirmation of the third communication channel is completed at the point in time at which the radio waves of the radar are detected; and a sixth step of starting image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

9. A non-transitory recording medium saving a program for causing a computer of an image transmission apparatus to execute:

a first step of transmitting image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of executing channel use confirmation for confirming that the communication channel is usable by continuously executing the detection process for a predetermined time in the second step, the channel use confirmation of a third communication channel being executed when image data communication using a first communication channel is being performed, the first communication channel and the third communication channel being communication channels in which detection of the radar is necessary, the third communication channel being different from the first communication channel;

a fourth step of stopping the image data communication using the first communication channel within a predetermined period from a point in time at which the radio waves of the radar are detected in the first communication channel in the second step while the image data communication using the first communication channel is performed;

a fifth step of starting image data communication using the third communication channel within the predetermined period from the point in time at which the radio waves of the radar are detected if the channel use confirmation of the third communication channel is completed at the point in time at which the radio waves of the radar are detected; and a sixth step of starting image data communication using a second communication channel within the predetermined period from the point in time at which the radio waves of the radar are detected if the channel use confirmation of the third communication channel is not completed at the point in time at which the radio waves of the radar are detected, the second communication channel being a communication channel in which detection of the radar is not necessary.

* * * * *